United States Patent [19]

Satake et al.

[11] Patent Number: 5,545,943
[45] Date of Patent: Aug. 13, 1996

[54] VARIABLE AIR-GAP TYPE DRIVING DEVICE

[75] Inventors: Akira Satake; Yoshitaka Onishi; Sotsuo Miyoshi, all of Hyogo, Japan

[73] Assignee: Mitsubishi Denki Kabushiki Kaisha, Tokyo, Japan

[21] Appl. No.: 153,338

[22] Filed: Nov. 15, 1993

[30] Foreign Application Priority Data

Nov. 17, 1992 [JP] Japan .................................. 4-329891
Mar. 12, 1993 [JP] Japan .................................. 5-77405
Sep. 30, 1993 [JP] Japan .................................. 5-245646

[51] Int. Cl.$^6$ .................................................. H01L 41/04
[52] U.S. Cl. ............................ 310/350; 310/37; 310/82
[58] Field of Search .............................. 310/36–37, 82, 310/83, 350, 80, 75 R, 66, 349, 90, 348

[56] References Cited

U.S. PATENT DOCUMENTS

| 4,164,722 | 8/1979 | Garvey ........................... 310/36 |
| 4,398,167 | 8/1983 | Dickie et al. ................... 310/36 |
| 4,543,718 | 10/1985 | Duescher ....................... 310/38 |
| 4,598,594 | 7/1986 | Dainley ......................... 310/36 |
| 4,626,718 | 12/1986 | Moriyama ..................... 310/36 |
| 4,690,010 | 9/1987 | Matsumoto et al. .......... 310/83 |

OTHER PUBLICATIONS

IEEE Transactions on Power Apparatus & Systems, Jan./Feb. 1980 Experimental & Theoretical Study of Hypocycloidal Motors . . . .

*Primary Examiner*—David S. Martin
*Attorney, Agent, or Firm*—Wolf, Greenfield & Sacks, P.C.

[57] ABSTRACT

The variable air-gap type driving detector of the present invention for obtaining low speed and high torque outputs required to drive, for example, joints of industrial robots is provided with an elastic supporting means 22, whose one end is supported on a base stand 21, for supporting a rotor 5 so as to restrain the rotor 5's autorotation; and an eccentric supporting meals, whose rotation shaft 23b is supported on the base stand 21 in a freely rotatable state, and an outside of whose eccentric shaft 23a is supported inside the motor 5, and further whose rotation shaft 23b rotates with the revolution of the rotor 5; and the driving device of the invention becomes simple in structure and small in size by being composed of using no cranks or only a crank.

Also, the driving device of the invention is provided with a first gear supported on a base stand in a freely rotatable state; and a second gear, linked with a rotor, for rotating the first gear by revolving inside the first gear with the revolution of the rotor; therefore the revolution movements of the rotor become capable of being taken out from the first gear as rotation movements with only an eccentric supporting means.

Further, the driving device of the invention is provided with a waveform generator for generating waveform signals, indicating voltage values or current values to be imposed on each coil of an armature, on command signals corresponding to rotation angles of a rotor; and a controlling power supply for giving voltages or current corresponding to waveform signals generated by the waveform generator to each coil; therefore smooth rotation movements based on rotation angles of the rotor can be obtained.

52 Claims, 35 Drawing Sheets

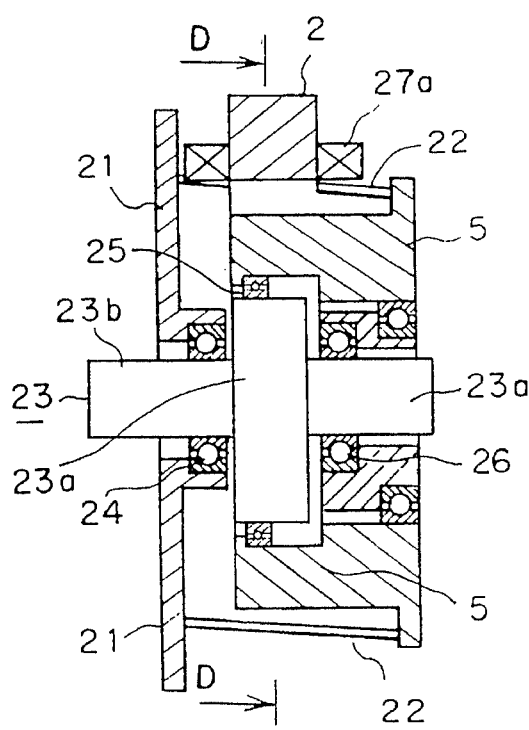
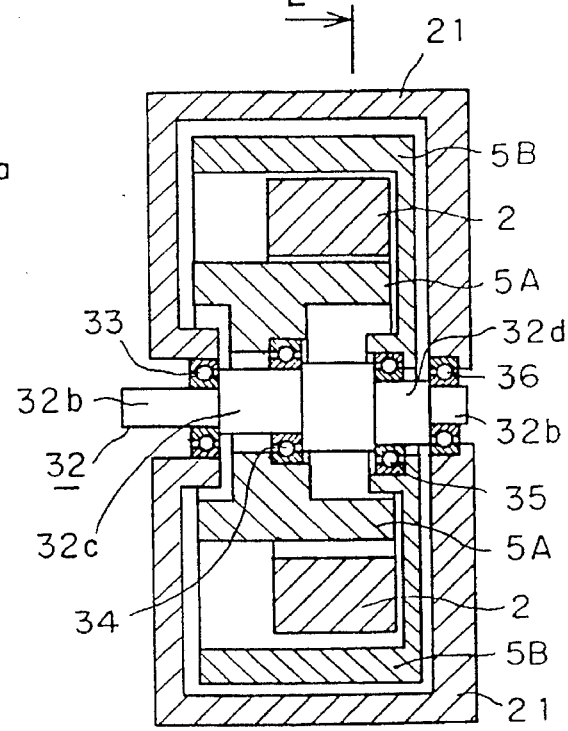
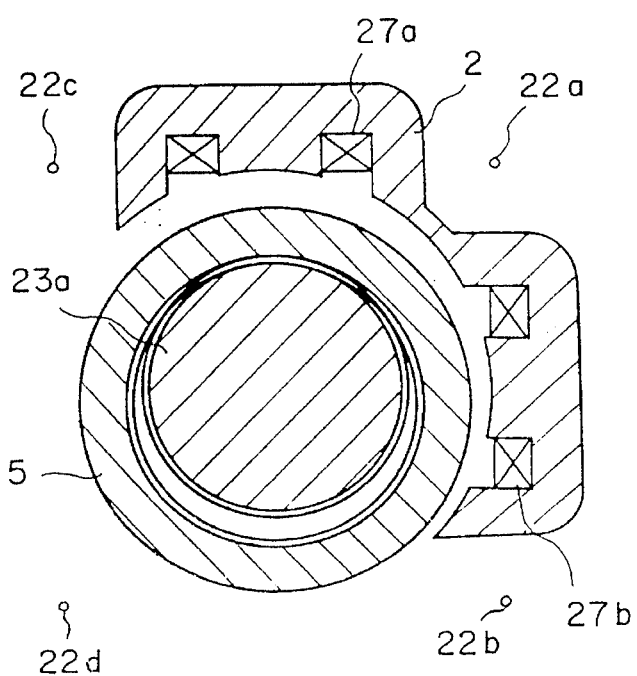

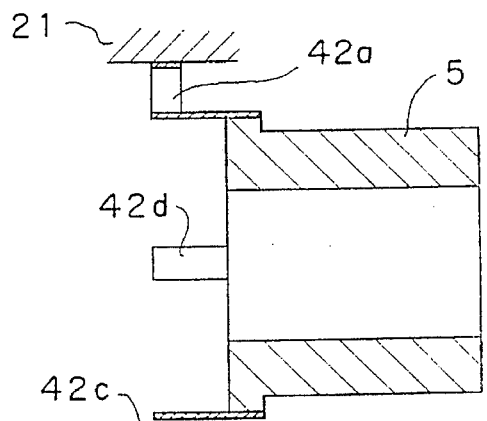
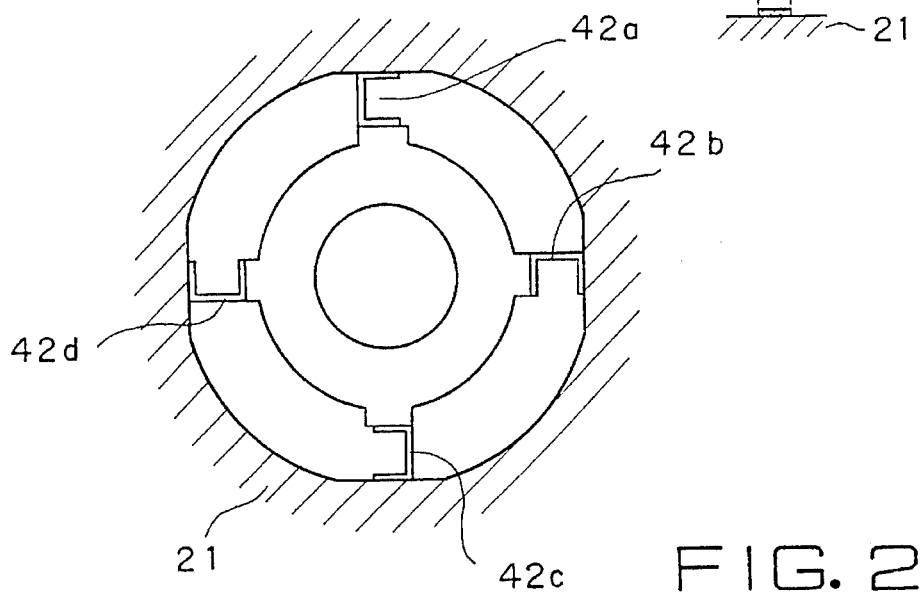
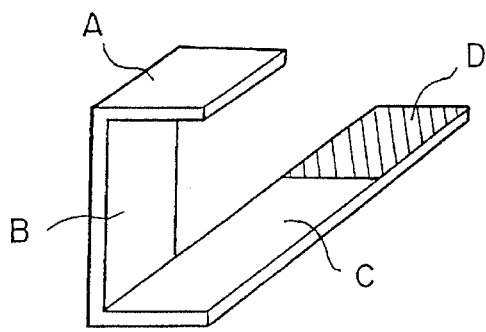
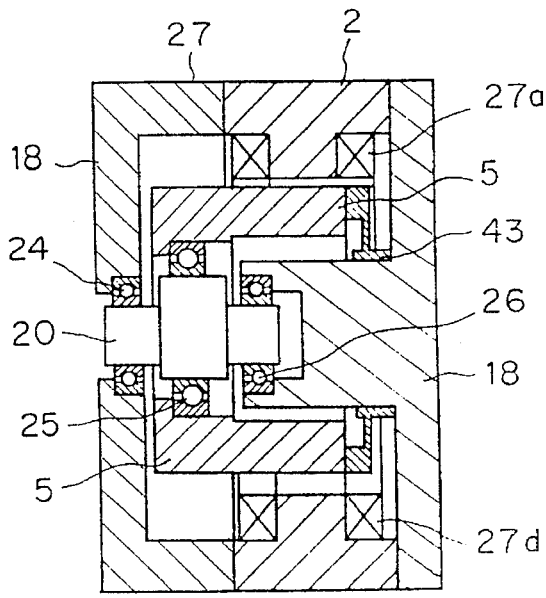

VARIABLE AIR-GAP TYPE DRIVING DEVICE

BACKGROUND OF THE INVENTION

1. Field of the Invention

This invention relates to a variable air-gap type driving device for obtaining a low speed and high torque output required to drive, for example, a joint of an industrial robot.

2. Description of the Prior Art

FIG. 1 is a sectional view showing a conventional variable air-gap type driving device disclosed in, for example, Published Unexamined Patent Application No. 264559 of 1989. FIG. 2 (a) is a sectional view taken on line F—F of FIG. 1; and FIG. 2 (b) is a sectional view taken on line G—G of FIG. 7.

In FIG. 1 and 2, reference numeral 1 denotes a casing of the variable air-gap type driving device. Numeral 2 denotes a ring-shaped armature fixed at the inner peripheral surface of the casing 1. Numeral 3 denotes coils. Numeral 4 denotes an internal gear fixed at the inner peripheral surface of the casing 7. Numeral 5 denotes a rotor revolved by the electromagnetic attractive force generated by the armature 2. Numeral 6 denotes an external gear, linked with the rotor 5, revolving around the inner peripheral surface with the revolution of the rotor 5. Numeral 7 denotes plural cranks whose eccentric shafts 7a is revolutionarily supported by the rotor 5 and the external gear 6 through the bearings 9–11, and whose rotation shafts 7b are linked with the output shaft 14 through the bearings 12 and 13, and further which transmit only the autorotation of the rotor 5 to the output shaft 14 by the revolution of the eccentric shafts 7a (the rotation of the rotation shafts 7b) with the revolution of the rotor 5. Numeral 15 denotes bearings rotatively supporting the rotation axes 7b.

Now, the operation of the conventional variable air-gap type driving device will be described.

First of all, magnetic attractive force is generated by the armature 2 by sequential power supplement to the coils 3, then the rotor 5 revolves by the magnetic attractive force, autorotating.

Because the rotor 5 is linked with the external gear 6, the rotor 5 autorotates by one tooth of the external gear 6 every revolution of the rotor 5.

Namely, because the external gear 6 is equipped with fewer external teeth at least one than the internal teeth of the internal gear 4, and because the internal teeth of the internal gear 4 and the external teeth of the external gear 6 engage one by one with the revolution of the external gear 6 inside the internal gear 4, the external gear 6 autorotates by one tooth every revolution. (Autorotation naturally changes by changing the number of the teeth of the external gear 6.)

Accordingly, because the eccentric shafts 7a of the cranks 7 revolve with the revolution of the rotor 5 (external gear 6), the rotation shafts 7b transmit only the autorotation of the rotor 5 to the output shaft 14. Then the output shaft 14 rotates in a low speed and high torque state.

Because the conventional variable air-gap type driving device is composed as mentioned above, the conventional device requires three cranks to take out only the autorotation from the revolution movement of the rotor 5 to the output shaft 14. Therefore, the conventional device has held such a problem that it requires many parts bringing about being complicated in structure and large in size.

SUMMARY OF THE INVENTION

In view of the foregoing, it is an object of the present invention to provide a variable air-gap type driving device being able to reduce the number of parts to be simple in structure and small in size by using no cranks or by being composed of only one crank.

It is another object of the present invention to provide a variable air-gap type driving device being able to output a smooth rotation.

It is a further object of the present invention to provide a variable air-gap type driving device being able to prevent from stepping out.

It is a further object of the present invention to provide a variable air-gap type driving device being able to improve its efficiency.

It is a further object of the present invention to provide a variable air-gap type driving device being able to be composed of driving circuits used frequently in the driving circuits of small- and medium-capacity electric motors using a single-phase AC power supply as a driving power supply.

It is a further object of the present invention to provide a variable air-gap type driving device being able to accurately detect rest positions of a rotor.

According to the first aspect of the present invention, for achieving the above-mentioned objects, there is provided a variable air-gap type driving device comprising an elastic supporting means whose one end is supported on a base stand and which supports a rotor so as to restrain the rotor autorotation, and an eccentric supporting means whose rotation shaft is rotatively supported on the base stand and whose eccentric shaft's outside is supported inside the rotor and further whose rotation shaft rotates with the revolution of the rotor.

As stated above, the variable air-gap type driving device according to the first aspect of the present invention is provided with the elastic supporting means whose one end is supported on the base stand axed which supports the rotor so as to restrain the rotor autorotation, therefore the rotor becomes being revolved by the restriction of the rotor autorotation; and the driving device further provided with the eccentric supporting means whose rotation shaft is rotatively supported on the base stand and whose eccentric shaft's outside is supported inside the rotor and further whose rotation shaft rotates with the revolution of the rotor, therefore the revolution movement of the rotor becomes capable of being taken out from the rotation shaft as a rotation movement.

According to the second aspect of the present invention, there is provided a variable air-gap type driving device arranging a rotor inside an armature and arranging coils generating magnetic field in the inner peripheral surface area of the armature.

As stated above, the variable air-gap type driving device according to the second aspect of the present invention is provided with the rotor arranged inside the armature and coils, generating magnetic field, arranged in the inner peripheral surface area of the armature, therefore the driving device becomes capable of utilizing the armature as a casing.

According to the third aspect of the present invention, there is provided a variable air-gap type driving device arranging a rotor outside an armature and arranging coils generating magnetic field in the inner peripheral surface area of the armature.

As stated above, the variable air-gap type driving device according to the third aspect of the present invention is provided with the rotor arranged outside the armature and the coils, generating the magnetic field, arranged in the inner peripheral surface area of the armature, therefore the coils becomes capable of being easily installed.

According to the fourth aspect of the present invention, there is provided a variable air-gap type driving device comprising an elastic supporting means for supporting a rotor so as to apply elastic repulsive force into the opposite direction of electromagnetic attractive force generated by an armature.

As stated above, the variable air-gap type driving device according to the fourth aspect of the present invention is provided with the elastic supporting means for supporting the rotor so as to apply elastic repulsive force into the opposite direction of electromagnetic attractive force generated by the armature, therefore the driving device becomes capable of reducing directions applying the electromagnetic attractive force to the rotor.

According to the fifth aspect of the present invention, there is provided a variable air-gap type driving device comprising the first and the second rotor revolving in half cycle phase shifted state each other with electromagnetic attractive force generated by an armature, and an eccentric supporting means whose first and second eccentric shaft's outside is supported inside the first and the second rotor respectively, the phases of the first and the second eccentric shaft being shifted in a half cycle each other, and whose rotation shaft rotates with the revolution of the first and the second rotor.

As stated above, the variable air-gap type driving device according to the fifth aspect of the present invention is provided with the first and the second rotor revolving in half cycle phase shifted state each other with electromagnetic attractive force generated by the armature, and the eccentric supporting means whose first and second eccentric shaft's outside is supported inside the first and the second rotor respectively, the phases of the first and the second eccentric shaft being shifted in a half cycle each other, and whose rotation shaft rotates with the revolution of the first and the second rotor, therefore the active area of the electromagnetic attractive fore to the rotors becomes large.

According to the sixth aspect of the present invention, there is provided a variable air-gap type driving device forming magnetic poles divided along the circumference direction of a rotor so as to correspond to each magnetic pole of an armature, and passing current through coils arranged around the armature in order that electromagnetic repulsive force might be induced in a section diagonally resided to the section applied the electromagnetic attractive force generated by the armature to the rotor.

As stated above, the variable air-gap type driving device according to the sixth aspect of the present invention forms the magnetic poles divided along the circumference direction of the rotor so as to correspond to each magnetic pole of the armature, and passes the current through the coils arranged around the armature in order that the electromagnetic repulsive force might be induced in the section diagonally resided to the section applied the electromagnetic attractive force generated by the armature to the rotor, therefore magnetic force applied to the rotor and induced torque increase.

According to the seventh aspect of the present invention, there is provided a variable air-gap type driving device comprising an armature for generating a magnetic field alternating into plural directions, and a rotor, arranged inside the armature, revolving with electromagnetic attractive force and electromagnetic repulsive force induced by the magnetic field generated by the armature.

As stated above, the variable air-gap type driving device according to the seventh aspect of the present invention is provided with the armature for generating the magnetic field alternating into plural directions, and the rotor, arranged inside the armature, revolving with the electromagnetic attractive force and the electromagnetic repulsive force induced by the magnetic field generated by the armature, therefore the driving device becomes capable of revolving the rotor without applying elastic repulsive force by the elastic supporting means as stated in the fourth aspect.

According to the eighth aspect of the present invention, there is provided a variable air-gap type driving device comprising an armature for generating a magnetic field alternating into plural directions, and a rotor, arranged outside the armature, revolving with electromagnetic attractive force and electromagnetic repulsive force induced by the magnetic field generated by the armature.

As stated above, the variable air-gap type driving device according to the eighth aspect of the present invention is provided with the armature for generating the magnetic field alternating into plural directions, and the rotor, arranged outside the armature, revolving with the electromagnetic attractive force and the electromagnetic repulsive force induced by the magnetic field generated by the armature, therefore the driving device becomes capable of revolving the rotor without applying elastic repulsive force by the elastic supporting means as stated in the fourth aspect.

According to the ninth aspect of the present invention, there is provided a variable air-gap type driving device arranging coils inside a magnetic circuit constituted by an armature.

As stated above, the variable air-gap type driving device according to the ninth aspect of the present invention arranges coils inside a magnetic circuit constituted by an armature, therefore the armature becomes capable of being manufactured by the press processing of a metal plate and the coils becomes capable of being constituted by two torus-shaped coils.

According to the tenth aspect of the present invention, there is provided a variable air-gap type driving device comprising a rotor having different magnetic poles in a shaft direction, and plural armature couples, arranged in an opposite direction each other through the rotor, for generating electromagnetic attractive force by generating opposite direction magnetic fields each other to the rotor.

As stated above, the variable air-gap type driving device according to the tenth aspect of the present invention is provided with the rotor having different magnetic poles in the shaft direction, and the plural armature couples, arranged in the opposite direction each other through the rotor, for generating electromagnetic attractive force by generating opposite direction magnetic fields each other to the rotor, therefore the driving device becomes capable of revolving the rotor without applying elastic repulsive force by the elastic supporting means as stated in the fourth aspect According to the eleventh aspect of the present invention, there is provided a variable air-gap type driving device comprising an elastic supporting means made of plural parallel rod springs.

As stated above, the variable air-gap type driving device according to the eleventh aspect of the present invention is provided with the elastic supporting means made of plural parallel rod springs, therefore the elastic supporting means becomes simple in structure.

According to the twelfth aspect of the present invention, there is provided a variable air-gap type driving device comprising an elastic supporting means made of a bent leaf spring permitting only the movements in a plane intersecting perpendicularly to a revolution shaft of a rotor.

As stated above, the variable air-gap type driving device according to the twelfth aspect of the present invention is provided with the elastic supporting means made of a bent leaf spring permitting only the movements in the plane intersecting perpendicularly to the revolution shaft of the rotor, the elastic supporting means becomes easy to manufacture and cheap in cost.

According to the thirteenth aspect of the present invention, there is provided a variable air-gap type driving device comprising an elastic supporting means made of a diaphragm-shaped leaf spring.

As stated above, the variable air-gap type driving device according to the thirteenth aspect of the present invention is provided with the elastic supporting means made of the diaphragm-shaped leaf spring, therefore the driving device requires less spring-attaching space than that of the driving device employing an elastic supporting means made of parallel rod springs.

According to the fourteenth aspect of the present invention, there is provided a variable air-gap type driving device comprising an elastic supporting means made of plural cylindrical elastic bodies.

As stated above, the variable air-gap type driving device according to the fourteenth aspect of the present invention is provided with the elastic supporting means made of the plural cylindrical elastic bodies, therefore the elastic supporting means becomes easy in manufacturing and constructing and cheap in cost.

According to the fifteenth aspect of the present invention, there is provided a variable air-gap type driving device comprising an elastic supporting means made of a torus-shaped elastic body.

As stated above, the variable air-gap type driving device according to the fifteenth aspect of the present invention is provided with the elastic supporting means made of a torus-shaped elastic body, therefore the elastic supporting means becomes easier in manufacturing and constructing and cheaper in cost than that of the fourteenth aspect.

According to the sixteenth aspect of the present invention, there is provided a variable air-gap type driving device comprising -the first gear suspended rotatively on a base stand, and the second gear, linked with a rotor, rotating the first gear by revolving inside the first gear with the revolution of the rotor.

As stated above, the variable air-gap type driving device according to the sixteenth aspect of the present invention is provided with the first gear suspended rotatively on the base stand, and the second gear, linked with the rotor, rotating the first gear by revolving inside the first gear with the revolution of the rotor, therefore the driving device becomes capable of taking a revolution movement of the rotor out of the first gear as a rotation movement.

According to the seventeenth aspect of the present invention, there is provided a variable air-gap type driving device comprising an eccentric supporting means having plural eccentric shafts having different phases each other, and the second gear independent of each of the plural eccentric shafts.

As stated above, the variable air-gap type driving device according to the seventeenth aspect of the present invention is provided with the eccentric supporting means having plural eccentric shafts having different phases each other, and the second gear independent of each of the plural eccentric shafts, therefore force applied to the first gear becomes capable of being symmetry with respect to the rotating shaft of the gear.

According to the eighteenth aspect of the present invention, there is provided a variable air-gap type driving device comprising an elastic supporting means for restraining the shaft-direction movement of the second gear and permitting the radial-direction movement of it.

As stated above, the variable air-gap type driving device according to the eighteenth aspect of the present invention is provided with the elastic supporting means for restraining the shaft-direction movement of the second gear and permitting the radial-direction movement of it, therefore the second gear becomes revolving without moving to the shaft-direction.

According to the nineteenth aspect of the present invention, there is provided a variable air-gap type driving device comprising a screw arranged in the central part of an eccentric supporting means, and a linear motion mechanism, moving linearly with engaging with the screw of the eccentric supporting means, arranged on the common shaft with the eccentric supporting means.

As stated above, the variable air-gap type driving device according to the nineteenth aspect of the present invention is provided with the screw arranged in the central part of the eccentric supporting means, and the linear motion mechanism, moving linearly with engaging with the screw of the eccentric supporting means, arranged on the common shaft with the eccentric supporting means, therefore the revolution movement of a rotor becomes capable of being taken out of the linear motion mechanism as a linear motion.

According to the twentieth aspect of the present invention, there is provided a variable air-gap type driving device comprising a screw arranged on the inner peripheral surface of a rotor, and a linear motion mechanism, moving linearly with engaging with the screw of the rotor, arranged on the common shaft with the revolution shaft of the rotor.

As stated above, the variable air-gap type driving device according to the twentieth aspect of the present invention is provided with the screw arranged on the inner peripheral surface of the rotor, and the linear motion mechanism, moving linearly with engaging with the screw of the rotor, arranged on the common shaft with the revolution shaft of the rotor, therefore the revolution movement of the rotor becomes capable of being taken out of the linear motion mechanism as a linear motion.

According to the twenty-first aspect of the present invention, there is provided a variable air-gap type driving device comprising an eccentric ring arranged in a central part, and a gear rotating with engaging with internal teeth provided on the inner peripheral surface of a rotor with the rotor revolution.

As stated above, the variable air-gap type driving device according to the twenty-first aspect of the present invention is provided with the eccentric ring arranged in the central part, and the gear rotating with engaging with internal teeth provided on the inner peripheral surface of the rotor with the rotor revolution, therefore the driving device becomes short in shaft-direction length and small in size.

According to the twenty-second aspect of the present invention, there is provided a variable air-gap type driving device comprising the first gear, supported on a base stand rotatively, having external teeth or internal teeth on its outer peripheral surface, and the second gear, linked with a rotor, having internal teeth or external teeth at shifted positions from the center part, whose revolution, centering the shifted point from the central part, with the revolution of the rotor rotates the first gear by engaging the internal teeth or the external teeth with the external teeth or the internal teeth of the first gear.

As stated above, the variable air-gap type driving device according to the twenty-second aspect of the present invention is provided with the first gear, supported on the base stand rotatively, having external teeth or internal teeth on its outer peripheral surface, and the second gear, linked with the rotor, having internal teeth or external teeth at shifted positions from the center part, whose revolution, centering the shifted point from the central part, with the revolution of the rotor rotates the first gear by engaging the internal teeth or the external teeth with the external teeth or the internal teeth of the first gear, the driving device becomes capable of arranging the output shaft of the device in a shifted position from the primary body of the device.

According to the twenty-third aspect of the present invention, there is provided a variable air-gap type driving device comprising a waveform generator for generating a waveform signal based on a command signal corresponding to the rotation angle of a rotor and indicating a voltage value or a current value each of which should be imposed on each coil of an armature, and a control power supply for supplying voltage or current corresponding respectively to the waveform signal generated by the waveform generator to each coil.

As stated above, the variable air-gap type driving device according to the twenty-third aspect of the present invention is provided with the waveform generator for generating the waveform signal based on the command signal corresponding to the rotation angle of the rotor and indicating the voltage value or the current value each of which should be imposed on each coil of the armature, and the control power supply for supplying voltage or current corresponding respectively to the waveform signal generated by the waveform generator to each coil, therefore the driving device becomes capable of obtaining a smooth rotation movement based on the rotation angle of the rotor.

According to the twenty-fourth aspect of the present invention, there is provided a variable air-gap type driving device comprising a waveform generator for generating a waveform signal based on a command signal corresponding to the revolution speed of a rotor and indicating a voltage value or a current value each of which should be imposed on each coil of an armature, and a control power supply for supplying voltage or current corresponding respectively to the waveform signal generated by the waveform generator to each coil.

As stated above, the variable air-gap type driving device according to the twenty-fourth aspect of the present invention is provided with the waveform generator for generating the waveform signal based on the command signal corresponding to the revolution speed of the rotor and indicating the voltage value or the current value each of which should be imposed on each coil of the armature, and the control power supply for supplying voltage or current corresponding respectively to the waveform signal generated by the waveform generator to each coil, therefore the driving device becomes capable of obtaining a smooth rotation movement based on the revolution speed of the rotor.

According to the twenty-fifth aspect of the present invention, there is provided a variable air-gap type driving device comprising a waveform generator for shaping a detection signal of an air-gap length detector to a rectangular wave, and a switching device for imposing voltage on one of a pair of coils when the rectangular wave has a higher level than a prescribed value, and imposing the voltage on the other of the pair of coils when the rectangular wave has a lower level than the prescribed value.

As stated above, the variable air-gap type driving device according to the twenty-fifth aspect of the present invention is provided with the waveform generator for shaping the detection signal of the air-gap length detector to the rectangular wave, and the switching device for imposing voltage on one of the pair of coils when the rectangular wave has a higher level than the prescribed value, and imposing the voltage on the other of the pair of coils when the rectangular wave has a lower level than the prescribed value, therefore the driving device becomes capable of obtaining a smooth rotation movement and preventing from stepping out.

According to the twenty-sixth aspect of the present invention, there is provided a variable air-gap type driving device comprising a command-value-extracting circuit for multiplying a detection signal of an air-gap detector by current amplitude command values commanding current amplitude values flowing in a pair of coils before extracting current command values to each of the pair of coils from the multiplication results, and a voltage output circuit for imposing voltages on the pair of coils respectively based on deviations of each current flowing in each of the pair of coils from the current command values extracted by the command-value-extracting circuit in order that the current values might coincide with the current command values.

As stated above, the variable air-gap type driving device according to the twenty-sixth aspect of the present invention is provided with the command-value-extracting circuit for multiplying the detection signal of the air-gap detector by the current amplitude command values commanding current amplitude values flowing in the pair of coils before extracting current command values to each of the pair of coils from the multiplication results, and the voltage output circuit for imposing voltages on the pair of coils respectively based on deviations of each current flowing in each of the pair of coils from the current command values extracted by the command-value-extracting circuit in order that the current values might coincide with the current command values, therefore the driving device becomes capable of obtaining a smooth rotation movement and preventing from stepping out.

According to the twenty-seventh aspect of the present invention, there is provided a variable air-gap type driving device comprising a command-value-extracting circuit for multiplying a detection signal of an air-gap detector by voltage amplitude command values commanding voltage amplitude values imposed on a pair of coils before extracting voltage command values to each of the pair of coils from the multiplication results, and a voltage output circuit for imposing voltages on the pair of coils respectively based on the voltage command values extracted by the command-value-extracting circuit.

As stated above, the variable air-gap type driving device according to the twenty-seventh aspect of the present invention is provided with the command-value-extracting circuit for multiplying the detection signal of the air-gap detector by the voltage amplitude command values commanding voltage amplitude values imposed on the pair of coils before extracting the voltage command values to each of the pair of coils from the multiplication results, and the voltage output circuit for imposing voltages on the pair of coils respectively based on the voltage command values extracted by the command-value-extracting circuit, therefore the driving device becomes capable of obtaining a smooth rotation movement and preventing from stepping out.

According to the twenty-eighth aspect of the present invention, there is provided a variable air-gap type driving device comprising a control power supply for making voltage values imposed on a pair of coils coincide with voltage amplitude command values.

As stated above, the variable air-gap type driving device according to the twenty-eighth aspect of the present invention is provided with the control power supply for making voltage values imposed on a pair of coils coincide with voltage amplitude command values, therefore the driving device becomes capable of obtaining a smooth rotation movement and preventing from stepping out.

According to the twenty-ninth aspect of the present invention, there is provided a variable air-gap type driving device comprising a control power supply for controlling a voltage imposed on a pair of coils respectively based on a deviation of a total current value flowing in each coil of an armature from a current amplitude command value in order that the total current value might coincide with the current amplitude command value.

As stated above, the variable air-gap type driving device according to the twenty-ninth aspect of the present invention is provided with the control power supply for controlling the voltage imposed on the pair of coils respectively based on the deviation of the total current value flowing in each coil of the armature from the current amplitude command value in order that the total current value might coincide with the current amplitude command value, therefore the driving device becomes capable of obtaining a smooth rotation movement and preventing from stepping out.

According to the thirtieth aspect of the present invention, there is provided a variable air-gap type driving device comprising a capacitor for storing energy, stored in a coil of an armature by imposing electricity to the coil, during not imposing electricity to the coil through a reflux diode, and a regenerating circuit for regenerating energy stored in the capacitor to the power supply of the coil when the voltage across the capacitor exceeds a prescribed value.

As stated above, the variable air-gap type driving device according to the thirtieth aspect of the present invention is provided with the capacitor for storing energy, stored in a coil of the armature by imposing electricity to the coil, during not imposing electricity to the coil through the reflux diode, and the regenerating circuit for regenerating energy stored in the capacitor to the power supply of the coil when the voltage across the capacitor exceeds the prescribed value, therefore the driving circuit loss of the driving device becomes reduced and the efficiency of it becomes improved.

According to the thirty-first aspect of the present invention, there is provided a variable air-gap type driving device comprising two switching devices connected in series between direct current outputs of a driving power source composed of a double voltage rectifying circuit, reflux diodes connected to each switching device in parallel, and two series circuits, connected in parallel each other, composed of a coil and a reverse-blocking diode respectively, the polarities of the diodes of which differ each other, and one end of which is connected to the medium voltage point of the driving power supply and the other end of which is connected to the connection point of the switching devices.

As stated above, the variable air-gap type driving device according to the thirty-first aspect of the present invention is provided with the two switching devices connected in series between the direct current outputs of the driving power source composed of the double voltage rectifying circuit, the reflux diodes connected to each switching device in parallel, and the two series circuits, connected in parallel each other, composed of the coil and the reverse-blocking diode respectively, the polarities of the diodes of which differ each other, and one end of which is connected to the medium voltage point of the driving power supply and the other end of which is connected to the connection point of the switching devices, therefore the driving circuit of the driving device can be composed of such circuits as used frequently in driving circuits of small- and medium-capacity electric motors using single-phase AC power supplies as driving power supplies.

According to the thirty-second aspect of the present invention, there is provided a variable air-gap type driving device comprising an air-gap length detector set on a projecting shaft part of a base stand arranged on a common shaft with an armature in order that the air-gap length between the projecting shaft part and a rotor is detected.

As stated above, the variable air-gap type driving device according to the thirty-second aspect of the present invention is provided with the air-gap length detector set on the projecting shaft part of the base stand arranged on the common shaft with the armature in order that the air-gap length between the projecting shaft part and the rotor is detected, therefore the coil space the armature becomes capable of being utilized efficiently, and the air-gap length detector becomes being not influenced by the primary magnetic flux of the coils.

According to the thirty-third aspect of the present invention, there is provided a variable air-gap type driving device inducing voltages in coils located both adjacent positions to a coil located diagonally to an arbitrary rotation angle by imposing a weak AC voltage not influencing the drive of a rotor on the coil, and detecting rest positions by the difference between the induced voltages in the coils.

As stated above, the variable air-gap type driving device according to the thirty-third aspect of the present invention induces voltages in the coils located both adjacent positions to the coil located diagonally to an arbitrary rotation angle by imposing the weak AC voltage not influencing the drive of the rotor on the coil, and detects rest positions by the difference between the induced voltages in the coils, therefore the driving device becomes capable of detecting rest positions of the rotor.

According to the thirty-fourth aspect of the present invention, there is provided a variable air-gap type driving device comprising a phase-controlling circuit for advancing the output of a waveform-shaping circuit by phase differences corresponding to revolution speeds of a rotor detected by a speed-detecting circuit, in which the relation between voltage-current phase differences imposed on coils and revolution speeds of the rotor is previously set.

As stated above, the variable air-gap type driving device according to the thirty-fourth aspect of the present invention is provided with the variable air-gap type driving device comprising the phase-controlling circuit for advancing the output of the waveform-shaping circuit by phase differences corresponding to revolution speeds of the rotor detected by the speed-detecting circuit, in which the relation between voltage-current phase differences imposed on coils and revolution speeds of the rotor is previously set, therefore the efficiency of the driving device is improved.

According to the thirty-fifth aspect of the present invention, there is provided a variable air-gap type driving device comprising a control power supply for controlling voltage values imposed on a pair of coils in order that revolution speeds of a rotor detected by a speed-detecting circuit coincide with speed commands of the rotor, and a phase-controlling circuit for advancing the output of a waveform-shaping circuit by phase differences corresponding to the total current value, in which the relation between voltage-current phase differences imposed on coils and the total current value is previously set.

As stated above, the variable air-gap type driving device according to the thirty-fifth aspect of the present invention is provided with the control power supply for controlling the voltage values imposed on the pair of coils in order that the revolution speeds of the rotor detected by the speed-detecting circuit coincide with the speed commands of the rotor, and the phase-controlling circuit for advancing the output of the waveform-shaping circuit by the phase differences corresponding to the total current value, in which the relation between the voltage-current phase differences imposed on the coils and the total current value is previously set, therefore the efficiency of the driving device is improved.

The above and further objects and novel features of the invention will more fully appear from the following detailed description when the same is read in connection with the accompanying drawings. It is to be expressly understood, however, that the drawings are for purpose of illustration only and are not intended as a definition of the limits of the invention.

BRIEF DESCRIPTION OF THE DRAWINGS

FIG. 8 is a sectional view showing an embodiment 3 of the variable air-gap type driving device of the present invention.

FIG. 9 is a sectional view taken on line D—D of FIG. 8.

FIG. 10 is a sectional view showing an embodiment 4 of the variable air-gap type driving device of the present invention.

FIG. 19 is a sectional view showing an embodiment 10 the variable air-gap type driving device of the present invention.

FIG. 20 is a sectional view showing an embodiment 10 the variable air-gap type driving device of the present invention.

FIG. 21 is a perspective view showing a bent leaf spring.

FIG. 22 is a sectional view showing an embodiment 11 the variable air-gap type driving device of the present invention.

DETAILED DESCRIPTION OF THE PREFERRED EMBODIMENTS

Preferred embodiments of the invention will now be described in detail referring to the accompanying drawings.

EMBODIMENT 1

Figure 1:
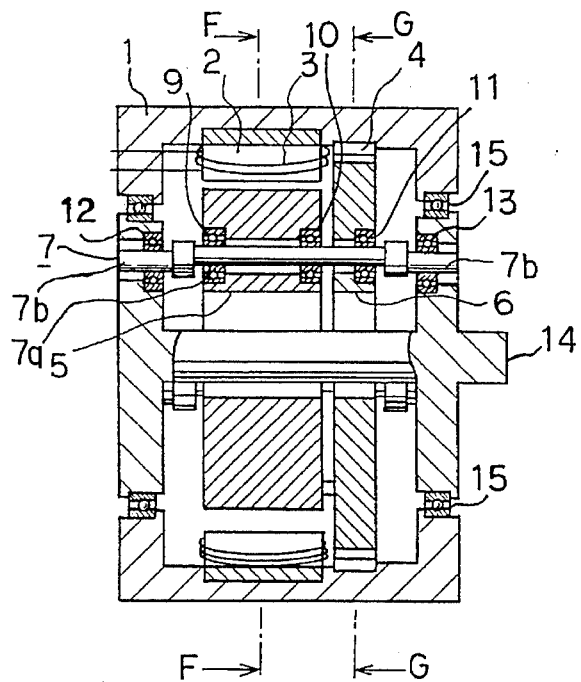
FIG. 1 is a sectional view showing a conventional variable air-gap type driving device.
Figure 2A:
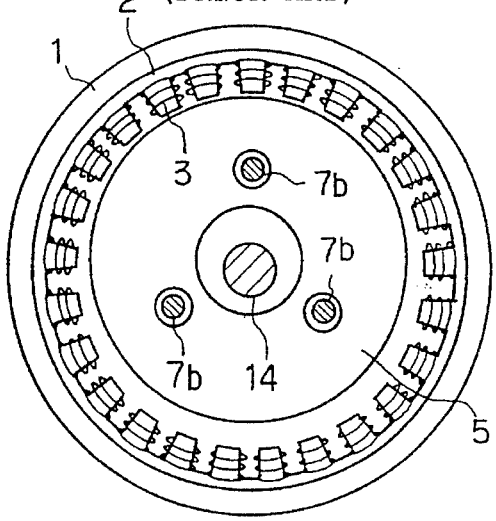
FIG. 2 (a) is a sectional view taken on line F—F of FIG. 1, and FIG. 2 (b) is a sectional view taken on line G—G of FIG. 1.
Figure 2B:
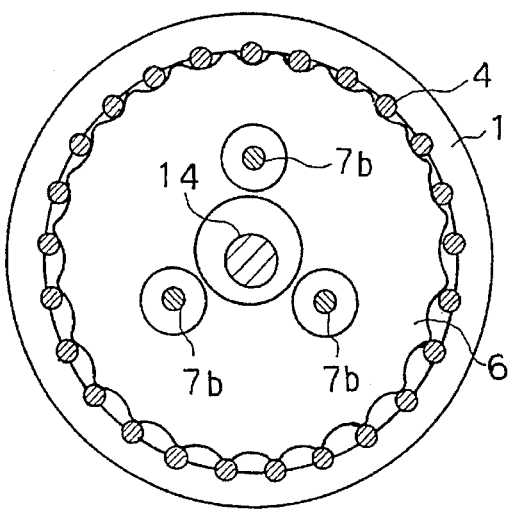
Figure 3:
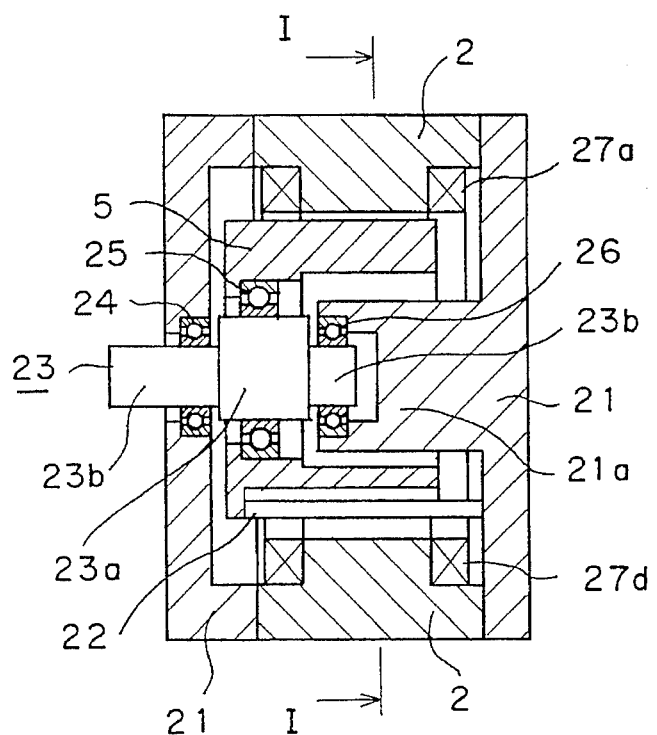
FIG. 3 is a sectional view showing an embodiment 1 of the variable air-gap type driving device of the present invention.
Figure 4:
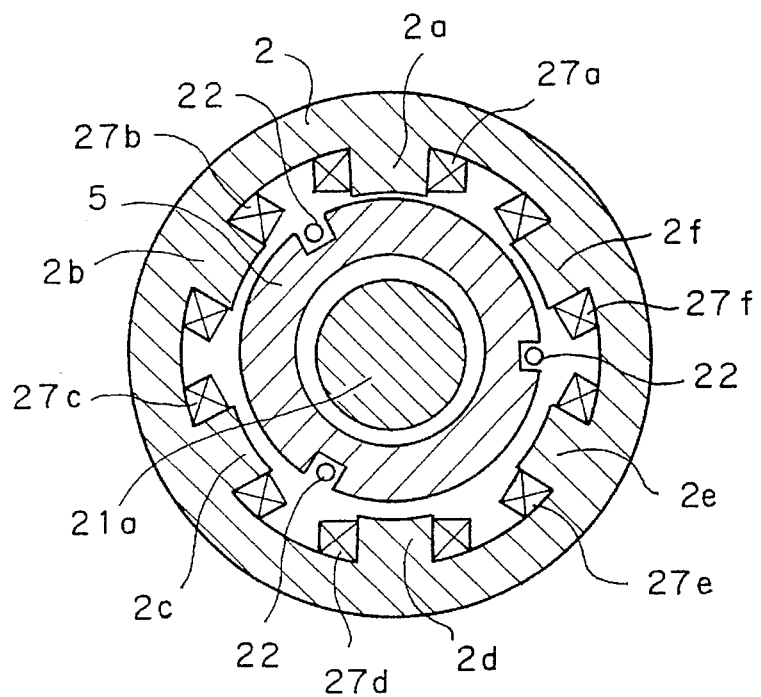
FIG. 4 is a sectional view taken on line I—I of FIG. 3.

FIG. 3 is a sectional view showing an embodiment 1 of the variable air-gap type driving device of the present invention, and FIG. 4 is a sectional view taken on line I—I of FIG. 3. In following drawings, those parts denoted the same reference numerals as those of the conventional variable air-gap type driving device will not be explained, since they are identical or equivalent.

Reference numeral 21 denotes a base stand where a rotor 5 is fixed. Numeral 21a denotes a projecting shaft part for bearing, composed of an extending member fixed in a body and projected at a center part of one side surface of the base stand 21. Numeral 22 denotes parallel rod springs (elastic supporting means), whose one side ends are supported by the base stand 27, supporting the rotor 5 in a state of restricting the autorotation of the rotor 5. Numeral 23 denotes a crank (an eccentric supporting means) whose rotation shaft 23b is supported on the base stand 21 in a freely rotatable state through bearings 24 and 26, and the outside of whose eccentric shaft 23a is supported on the inside of the rotor 5 through a bearing 25, and further whose rotation shaft 23b rotates with the revolution of the rotor 5. Numerals 27a–27f denote coils for generating magnetic fields, which are wound round projections (inner peripheral surface part) 2a–2f of an armature 2 respectively.

The operation of the embodiment will be described now.

Imposing electricity to the coils 27a–27f of the armature 2 one by one generates electromagnetic attractive force from the armature 2 to the rotor 5. Accordingly, the rotor 5 revolves round the central point of the crank 23 inside the armature 2 in obedience with the direction of the electromagnetic attractive force.

As the rotor 5 is supported by three parallel rod springs 22 whose one side ends are supported on the base stand 21, however, the rotor 5 can revolve by the plasticity of the parallel rod springs 22, but cannot autorotate.

The principle of the revolution of the rotor 5 will be explained now.

Figure 5:
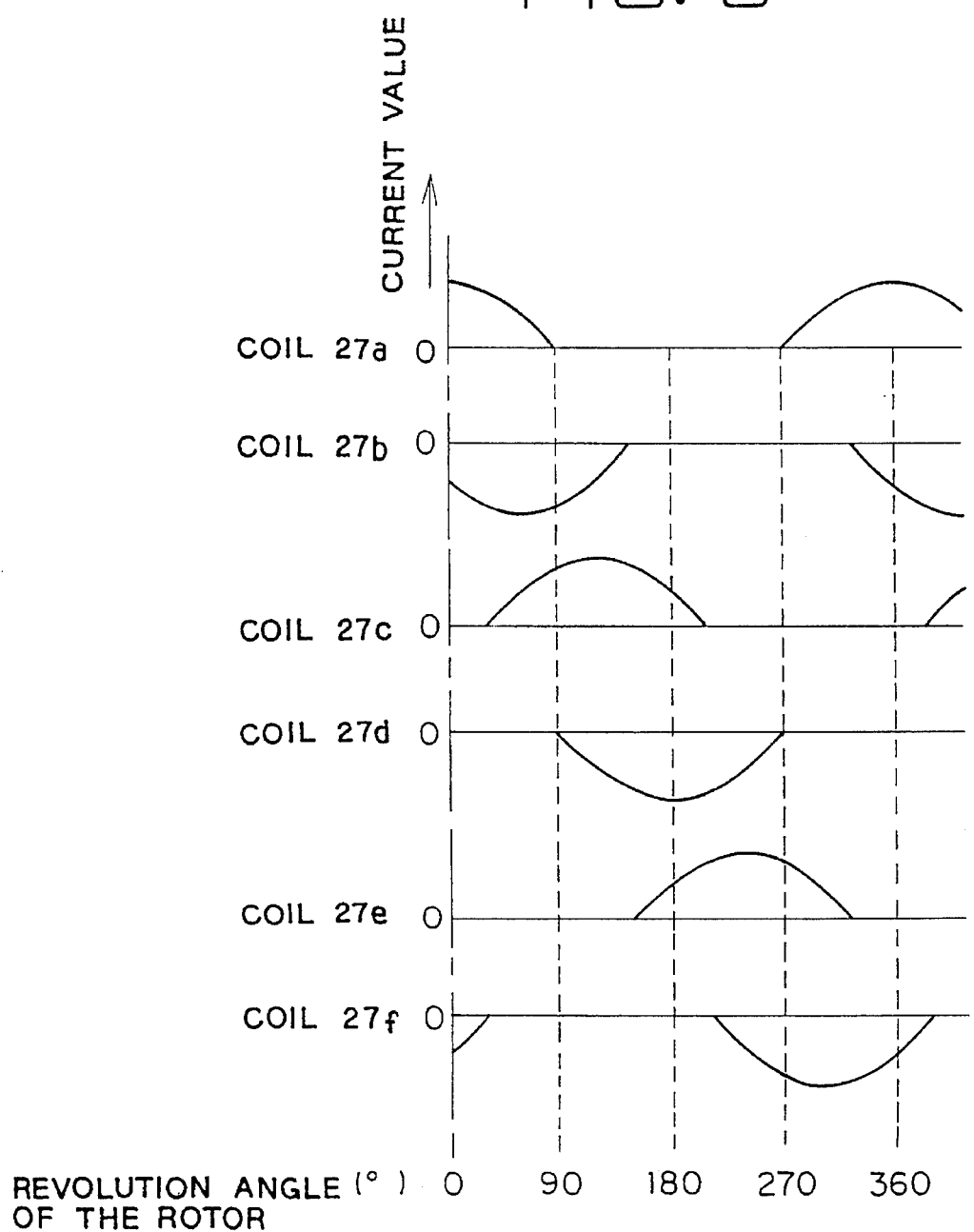
FIG. 5 is a waveform chart showing a change of current flowing in each coil 27a–27f.

First of all, FIG. 5 is a waveform chart showing a change of current flowing in each coil 27a–27f. In FIG. 5, the axis direction of ordinates denotes the current magnitudes flowing in each coil 27a–27f, and the axis direction of abscissas denotes the revolution angles of the rotor 5 (directions of the electromagnetic attractive force working on the rotor 5 by the armature 2). The angle increases clockwise from 0° at the right upper direction in FIG. 4. Also, the waveforms of each coil 27a–27f shown in FIG. 5 are half-waveforms of sine waves, and the phases of each coil 27a–27f are shifted between each adjoining one. Further, the current values shown in FIG. 5 are the values in case of setting the winding directions of each coil 27a–27f are all same.

Further more, the directions of currents flowing in adjoining coils are set to be opposite each other, and magnetic circuits are set to be produced between adjoining poles of the armature 2 (inward projections 2a–2f).

Consequently, currents flowing in each coil 27a 27f, shown in FIG. 5, make the central direction angle of the electromagnetic attractive force increase clockwise with time and make the rotor 5 revolve clockwise. (Inversely, the change of currents, flowing in each coil 27a–27f, decreasing the above mentioned angle makes the rotor 5 revolve counterclockwise.)

As the current patterns shown in FIG. 5 are periodic, the rotor 5 continuously revolves clockwise or counterclockwise by the repeated increasing or decreasing of the attraction angles by the electromagnetic attractive force.

The rotor 5 revolves in such a way. With the revolution of rotor 5 revolves the eccentric shaft 23a of the crank 23, since the outside of the eccentric shaft 23a of the crank 23 is supported on the inside of the rotor 5 through the bearing 25. As a result, the rotation shaft 23b of the crank 23 rotates.

Consequently, the revolution movement of the rotor 5 can be extracted from the rotation shaft 23b of the crank 23 as a rotation movement.

Besides, the voltage or the current patterns working on the coils of FIG. 5 are not defined half-waveforms shown in the drawing, but appropriate waves such as a rectangular wave and a triangular wave can be also applied. These appropriate waves attain identical effects. Further, the waver forms are changed according to the disposition of the magnetic poles axed the composition of the magnetic circuit.

In the embodiment 1 has been described the eccentric supporting means using a crank, but the eccentric supporting means can be constituted with an eccentric ring. So, the eccentric ring can attain identical effects.

EMBODIMENT 2

Figure 6:
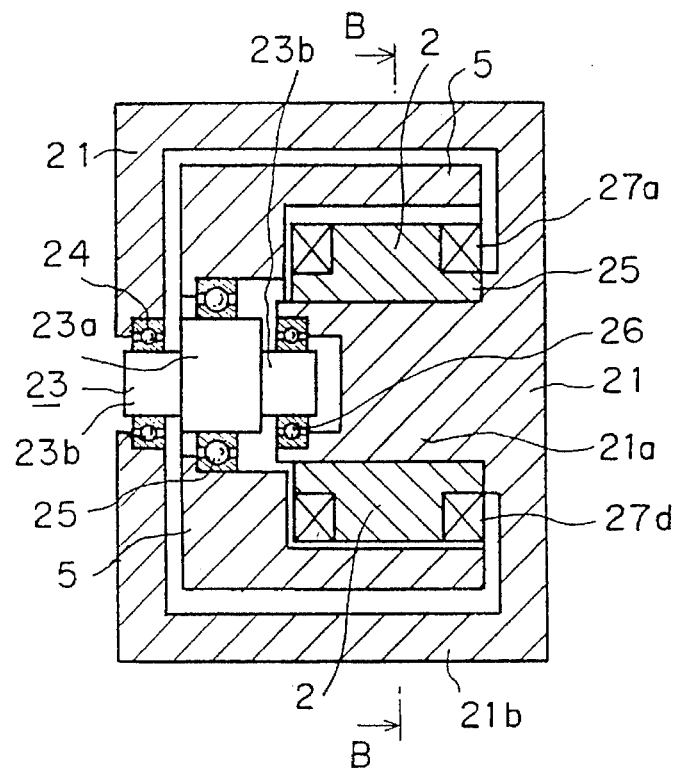
FIG. 6 is a sectional view showing an embodiment 2 of the variable air-gap type driving device of the present invention.
Figure 7:
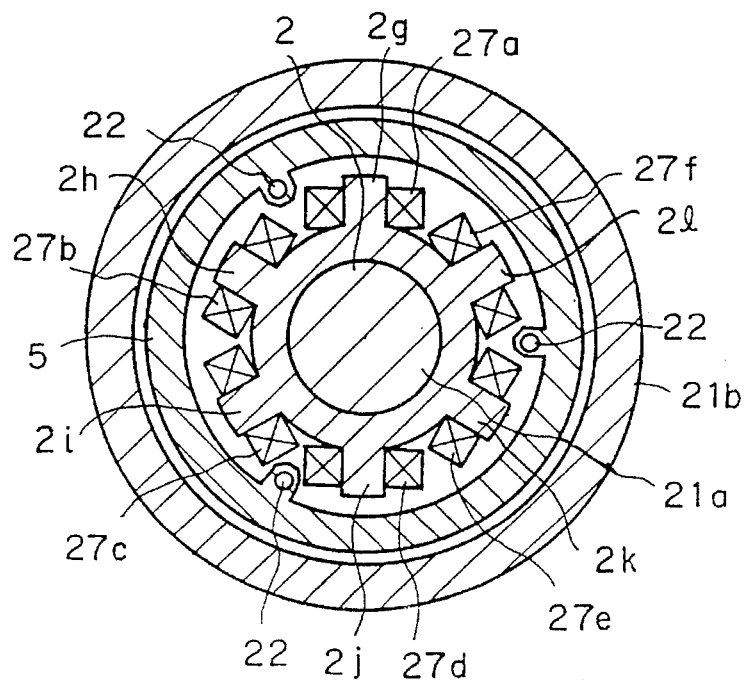
FIG. 7 is a sectional view taken on line B—B of FIG. 6.

Though in the embodiment 1 has been described the variable air-gap type driving device arranging the rotor 5 inside the armature 2 and arranging coils 27a–27f, generating magnetic fields, around the inward projections 2a–2f (inner peripheral surface parts) of the rotor 2, as shown in FIG. 6 and FIG. 7 (a sectional view taken on B—B line of FIG. 6), the variable air-gap type driving device arranging the rotor 5 outside the armature 2 and arranging coils 27a–27f, generating magnetic fields, around the outward projections 2g–2l (outer peripheral surface parts) of the rotor 2 can be realized and it attains identical effects.

In further detailed description of this embodiment 2 is formed in one body a cylindrical peripheral wall part 21b, whose one end is provided with a hole, on the outer peripheral of the base stand 21. And the rotor 2 is inserted and supported on a projection shaft part 21a of the base stand 21. The outward projections 2g–2l (electrode parts) are attached in a projected state with separation, a prescribed distance, on the outer peripheral surface of the armature 2, and on these outward projections 2g–2l are wound coils 27a–27f respectively. Then the rotor 5 is inserted in a freely rotatable state between the outer peripheral of the rotor 2 and the cylindrical peripheral wall part 21b of the base stand 21.

Consequently, the embodiment 2 takes the state in which the armature 2 is attached inside the cylindrical rotor 5 and the coils 27a–27f are assembled on the outer peripheral surface of the armature 2, therefore the assembly of the coils 27a–27f of the embodiment 2 becomes easier than that of the embodiment 1.

As for the operation of the embodiment 2, the principle of the revolution movement of the rotor 5 is identical to that of the embodiment 1 though the arrangement of the rotor 5 and the armature 2 is different between the two.

Accordingly, the sequential excitation of the coils 27a–27f generates electromagnetic attractive force in order from the armature 2 to the rotor 5, hereby the rotor 5 is revolved axed the rotation shaft 23b of the crank 23 is rotated.

EMBODIMENT 3

In the embodiments described above was explained the variable air-gap type driving device equipped with the armature 2 arranged in axis symmetry, but the armature 2 can be arranged asymmetrically as shown in FIG. 8 and FIG. 9 (a sectional view taken on line D—D of FIG. 8).

Because the rotor 5 has some directions where the electromagnetic attractive force from the armature 2 is not worked on, however, in the embodiment 3 is supported the rotor 5 by parallel rod springs 22a–22d in order that elastic repulsive force works on an opposite direction to the electromagnetic attractive force, generated by the armature, for compensating the luck of the electromagnetic attractive force. Hereby, the rotor 5 is continuously revolved, like the embodiments described above, by manipulating the voltage and the current imposed oil coils 27a and 27b, and further the rotation shaft 23b of the crank 23 can be rotated by that.

EMBODIMENT 4

Figure 11:
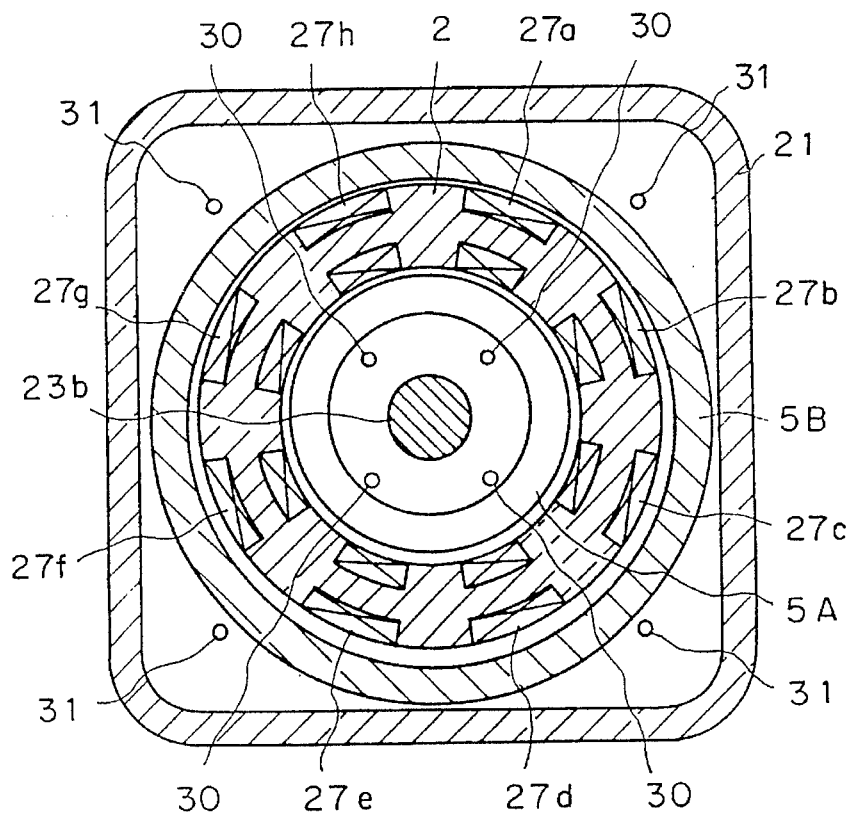
FIG. 11 is a sectional view taken on line E—E of FIG. 10.
Figure 12:
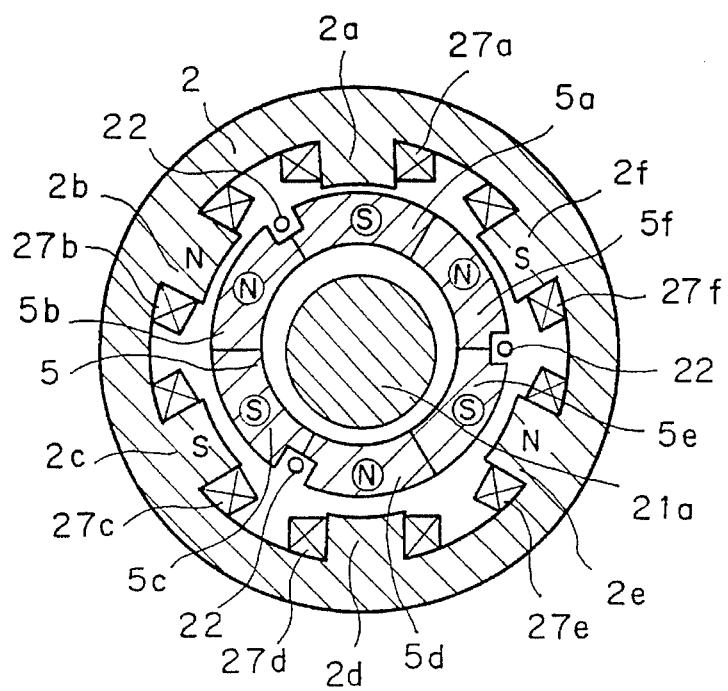
FIG. 12 is a sectional view taken on line I—I of FIG. 3.

FIG. 10 is a sectional view showing an embodiment 4 of the variable air-gap type driving device of the present invention, and FIG. 11 is a sectional view taken on line E—E of FIG. 10.

In FIG. 10 and FIG. 11, reference numeral 5A denotes the first rotor arranged inside the armature 2 and revolved by the electromagnetic attractive force generated by the armature 2. And, numeral 5B denotes the second rotor arranged outside the armature 2 and revolved by the electromagnetic attractive force, generated by the armature 2, in a state phase-shifted by half a period to the first rotor 5A.

Besides, numeral 30 denotes parallel rod springs (elastic supporting means), whose one side ends are supported on the base stand 21, for supporting the first rotor 5A in order to restrict the autorotation of the first rotor 5A. Numeral 31 denotes parallel rod springs (elastic supporting means), whose one side ends are supported on the base stand 21, for supporting the second rotor 5B in order to restrict the autorotation of the second rotor 5B. Numeral 32 denotes a crank whose rotation shafts 32b are supported on the base stand 21 in a freely rovolvable state through bearings 33 and 36, the outsides of whose first and second eccentric shaft 32c and 32d, phase-shifted by half a period each other, are supported inside the first rotor 5A and the second rotor 5B respectively, and further whose rotation shafts 32b rotate with the revolution of the first rotor 5A and the second rotor 5B.

The operation of the embodiment 4 of the variable air-gap type driving circuit of the present invention will be described now.

The rotors 5A and 5B in the embodiment 4 revolve following the identical principle to the rotor 5 in the above mentioned embodiments, hereby the rotation shafts 32b of the crank 32 rotate.

As the first rotor 5A and the second rotor 5B are supported on the eccentric shafts of the crank 32 (on the first eccentric shaft 32c and the second eccentric shaft 32d respectively) phase-shifted by half a period (180°) each other, however, the directions of the electromagnetic attractive force generated by the armature 2 are phase-shifted by 180° each other.

Consequently, for example, when the first rotor 5A is at the right upper position and the air-gap width is narrowest, the second rotor is at the right lower position and the air-gap width becomes narrowest.

Accordingly the first rotor 5A and the second rotor 5B are attracted by the opposite direction electromagnetic attractive forces always, so the forces to work on the crank 32 are balanced and the mass unbalance observed from the rotation center of the crank 32 is dissolved. Then, the vibration and the noise of the variable air-gap type driving device of the embodiment becomes a low level.

Besides, as the electromagnetic attractive forces work on both of the first rotor 5A and the second rotor 5B, the active area of the electromagnetic attractive forces to the rotors becomes larger. Hereby, generated torque becomes larger.

EMBODIMENT 5

Though the rotors not magnetized have been described in the embodiments mentioned above, the rotor 5, divided in the circumference direction, magnetized corresponding to each magnetic poles (inward projections) 2a–2f of the armature 2, as shown in FIG. 72 (a sectional view taken on line I—I of FIG. 3), may be also applicable.

Describing further concretely, a part 5a corresponding to magnetic pole 2a is magnetized to be an S pole, a part 5b corresponding to magnetic pole 2b is magnetized to be an N pole, a part 5c corresponding to magnetic pole 2c is magnetized to be an S pole, and so on.

In this case, if the current is flown in coils 27b, 27c, 27e and 27f, electromagnetic attractive forces work on the part 5e corresponding to the magnetic pole 2e of the rotor 5 and the part 5f corresponding to the magnetic pole 2f, and electromagnetic repulsive forces work on the part 5a corresponding to the magnetic pole 2a and the part 5b corresponding to the magnetic pole 2b.

Consequently, the magnetic forces worked on the rotor 5 can be enlarged in this embodiment, so the generated torque can be enlarged.

EMBODIMENT 6

Figure 13:
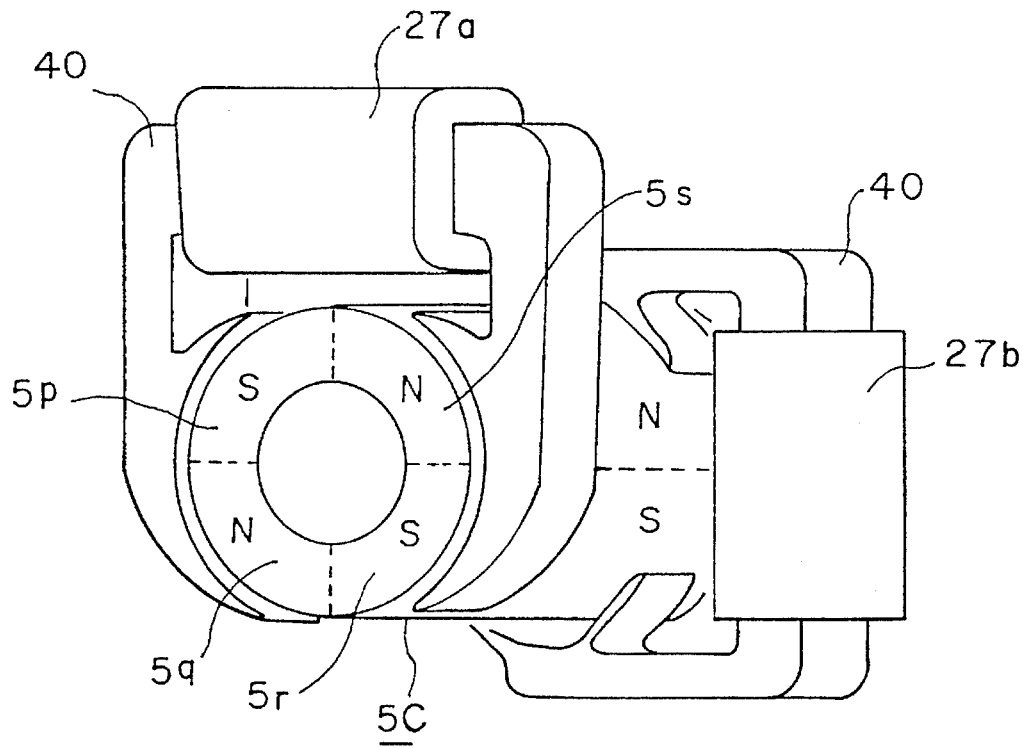
FIG. 13 is a perspective view showing only a magnetic circuit of an embodiment 6 of the variable air-gap type driving device of the present invention.

FIG. 13 is a perspective view showing only a magnetic circuit of an embodiment 6 of the variable air-gap type driving device of the present invention. In FIG. 13 reference numeral 40 denotes an armature for generating an magnetic field alternating between the perpendicular direction and the horizontal direction. And, numeral 5C denotes a rotor, disposed inside the armature 40, revolved by the electromagnetic attractive force and the electromagnetic repulsive force induced by the magnetic field generated by the armature 40. Then, the rotor 5C, whose circumference is divided into 4 parts extending over the whole axial length, is magnetized.

The operation of the embodiment 6 will be described now.

First, a perpendicular magnetic field is generated by passing a positive or a negative current through the coil 27a, and horizontal magnetic field is generated by passing a positive or a negative current through the coil 27b.

Accordingly, tile rotor 5C can be revolved by passing the positive or the negative current through the coil 27a and 27b alternately in following the principle identical to the embodiments mentioned above.

Besides, the electromagnetic attractive force is made to work on all directions of the rotor 5C in this case, so the elastic repulsive force produced by the parallel rod springs 22a–22c used ill the embodiment 3 is not required.

By the way, the variable air-gap type driving device equipped with the rotor 5C magnetized in four divided parts and the armature 40 generating the perpendicular and the horizontal magnetic fields has been explained in the embodiment 6, but any rotor and any armature generating different plural magnetic fields can be applicable to the present invention. So, the rotor and armature are not restricted to the above mentioned ones.

EMBODIMENT 7

Figure 14:
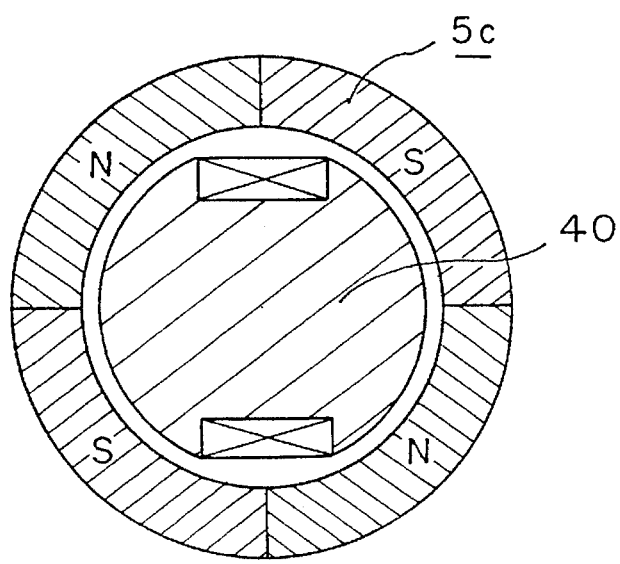
FIG. 14 is a sectional view showing an embodiment 7 the variable air-gap type driving device of the present invention.

The variable air-gap type driving device arranged the rotor 5C inside the armature 40 has been explained in the embodiment 6. However, the variable air-gap type driving device arranged the rotor 5C outside the armature 40 may be realized, as shown in FIG. 14, and the driving device also attains the identical effects.

EMBODIMENT 8

Figure 15:
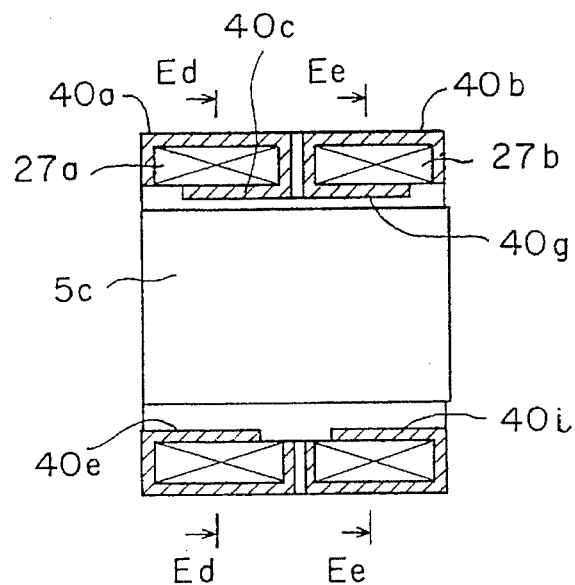
FIG. 15 is a sectional view showing only a magnetic circuit of an embodiment 8 of the variable air-gap type driving device of the present invention.
Figure 16A:
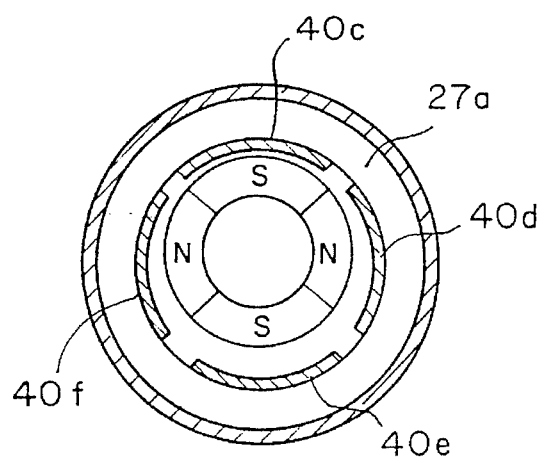
FIG. 16 (a) is a sectional view taken on line Ed—Ed of FIG. 15, and Fig 16 (b) is a sectional view taken on Line Ee—Ee of FIG. 15.
Figure 16B:
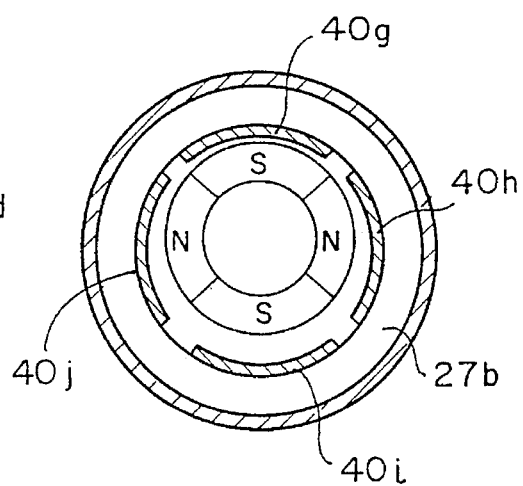

FIG. 15 is a sectional view showing only a magnetic circuit of an embodiment 8 of the variable air-gap type driving device of the present invention. FIG. 16 (a) is a sectional view taken on line Ed—Ed of FIG. 15, and FIG. 16 (b) is a sectional view taken on line Ee—Ee of FIG. 15. Further, FIG. 17 is a partially broken perspective view showing an armature and a coil.

In the embodiment 8, the rotor 5C is magnetized in four poles on its circumference like that of the embodiment 7, and the two hollow-ring-shaped armatures 40a and 40b, equipped with corresponding four poles on their peripherals, is arranged in the axial direction.

Figure 17:
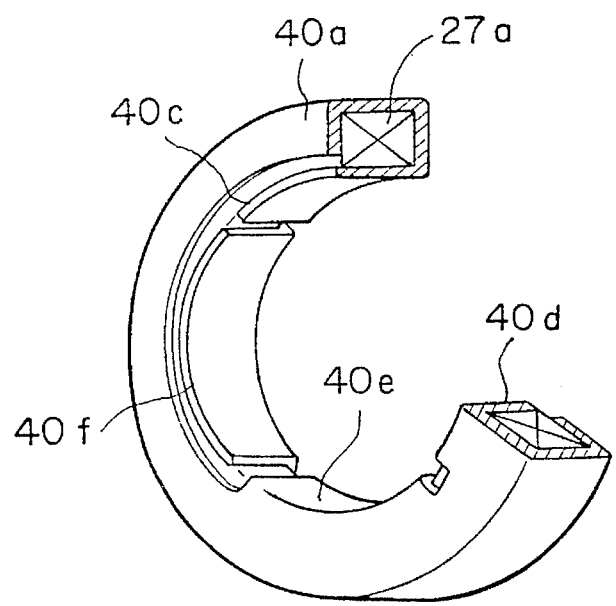
FIG. 17 is a partially broken perspective view showing an armature and a coil.

The sections of the hollow-ring-shaped armatures 40a and 40b are formed to partly broken rectangles whose broken parts' positions on their circumference are different, as shown in FIG. 17. In the armature 40a, poles 40c and 40f are connected to the armature 40a from the central part side of the device, and poles 40d and are connected to the armature 40a from the end side of the device.

Therefore, the current flowing in the coil 27a generates one pole in 40c and 40f and the other pole in 40d and 40e.

Besides, in the armature 40b, poles 40g and 40h are connected to the armature 40b from the central part side of the device, and poles 40i and 40j are connected to the armature 40b from the end side of the device.

Therefore, the current flowing in the coil 27b generates one pole in 40g and 40h and the other pole in 40i and 40j.

As the embodiment is composed as mentioned above, two-direction oriented positive and negative forces intersected at right angles each other work on the rotor 5C by passing the current through the coils 27a and 27b. Hereby, the rotor 5C is revolved.

In this method, the armatures 40a and 40b can be manufactured by the press processing of metal plates, and the armatures 40a and 40b can be constructed of two hollow-ring-shaped ones. Therefore, the armatures 40a and 40b can be manufactured cheaply.

EMBODIMENT 9

Figure 18:
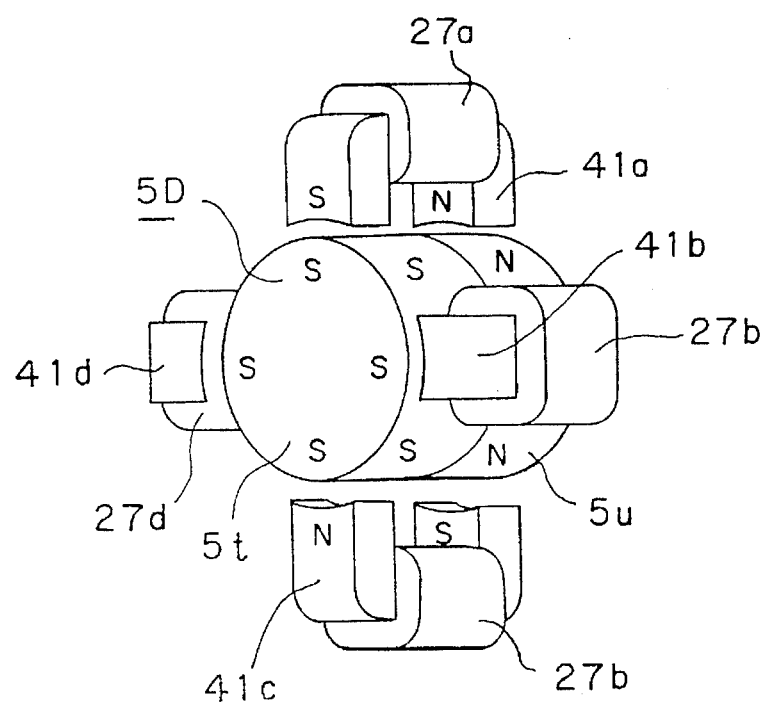
FIG. 18 is a perspective view showing only a magnetic circuit of an embodiment 9 of the variable air-gap type driving device of the present invention.

FIG. 18 is a perspective view showing only a magnetic circuit of an embodiment 9 of the variable air-gap type driving device of the present invention. In FIG. 18, reference numeral 5D denotes a rotor having different magnetic poles 5t and 5u in the axial direction. Numeral 41a and 41c denote a pair of armatures, arranged opposite each other in a state putting the rotor 5D between them, for producing an electromagnetic force by generating magnetic fields having opposite directions each other concerning the horizontal direction of the rotor 5.

The operation of the embodiment 9 will be described now.

In the embodiment 9, as the armature 41a and 41c, arranged opposite, generate opposite-direction-oriented magnetic fields each other as mentioned above, for example when the armature 41 a generates an electromagnetic attractive force, the armature 41c generates an electromagnetic repulsive force. The armatures 41b and 41d are identically operated.

Consequently, the rotor 5D also revolves like the embodiments mentioned above in this case.

Besides, a desired magnetic force is obtained by passing the current having same magnitudes and opposite directions through the coils 27a and 27c and coils 27b and 27d in this case, so the desired magnetic force is obtained by connecting two pairs of coils, connected each two coil respectively, to a common power supply.

EMBODIMENT 10

Though the elastic supporting means of the embodiments described above are composed of the parallel rod springs 22, the elastic supporting means can be composed of bent-processed leaf springs 42a–42d permitting the movements in a plane intersecting at right angles with the revolution axis of the rotor, as shown in FIG. 19–FIG. 21.

In this case, too, the rotor S revolves inside the armature 2, but if the rotor 5 moves to the perpendicular direction, the C part leaf springs of the bent-processed leaf springs 42a and 42c and the B part leaf springs of the bent-processed leaf springs 42b and 42d are deformed; and if the rotor 5 moves to the horizontal direction, the B part leaf springs of the bent-processed leaf springs 42a and 42c and the C part leaf springs of the bent-processed leaf springs 42b and 42d are deformed.

Accordingly, the rotor 5 can move in a plane intersecting at right angles with its axis without large resistance, but it cannot autorotate around its own central point and it cannot move in its axial direction.

Besides, plural bent-processed leaf springs are used in this embodiment 10, it is also possible to constitute the springs by assembling a leaf spring formed plural spring parts by bent-processing the leaf spring.

EMBODIMENT 11

Though the elastic supporting means composed of the parallel rod springs 22 have been shown in the embodiments 1–9 described above, the elastic supporting means composed of a diaphragm-shaped leaf spring 43, shown in FIG. 22, supporting the rotor 5 capable of oscillating around the leaf spring 43 may be applicable, and it attains identical effects to the embodiments mentioned above.

Besides, the thickness of the spring part in this embodiment can be formed to be thin by using the diaphragm-shaped leaf spring 43.

EMBODIMENT 12

Figure 23:
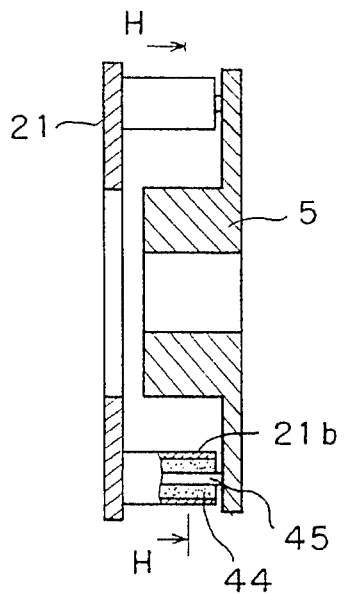
FIG. 23 is a sectional view showing an embodiment 12 the variable air-gap type driving device of the present invention.
Figure 24:
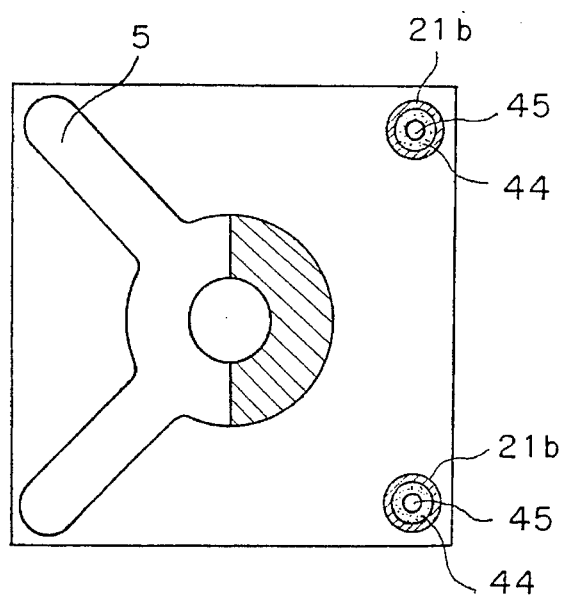
FIG. 24 is a sectional view showing an embodiment 13 the variable air-gap type driving device of the present invention.

Though the elastic supporting means composed of the parallel rod springs 22 have been shown in the embodiments 1–9 described above, the elastic supporting means composed of plural cylindrical rubber bushes (elastic bodies) 44, shown in FIG. 23 and FIG. 24, may be applicable, and it attains identical effects to the embodiments mentioned above.

The rubber bushes 44 are attached by being arranged into the boss holes formed in the cylindrical peripheral wall parts 21b of the base stand 21 and by being inserted with pins 45 into the central points of the bushes 44.

Thus, the embodiment can be realized cheaply by replacing the elastic supporting means with the rubber bushes 44.

Besides, the material of the rubber bushes 44 is not restricted to the rubber, but appropriate elastic materials are applicable.

EMBODIMENT 13

Figure 25:
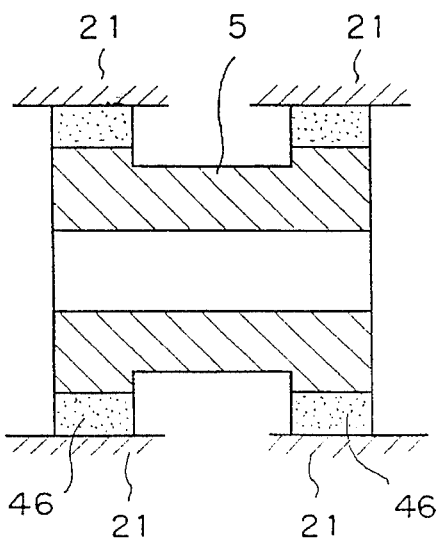
FIG. 25 is a sectional view showing an embodiment 13 the variable air-gap type driving device of the present invention.
Figure 26:
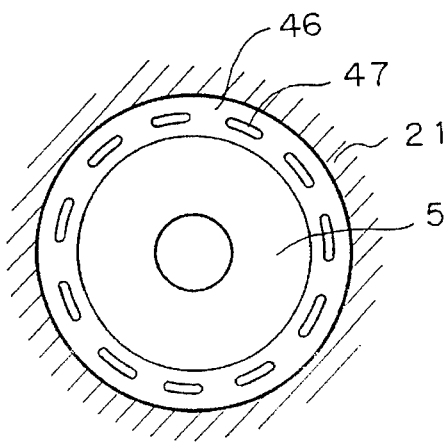
FIG. 26 is a sectional view showing an embodiment 13 the variable air-gap type driving device of the present invention.

Though the elastic supporting means composed of the parallel rod springs 22 have been shown in the embodiments 1–9 described above, the elastic supporting means composed of a hollow-ring-shaped rubber (an elastic body) 46, shown in FIG. 25 and FIG. 26, may be applicable, and it attains identical effects to the embodiments mentioned above. Reference numeral 47 now denotes slits cut into the axial direction.

In this embodiment, as the rubber 46 is equipped with slits 47, the rubber 46 is easily deformed to radial directions. Consequently, the rotor 5 can move in a plane intersecting at right angles with its axis without large resistance, but it cannot autorotate around its own central point and it cannot move in its axial direction. Hereby, the rubber 46 brings about identical effects to the elastic supporting means of the embodiments mentioned above.

By the way, the rotors 5 of the embodiments 1–9 is supported on one sides, but the rotor 5 of this embodiment is supported on both sides. Anyway, both of the supporting methods are available, and the construction of the embodiment except the elastic supporting means parts can be formed identical to those of the embodiments 1–9.

EMBODIMENT 14

Figure 27:
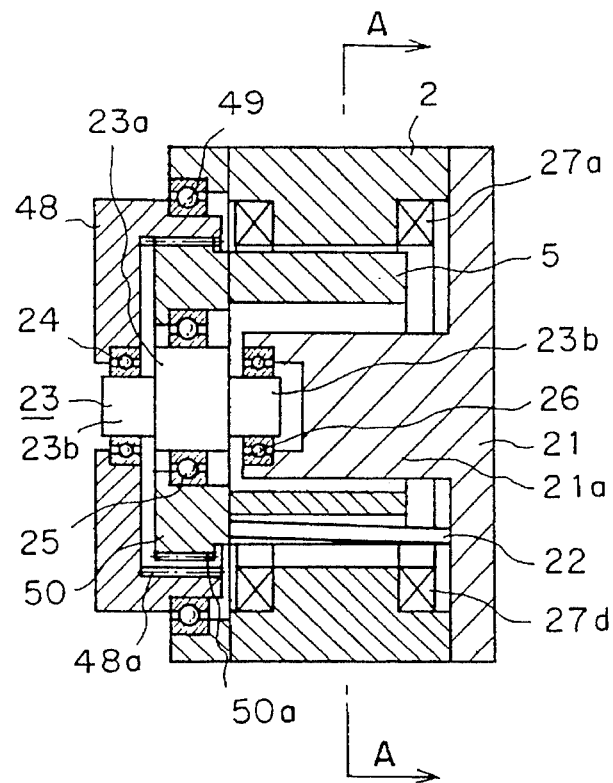
FIG. 27 is a sectional view showing an embodiment 14 the variable air-gap type driving device of the present invention.
Figure 28:
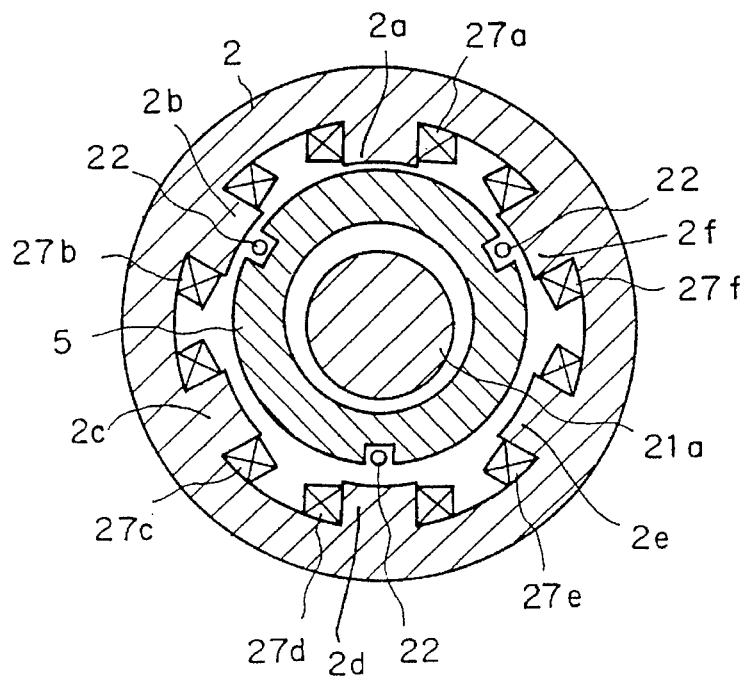
FIG. 28 is a sectional view taken on line A—A of FIG. 27.

FIG. 27 is a sectional view showing an embodiment 14 of the variable air-gap type driving device of the present invention, and FIG. 28 is a sectional view taken on line A—A of FIG. 27.

In FIG. 27 and FIG. 28, reference numeral 48 denotes the first gear supported on the base stand 21 in a freely rotatable state through bearings 49. Numeral 48a denotes internal teeth provided on the inside of the first gear 48. Numeral 50 denotes the second gear, linked with the rotor 5, for rotating the first gear 48 by revolving inside the first gear 48 with the revolution of the rotor 5. And, numeral 50a denotes external teeth provided on the outside of the second gear 50.

The operation of the embodiment 14 will now be described.

However, the operation of this embodiment before the rotor 5 revolves is same as that of the embodiment 1, so any repetitive description thereof is omitted.

The revolution of the rotor 5, brought about by the identical way in the embodiment 1, revolves the second gear 50 with the revolution of the rotor 5, since the second gear 50 is linked with the rotor 5.

Accordingly, the second gear 50 revolves inside the first gear 48. Since the internal teeth 48a are equipped inside the first gear 48 and the external teeth 50a are equipped outside the second gear 50a, the internal teeth 48a and the external teeth 50a engage each other. Therefore, the revolution of the second gear 50 rotates the first gear 48 by the difference of the teeth number between the first gear 48 and the second gear 50, and then the revolution movement of the rotor 5 can be extracted from the first gear 48 as a rotation movement.

Namely, the second gear 50 and the first gear 48 compose the differential gear mechanism.

EMBODIMENT 15

Figure 29:
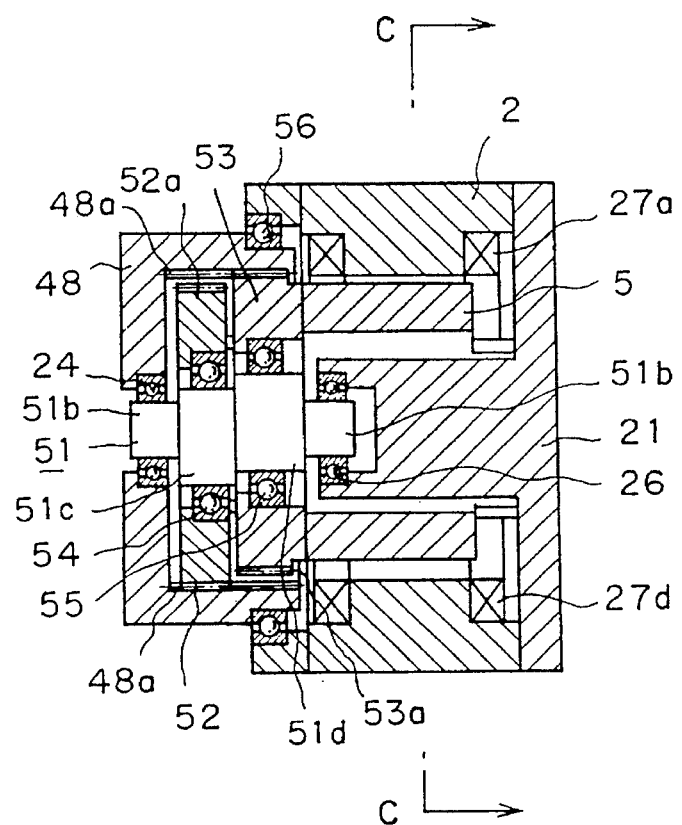
FIG. 29 is a sectional view showing an embodiment 15 of the variable air-gap type driving device of the present invention.

FIG. 29 is a sectional view showing an embodiment 15 of the variable air-gap type driving device of the present invention. And, FIG. 30 is a sectional view taken on line C—C of FIG. 27.

Figure 30:
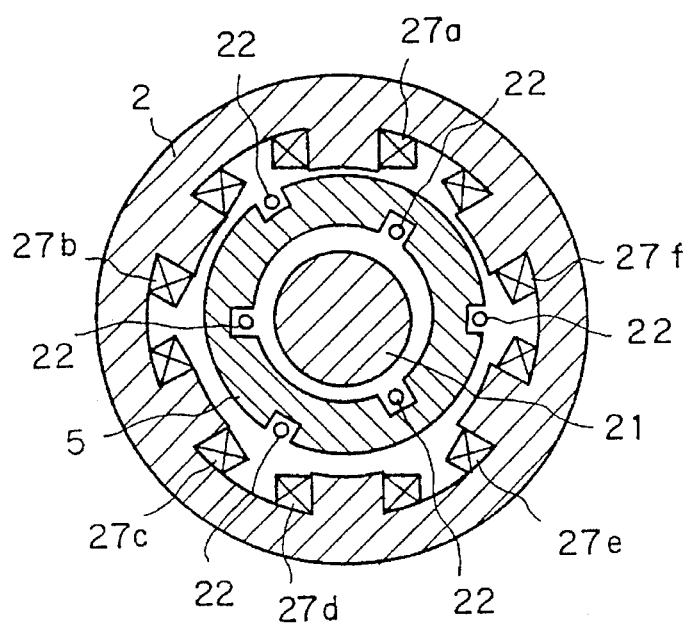
FIG. 30 is a sectional view taken on line C—C of FIG. 27.

In FIG. 29 and FIG. 30, reference numeral 51 denotes a crank (an eccentric supporting means) equipped with plural phase-different (180° in this example) eccentric shafts 51c and 51d. Numeral 52 denotes the second gear supported outside the eccentric shaft 51c of the crank 51 through bearings 54. Numeral 52a denotes external teeth. Numeral 53 denotes the second gear supported outside the eccentric shaft 51c of the crank 51 through bearings 55. And, numeral 53a denotes external teeth.

The operation of the embodiment 15 will now be described.

The second gear 53 revolves following the identical principle to the embodiment 14. As the second gear 53 is supported by the eccentric shaft 51d of the crank 51, the eccentric shaft 51d of the crank 51 revolves with revolution of the second gear 53.

Besides, as the second gear 52 is supported by the eccentric shaft 51c of the crank 51, the second gear 52 revolves with the revolution of the eccentric shaft 51c.

Accordingly, the first gear 48 revolves by the revolution movement of the second gears 52 and 53 lake in the embodiment 14 mentioned above. But, as the eccentric shaft 51c and 51d are different in phase by 180°, as mentioned above, the revolution movements of the second gears 52 and 53 also become different in phase by 180°.

Hereby, the rotation forces working on the first gear 48 from the second gears 52 and 53 are made to be symmetric with respect to the rotation axis, then the rotation of the first gear 48 becomes smooth.

EMBODIMENT 16

Figure 31:
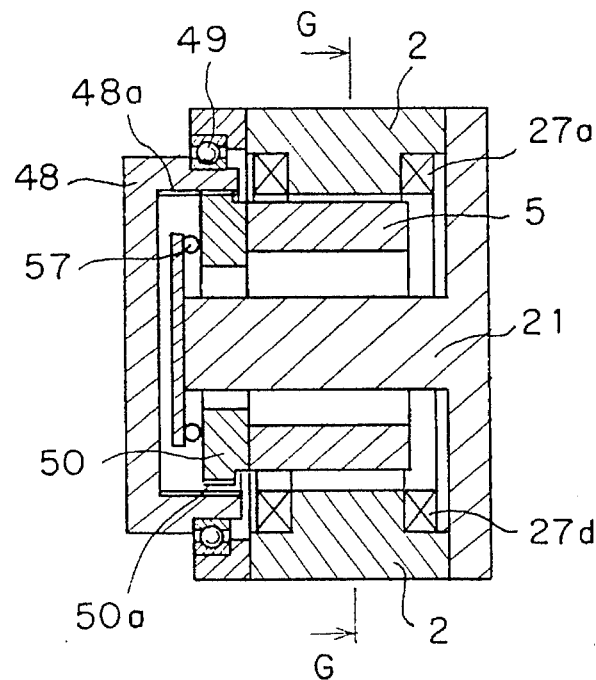
FIG. 31 is a sectional view showing an embodiment 16 of the variable air-gap type driving device of the present invention.

FIG. 31 is a sectional view showing an embodiment 16 of the variable air-gap type driving device of the present invention. And, FIG. 32 is a sectional view taken on line G—G of FIG. 31.

Figure 32:
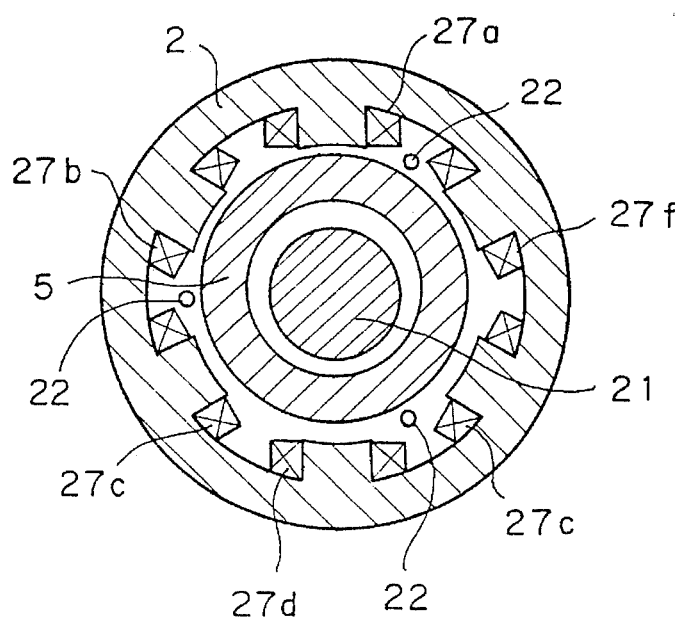
FIG. 32 is a sectional view taken on line G—G of FIG. 31.

In FIG. 31 and FIG. 32, reference numeral 57 denotes a thrust bearings, whose one ends are connected to the base stand 21 and the other ends are connected to the second gear 50, for permitting the movements oriented to the radial directions of the second gear 50 and for restricting the movements oriented to the axial direction of the second gear 50.

In the embodiment 16, the parallel rod springs 22 are compressed in the longish direction to be buckled through the thrust bearings 57. Then the second gear 50 engages with the internal teeth 48a of the first gear 48 in an eccentric state from the central axis by the buckling of the parallel rod springs 22.

Besides, in the embodiment 16, too, the autorotation of the second gear 50 is restricted by the parallel rod springs 22, and the second gear 50 revolves with the revolution of the rotor 5.

The above described construction of the embodiment makes the parts such as a crank and an eccentric ring be needless.

EMBODIMENT 17

Figure 33:
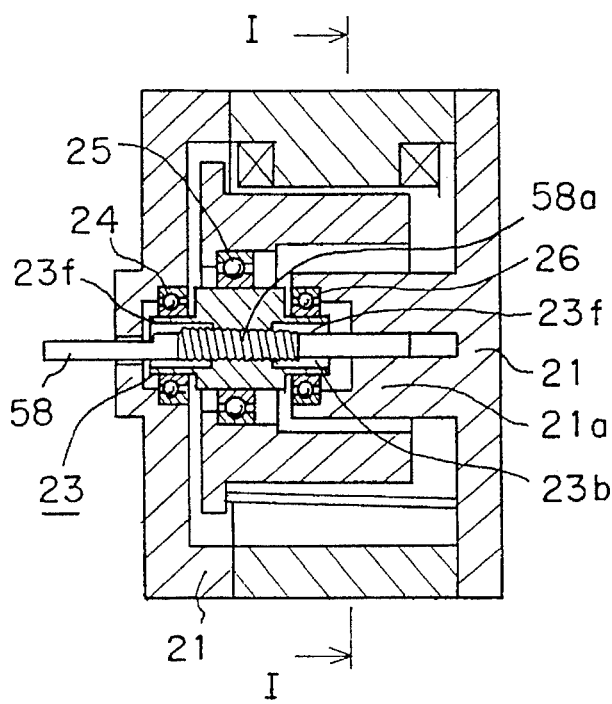
FIG. 33 is a sectional view showing an embodiment 17 of the variable air-gap type driving device of the present invention.
Figure 34:
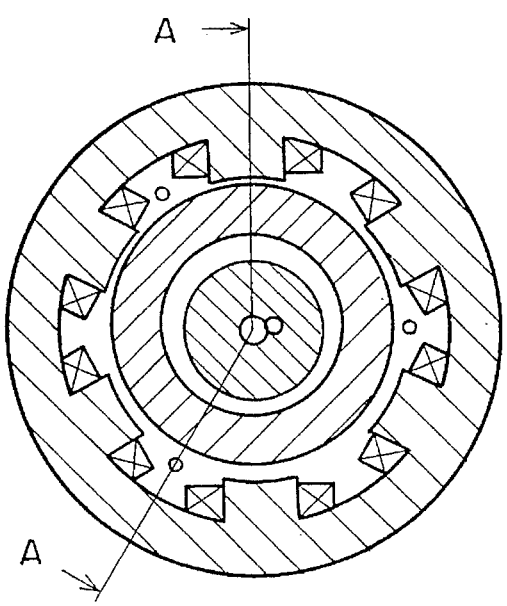
FIG. 34 i s a sectional view taken on line I—I of FIG. 33.

FIG. 33 is a sectional view showing an embodiment 17 of the variable air-gap type driving device of the present invention, and FIG. 34 is a sectional view taken on line I—I of FIG. 33.

In FIG. 33 and FIG. 34, reference numeral 23f denotes a screw equipped in the central part of the crank 23. Numeral 58 denotes a screw slider (a rectilinear movement mechanism) rectilinearly moving with a state engaging with the screw 23f of the crank 23. And numeral 58a denotes a screw.

The operation of the embodiment 17 will now be described.

The rotation shaft 23b of the crank 23 rotates with the revolution of the rotor 5, like the embodiments mentioned above.

Then, the screw 23 and the screw 58a engage each other with the rotation of the rotation shaft 23b. Hereby, the screw slider 58 moves in the axial direction.

EMBODIMENT 18

Figure 35:
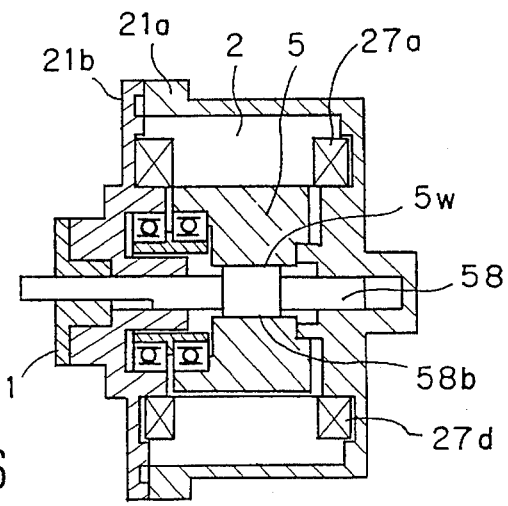
FIG. 35 is a sectional view showing an embodiment 18 of the variable air-gap type driving device of the present invention.

FIG. 35 is a sectional view showing an embodiment 18 of the variable air-gap type driving device of the present invention. In FIG. 35, reference numeral 5w denotes an interior screw equipped inside the rotor 5, and numeral 58b denotes an exterior screw.

The operation of the embodiment 18 will now be described.

First, the exterior screw 58b and the interior screw 5w are formed as the screws having same screw pitches, different lead angles, and further different effective diameters.

Figure 36:
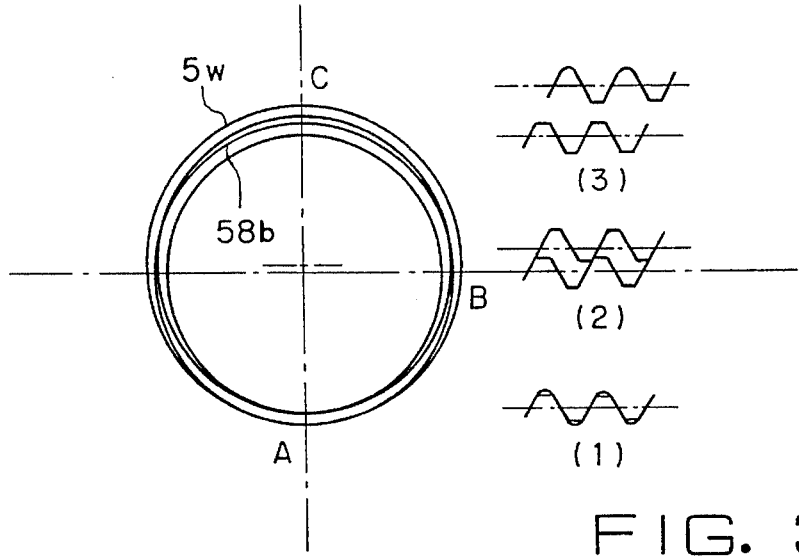
FIG. 36 is a state view showing an engaging state of an external thread and an internal thread.

The exterior screw 58b and the interior screw 5w can be designed to be engaged in a part of their internal periphery and external periphery and not to be engaged in the other parts by appropriately setting the difference of the effective diameters and the eccentricity amount of the rotor 5. FIG. 36 depicts this states. In FIG. 36, FIG. (1) depicts the engaging state at the point A; FIG. (2) depicts the engaging state at the point B; and FIG. (3) depicts the engaging state at the point C.

Figure 37:
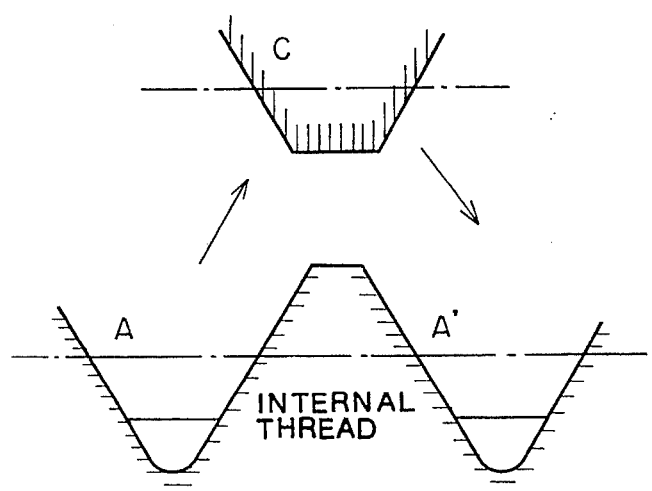
FIG. 37 is a state view showing an engaging state of an external thread and an internal thread.

In this embodiment, the rotor 5 revolves by passing the current through the coils such as coil 27a one after another in the same manner as the embodiments mentioned above. The engaging points of the screws shown in FIG. 36 moves with the revolution of the rotor 5, while the threads of the exterior screw 58b and the interior screw 5w gradually shift each other, since their lead angles are different. In this case, as the interior screw 5w is fixed in the axial direction, the screw slider 58 being free in the axial direction moves. FIG. 37 shows the changing of the engaging state of the external screw 58b viewed from the point existing on the internal screw 5w as a drawing showing this state. In FIG. 37 is shown the state-changing that the external screw 58b, first having existed on the A point where the external screw 58b was in the engaging state with the internal screw 5w (the point A state), comes off from the engaging state with the revolution of the rotor 5, then the external screw 58b moves to the state C shifted in pitch, and after that it is engaged to the internal screw 5w again to move to the state A' shifted by a pitch.

Accordingly, the screw slider 58 can be rectilinearly moved without converting the revolution movement of the rotor 5 into a rotation movement in this embodiment.

EMBODIMENT 19

Figure 38:
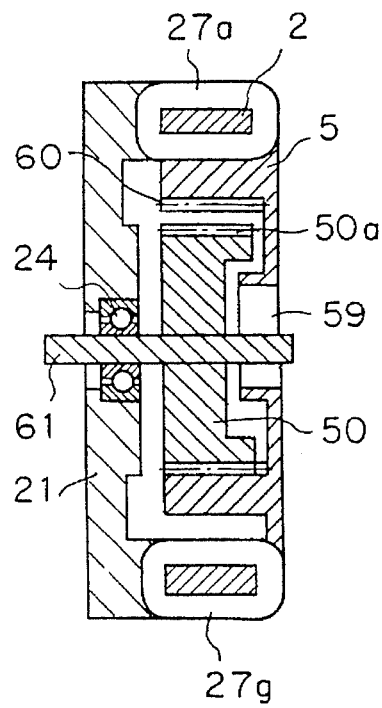
FIG. 38 is a sectional view showing an embodiment 19 of the variable air-gap type driving device of the present invention.
Figure 39:
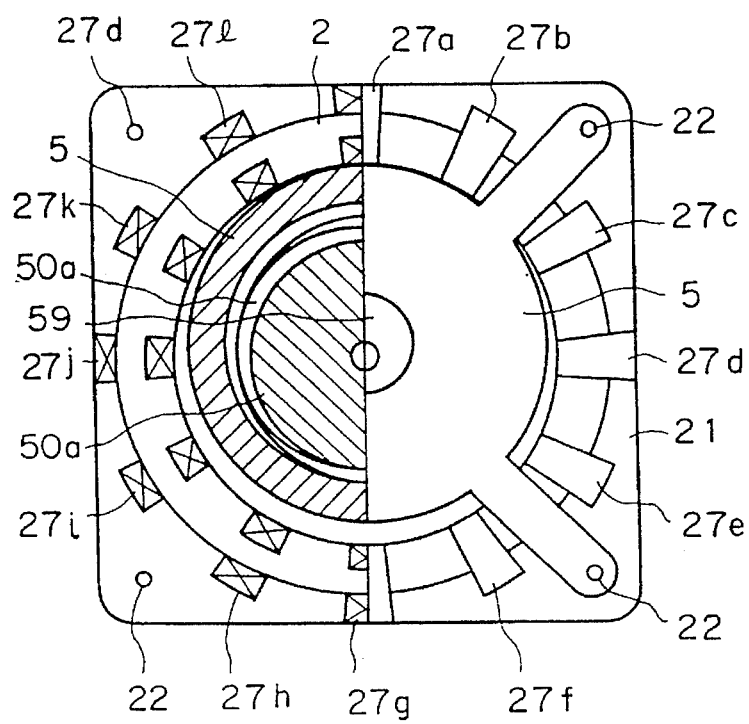
FIG. 39 is a front view of the variable air-gap type driving device shown in FIG. 38 divided at a middle position.

FIG. 38 is a sectional view showing an embodiment 19 of the variable air-gap type driving device of the present invention, and FIG. 39 is a front view of the variable air-gap type driving device shown in FIG. 38 cut off the half of it.

In FIG. 38 and FIG. 39, reference numeral 59 denotes an eccentric hollow ring equipped in the central part of the rotor 5. Numeral 60 denotes internal teeth formed on the inner peripheral surface of the rotor 5. And numeral 61 denotes a gear rotated by engaging with the internal teeth 60 formed on the inkier peripheral surface of the rotor 5 with revolution of the rotor 5.

The operation of the embodiment 19 will now be described.

First, the gear 61, a central axis of rotation, is supported on the central part of the base stand 21 in a freely rotatable state through the bearings 24. The second gear 50, generating an rotation output, is inserted and supported on the gear 61 in a body. Then, the rotor 5 is inserted between the peripheral wall part of the base stand 21 and the second gear 50 in a freely revolvable state.

That is, the rotor 5 forms a cylinder, whose one side surface is opened, equipped with internal teeth 60 different in teeth number from that of the second gear 50 on the inner peripheral surface part in a body. Besides, the eccentric hollow ring 59 is equipped in the central part of the rotor 5 in a body, and the eccentric ring 59 is linked and supported on the other end part of the gear 61.

Hereby, the rotor 5 is revolved by engaging its internal teeth 60 with the external teeth 50a of the second gear 50, and the autorotation of the rotor 5 is restricted by the parallel rod springs 22.

Accordingly, the embodiment 19 does not require the first gear 48, so the embodiment 19 further decreases the number of its parts and becomes compact in size.

Now, slide bearings such as plastics and porous bearing metals are provided between the rotor 5 and the eccentric ring 59 instead of ball bearings, and they attain identical effects.

Besides, the embodiment 19 is also featured in being formed to be thin in its axial thickness.

That is, the armature 2 is provided on the outer peripheral part, and on the peripheral wall parts of the armature 2 are arranged the plural trochoid state coils 27a–27l whose each adjacent ones are separated in a constant distance in the embodiment 19. Such trochoid state coils can make the diameter of the armature 2 be small.

EMBODIMENT 20

Figure 40:
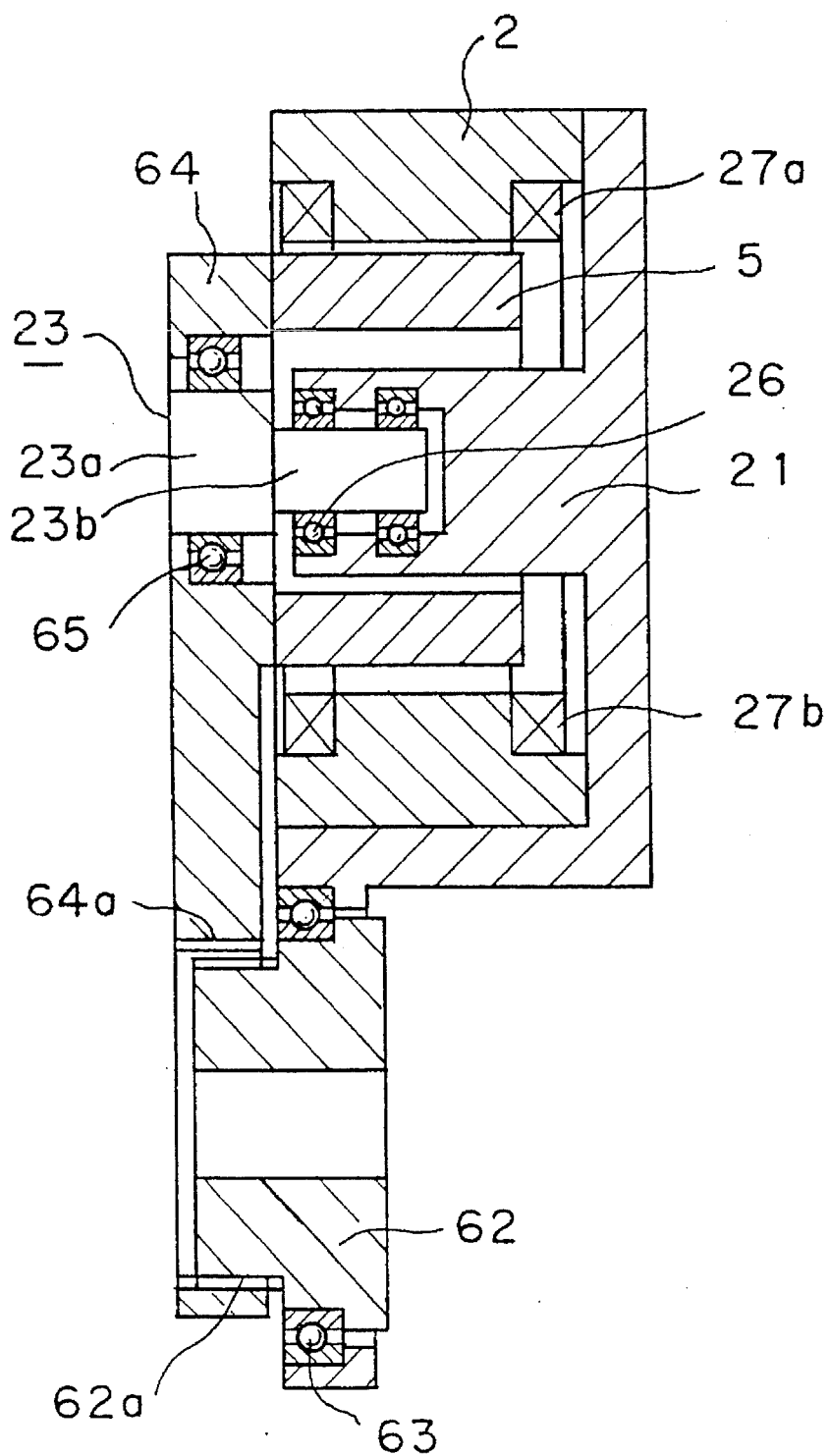
FIG. 40 is a sectional view showing an embodiment 20 of the variable air-gap type driving device of the present invention.

FIG. 40 is a sectional view showing an embodiment 20 of the variable air-gap type driving device of the present invention. In FIG. 40, reference numeral 62 denotes the first gear, supported on the base stand 21 in a freely rotatable state through bearings 63, being equipped with external teeth 62a on its outer peripheral surface. Numeral 64 denotes the second gear, linked with the rotor 5, being equipped with internal teeth 64a on a shifted position from the central part of the device, and the second gear 64 rotates the first gear 62 by engaging its internal teeth 64a with the external teeth 62a of the first gear 62 of revolving around the shifted position as the central position with the revolution of the rotor 5.

Though this embodiment and the embodiment 14 different in the point that the rotation axes of the first gear 62 and the second gear 64 are different in this embodiment compared that the rotation axis of the first gear 48 and the second gear 50 of the embodiment 14 are common in the principle of extracting a rotation movement from the first gear 62 of this embodiment is identical to that of the embodiment 14.

Using this embodiment composed as mentioned above to an apparatus using plural driving devices connected each other such as a robot makes the apparatus compact composition because of the increase of the freeness of the arrangement of the driving devices. And further this embodiment makes it possible to insert a cable into the first gear 62 whose inside is formed hollow.

EMBODIMENT 21

Figure 41:
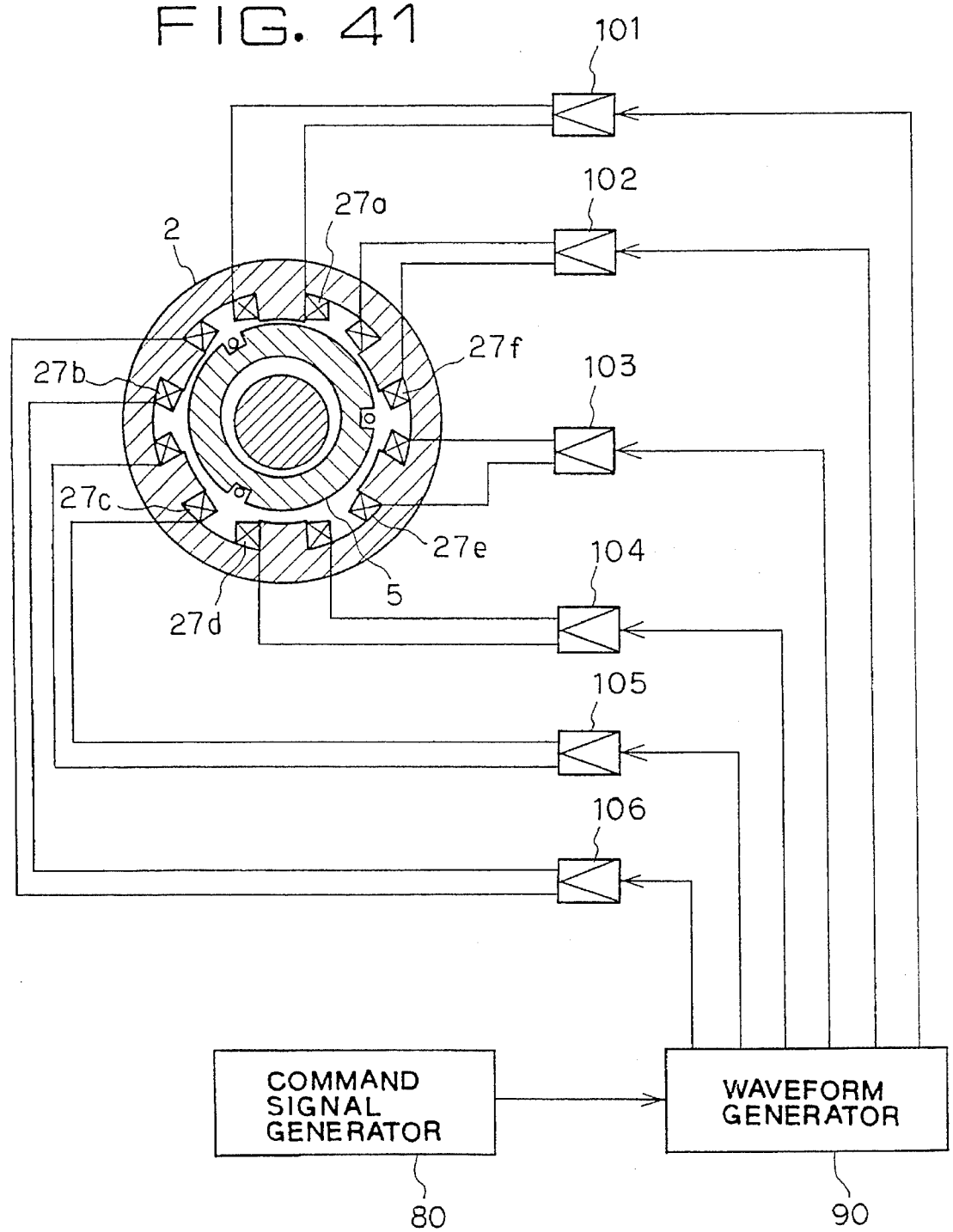
FIG. 41 is a block diagram showing a drive-controlling circuit of embodiment 21 of the variable air-gap type driving device of the present invention.

FIG. 41 is a block diagram showing a drive-controlling circuit of embodiment 21 of the variable air-gap type driving device of the present invention. In FIG. 41, reference numeral 80 denotes a command pulse generator (a command signal generator) for generating command signals corresponding to the rotation angles of the rotor 5 in order to set the rotation angles of the rotor at the prescribed angles. Numeral 90 denotes a waveform generator for generating waveform signals indicating voltage or current values each of which should be imposed on each coil 27a–27f of the armature 2. Numerals 101–106 denote control power supplies for supplying voltages or currents corresponding respectively to the waveform signals generated by the waveform generator 90 to each coil 27a–27f.

Figure 42:
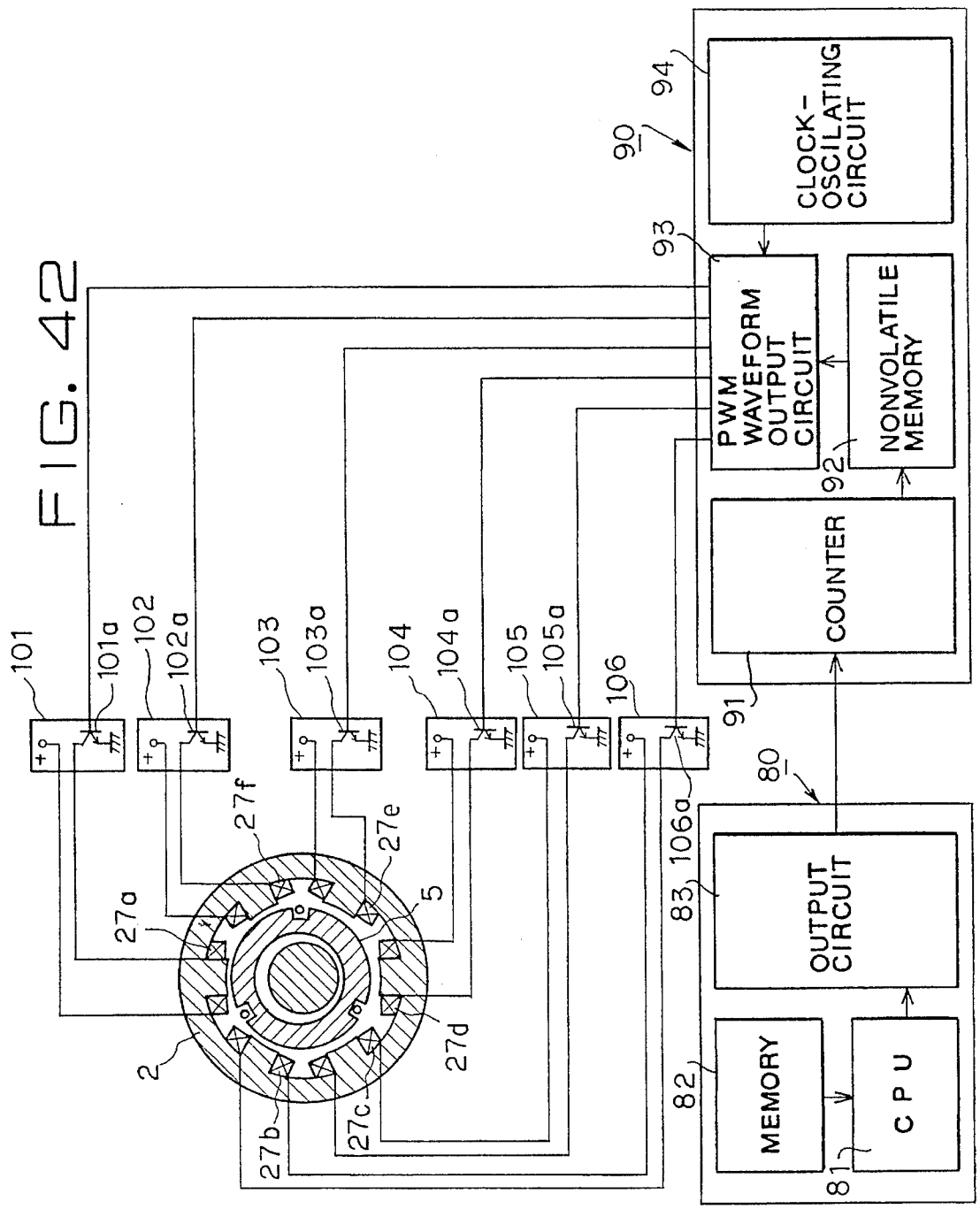
FIG. 42 is a block diagram showing a concrete constitution of the drive-controlling circuit shown in FIG. 41.
Figure 47:
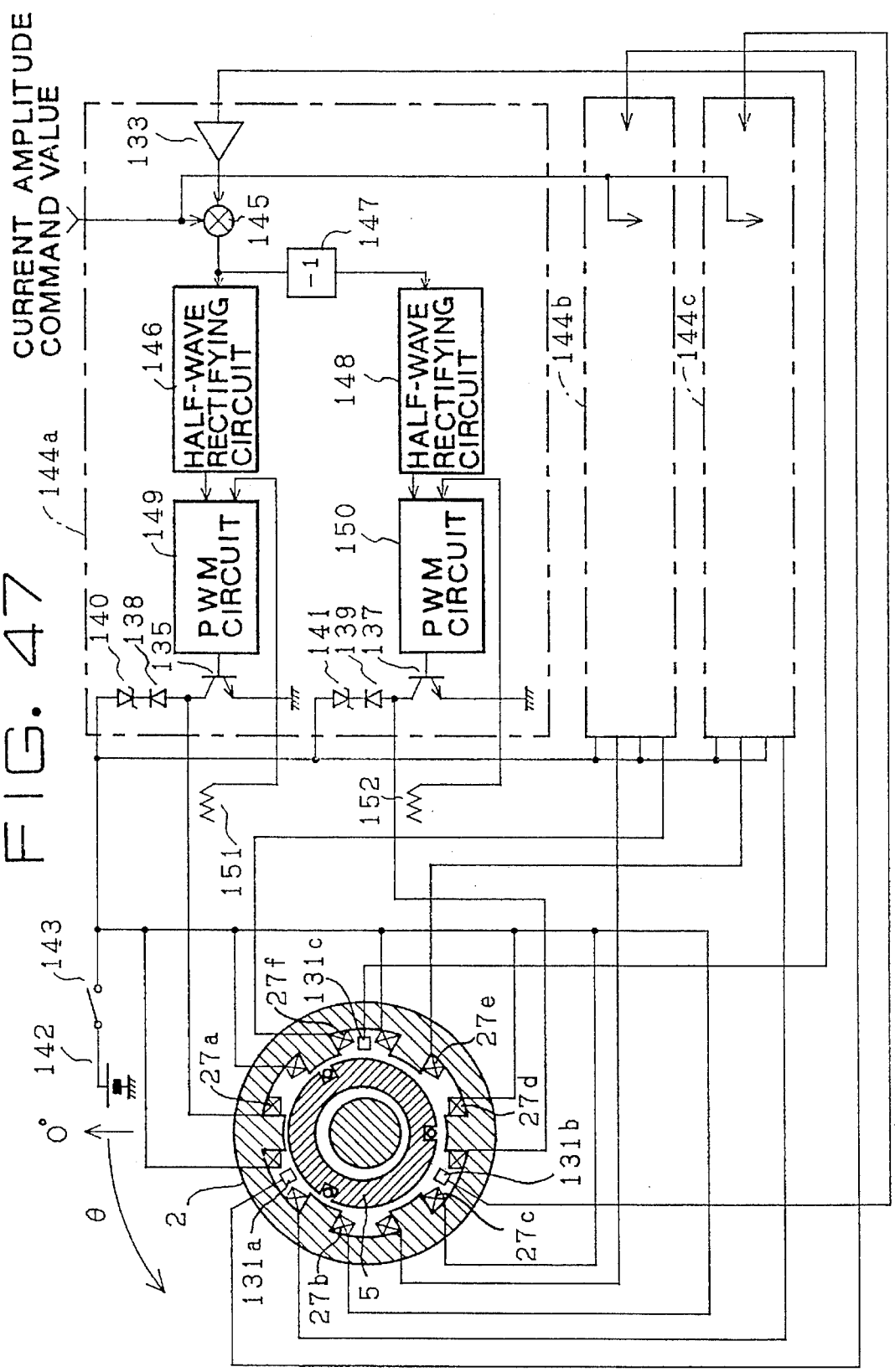
FIG. 47 is a block diagram showing a drive-controlling circuit of embodiment 24 of the variable air-gap type driving device of the present invention.

Besides, FIG. 42 is a block diagram showing a concrete constitution of the drive-controlling circuit shown in FIG. 47. In FIG. 42, reference numeral 81 denotes a CDU, and numeral 82 denotes a memory. Numeral 83 denotes an output circuit, connected to the CPU 87, for outputting a pulse train. The command pulse generator 80 is constructed in, for example, one chip microcomputer.

In the command pulse generator 80, composed as mentioned above, the memory 82 memorizes pulse train programs to be required for continuously rotating the rotor 5 in order by a prescribed angle by the electromagnetic attractive forces produced in each coil 27a–27f of the armature 2 in order. The pulse train is composed of a number of pulses corresponding to the rotation angles of the rotor 5, and the pulse train is read out by the CPU 81 to be outputted as a command signal by the output circuit 83.

Besides, reference numeral 91 denotes a counter, connected to the output circuit 83, for counting the pulse numbers of the pulse train inputted from the output circuit 83. Numeral 92 denotes a nonvolatile memory using the parallel signals outputted from the counter 91 as address signals. Numeral 93 denotes a PWM waveform output circuit for generating PWM waveforms having duty ratios corresponding to the datum signals inputted from the nonvolatile memory 92. Numeral 94 denotes a cock-oscillating circuit for generating clock signals required for the operation of the PWM waveform output circuit 93. the waveform generator 90 is composed of for example, a gate array.

Besides, numerals 101a–106a denote switching transistors for switching the circuits composed by inserting the coils 27a–27f between the power supply line and the ground line.

The operation of the embodiment 21 will now be described.

First, in FIG. 41, how the rotation drive mechanism operates is changed by the pulse train generated by the command pulse generator 80. For example, when the rotor 5 executes a predetermined operation in the embodiment 21, the command pulse generator 80 outputs command pulse trains to the waveform generator 90 as time elapses, since the command pulse generator 80 memorizes the pulse trains corresponding to the operation. The waveform generator 90 outputs voltage command waveform signals changing the voltages imposed on the coils 27a–27f in order that the angles of the electromagnetic attractive forces being exerted on the rotor 5 by the armature 2 in the rotation drive mechanism increase or decrease in proportion to the pulse trains inputted. At this time, the control power supplies 101–106 impose control signals whose voltage values correspond to the voltage command waveforms on the coils 27a–27f, and the control power supplies 101–106 actuate the rotor 5. The execution of current control changing the imposing voltages by detecting the current flowing in coils 27a–27f makes n more accurate and more strict rotation control possible, in this case.

Describing further details with FIG. 42, the CPU 81 outputs the pulse trains through the output circuit 83 following to the programs pre-memorized in the memory 82 of the command pulse generator 80. Then, the counter 91 of the waveform generator 90 converts the pulse trains into parallel data. The parallel data periodically change corresponding to the inputted pulse numbers and predetermined digit numbers of the counter 91. And the parallel data are connected to the address inputs of the nonvolatile memory 92.

The nonvolatile memory 92 stores the imposing voltage values to each coil 27a–27f corresponding to the address signals, i.e. attracting angles. Then the nonvolatile memory 92 outputs the datum signals composed of the digital signals indicating the imposing voltage values to each coil 27a–27f according to the inputted address signals from the counter 91.

The PWM waveform output circuit 93 is, for example, a parallel-serial converting circuit operated by the clock signals from the clock oscillating circuit 94, and the PWM waveform output circuit 93 generates and outputs PWM rectangular waves having duty ratios corresponding to data embodied in the data signals of the nonvolatile memory 92. The switching transistors 101a–106a are opened and closed by the PWM rectangular waves, and the prescribed current is passed through the coils 27a–27f. Hereby, the identical effects to making the imposing voltages change are attained.

Now, the present invention is not restricted to the circuit construction of the embodiment 21 mentioned above, and may be constructed by circuits having similar functions. Especially, embodying the waveform generator 90 and the command pulse generator 80 in one chip microcomputer is effective for miniaturization and for decreasing the cost of the product.

It is obvious from the description done heretofore that there is a proportional relation between numbers of times per unit time of the periodic pattern of the voltage or the current working on each coil 27a–27f, i.e. frequencies, and rotation speeds of the output axis (the first gear 48) of the rotation driving mechanism, therefore the rotation driving mechanism can be manipulated by utilizing the feature.

EMBODIMENT 22

Figure 43:
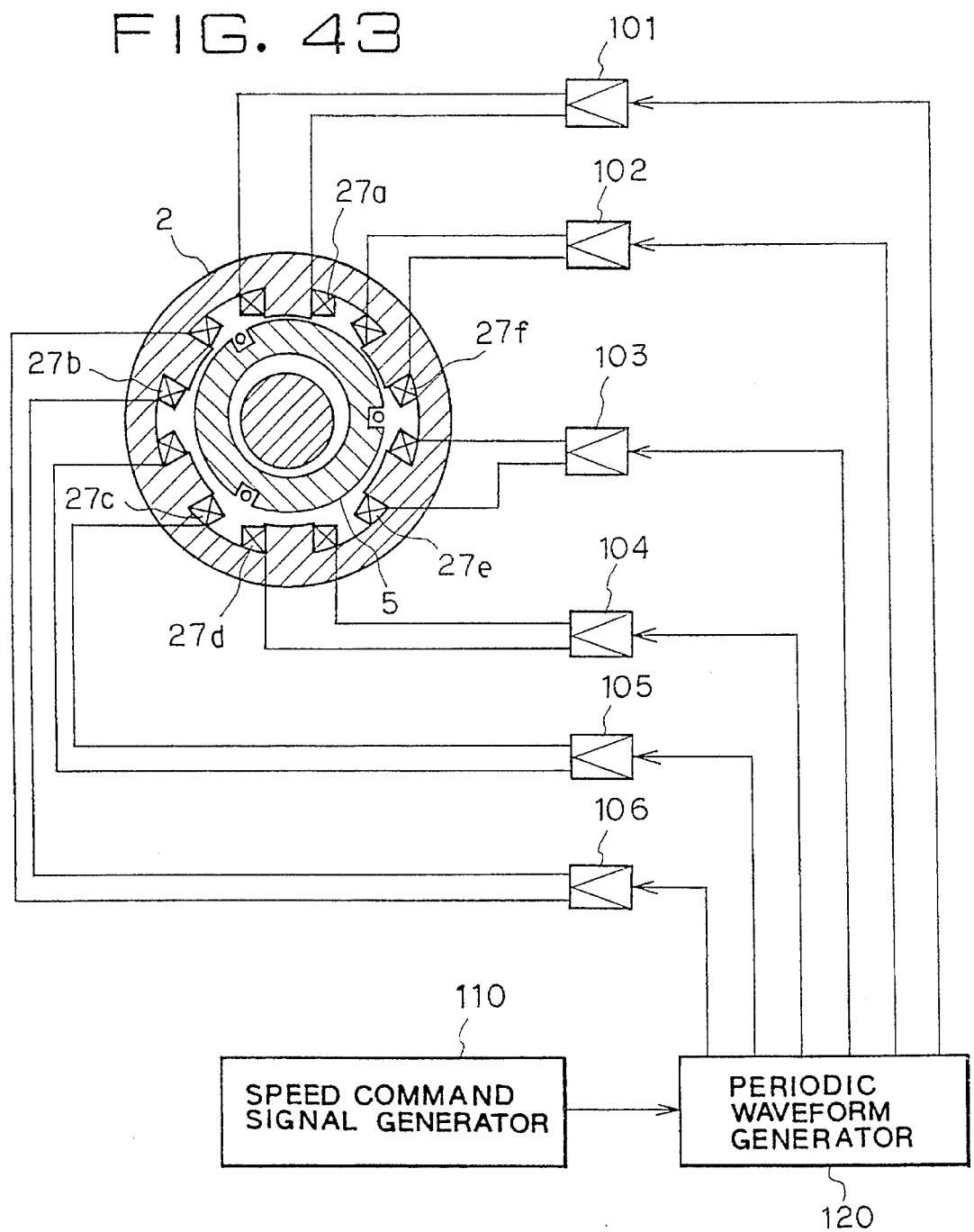
FIG. 43 is a block diagram showing a drive-controlling circuit of embodiment 22 of the variable air-gap type driving device of the present invention.

FIG. 43 is a block diagram showing a drive-controlling circuit of embodiment 22 of the variable air-gap type driving device of the present invention. In FIG. 43, reference numeral 110 denotes a speed command signal generator for generating speed command signals corresponding to the revolution speeds of the rotor 5 order to set the revolution speed of the rotor 5 to a prescribed speed. Numeral 120 denotes a periodic waveform generator (a waveform generator) for generating waveform signals indicating voltage or current values, which should be imposed on each coil 27a–27f of the armature 2, on the speed command signals generated by the speed command signal generator.

Figure 44:
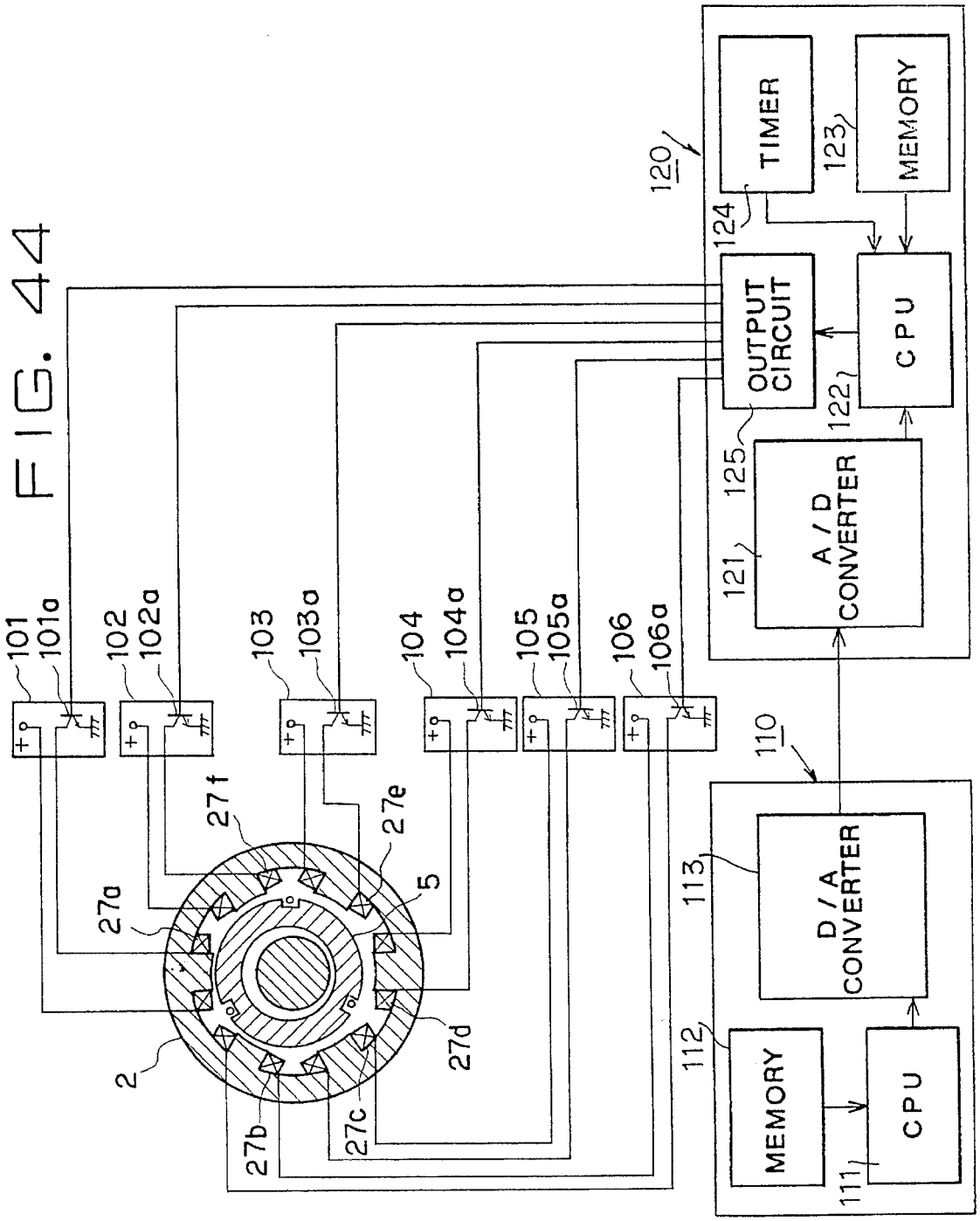
FIG. 44 is a block diagram showing a concrete constitution of the drive-controlling circuit shown in FIG. 43.

Now, FIG. 44 is a block diagram showing a concrete constitution of the drive-controlling circuit shown in FIG. 43. In FIG. 44, reference numeral 111 denotes a CPU, and numeral 112 denotes a memory connected to the CPU 111. And further numeral 113 denotes a D/A converter connected to the CPU 111. The speed command signal generator 110 is composed of, for example, one chip microcomputer.

Besides, numeral 121 denotes an A/D converter for converting the analogue speed command signals inputted from the D/A converter 113 to digital signals. Numeral 122 denotes a CPU connected to the A/D converter 121, and numeral 123 denotes a memory connected to the CPU 122. Further, numeral 124 denotes a timer, and numeral 125 denotes an output circuit. The periodic waveform generator 120 is composed of, for example, one chip microcomputer.

Now, the operation of the embodiment 22 will be described.

The CPU 111 outputs analogue speed command signals through the D/A converter 113 in accordance with programs pre-memorized in the memory 112 of the speed command signal generator 110. Then, the A/D converter 121 converts the analogue speed command signals to digital signals. Now, voltage patterns and attraction angles for revolving the rotor 5 are memorized in the memory 123 of the periodic waveform generator 120, which are related each other. Besides, the timer 124 outputs interrupt signals at regular intervals to the CPU 122. Then the CPU 122 gets the voltage data of the attraction angles, increased or decreased in proportion to the speed commands from the A/D converter 121, from the data in the memory 123 every input of the interrupt signals, and the CPU 122 generates PWM rectangular waves having duty ratios corresponding to the voltage data and outputs from the output circuit 125. The switching transistors 101a–106a are opened and closed by the PWM rectangular wave signals, axed then a prescribed current flows in coils 27a–27f. Hereby, the same effects as changing the imposing voltages to the coils 27a–27f are obtained.

In the embodiment 22 mentioned above, the composition by which the rotor 5 is revolved in a desired revolution speed is described. However the present invention is not restricted to this composition, so the embodiment 22 can be applicable to all control apparatus equipped with control parts of angular velocities in the variable air-gap type driving device of the present invention. For example, when the rotation angles of the first gear 48, an output axis, are controlled by detecting the rotation angles of the crank 23 by a detector such as an encoder in the variable air-gap type driving device shown in FIG. 27; controlling the angular velocity by the embodiment 22, if it is possible, makes it possible to execute the angular control using the identical method to the feedback control employed in conventional control motors.

Besides, the circuit constitution of the present invention is not restricted to that of the embodiment 22, so other circuit constitutions fulfilling identical functions may be employable. Especially, the method of embodying the periodic waveform generator 120, the speed command signal generator 110 and the feedback control function, mentioned above, in a microcomputer is effective for miniaturization and for decreasing the cost of the control apparatus.

By the way, in the above description concerning, for example, the variable air-gap type driving apparatus in FIG. 27, the rotor 5 is supposed to move in response to the electromagnetic attractive forces generated by the armature 2 without any time delay, but there happens some gaps between the attraction angles of the armature 2 and the rotation angles of the rotor 5 in fact due to loads imposed on the rotation driving mechanism, the mechanical inertia, and so on. If the gaps become larger than a certain degree, the electromagnetic attractive forces of the armature 2 dose not converted efficiently to the torque for revolving the rotor 5. Then, the rotor 5 comes to a stopped state. To prevent this situation, it is required to manipulate the pattern of the current or voltage imposed on coils 27a–27f in order to suppress the gaps between the attraction angles of the armature 2 and the rotation angles of the rotor 5.

For this sake, to detect the rotation angles of the rotor 5 is required. As the means of detecting the rotation angles, these means such as the usage of the output signals of the rotation angle sensor attached to the crank 23 and the electrical detection of the angles of the rotor 5 are applicable. Describing more concretely, the electrical means may comprise: superimposing high frequency components on the voltages imposed on the coils 27a–27f, detecting the inductance changes of the coils 27a–27f by observing the high frequency components' amplitudes of the current flowing in the coils 27a–27f on that time, and presuming the angles of the rotor 5 based on the results of the detection.

EMBODIMENT 23

Figure 45:
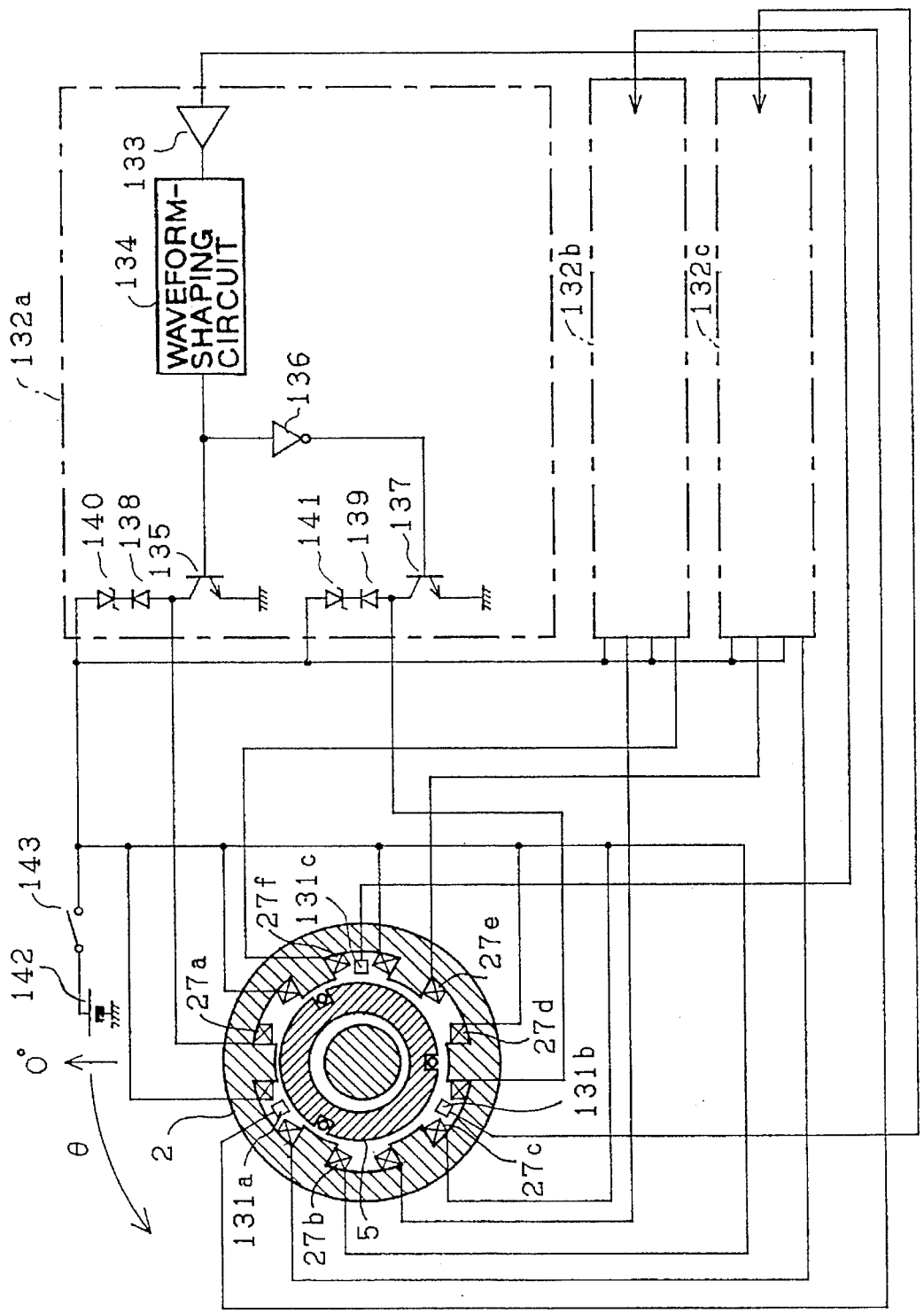
FIG. 45 is a block diagram showing a drive-controlling circuit of embodiment 23 of the variable air-gap type driving device of the present invention.

FIG. 45 is a block diagram showing a drive-controlling circuit of embodiment 23 of the variable air-gap type driving device of the present invention. In FIG. 45, reference numerals 137a–131c denote air-gap length detectors, arranged between pairs of coils opposing on diagonal lines among the coils of the armature 2 (e.g. the air-gap length detector 137c is arranged between the coil 27a and the coil 27f), for detecting air-gaps between the armature 2 and the rotor 5. And numerals 132a–132c denote driving circuits for driving each coil 27a–27f.

Besides, numeral 733 denotes an amplifying circuit for amplifying the detection signals of the air-gap detector 131c, and numeral 134 denotes a waveform-shaping circuit for shaping the detection signals of the air-gap detector 131c to rectangular waves. Numeral 135 denotes a switching device for imposing a voltage on one coil of the pair of coils (the coil 27a) when the rectangular waves shaped by the waveform-shaping circuit 134 have higher levels than a prescribed value. Numeral 136 denotes a NOT circuit for inverting the rectangular waves shaped by the waveform-shaping circuit 134. Numeral 137 denotes a switching device for imposing a voltage on the other coil of the pair of coils (the coil 27d) when the rectangular waves inverted by the NOT circuit 136 have higher levels titan a prescribed value. Numerals 138 and 139 denote refluxing diodes, and numerals 140 and 141 denote zener diodes for dumping. And numeral 142 denotes a driving power supply, numeral 143 denotes a starting and stopping switch.

Now, the operating of the embodiment 23 will be described.

As the rotor 5 revolves, as mentioned above, the air-gap between the rotor 5 and the air-gap detector 131a–131c changes with the rotation of the rotor 5.

The air-gap detector 131a–131c detect the positions of the rotor 5 by detecting the air-gap changes, so they are composed of, for example, magnetic sensors and permanent magnets generating bias magnetic fields.

Now, as the air-gap detectors 131a–131c are arranged between each coil 27a axed 27b, 27c and 27d, and 27e and 27f, that is, the positions 30°, 150° and 270° of the rotation angles of the rotor 5 in opposition to the rotor 5, the magnetic flux densities passing through the magnetic sensor of the air-gap detector 131a–131c changes with the change of the air-gap. So, sine wave state output signals as shown in FIG. 46 are generated the air-gap detector 131a–131c.

Figure 46:
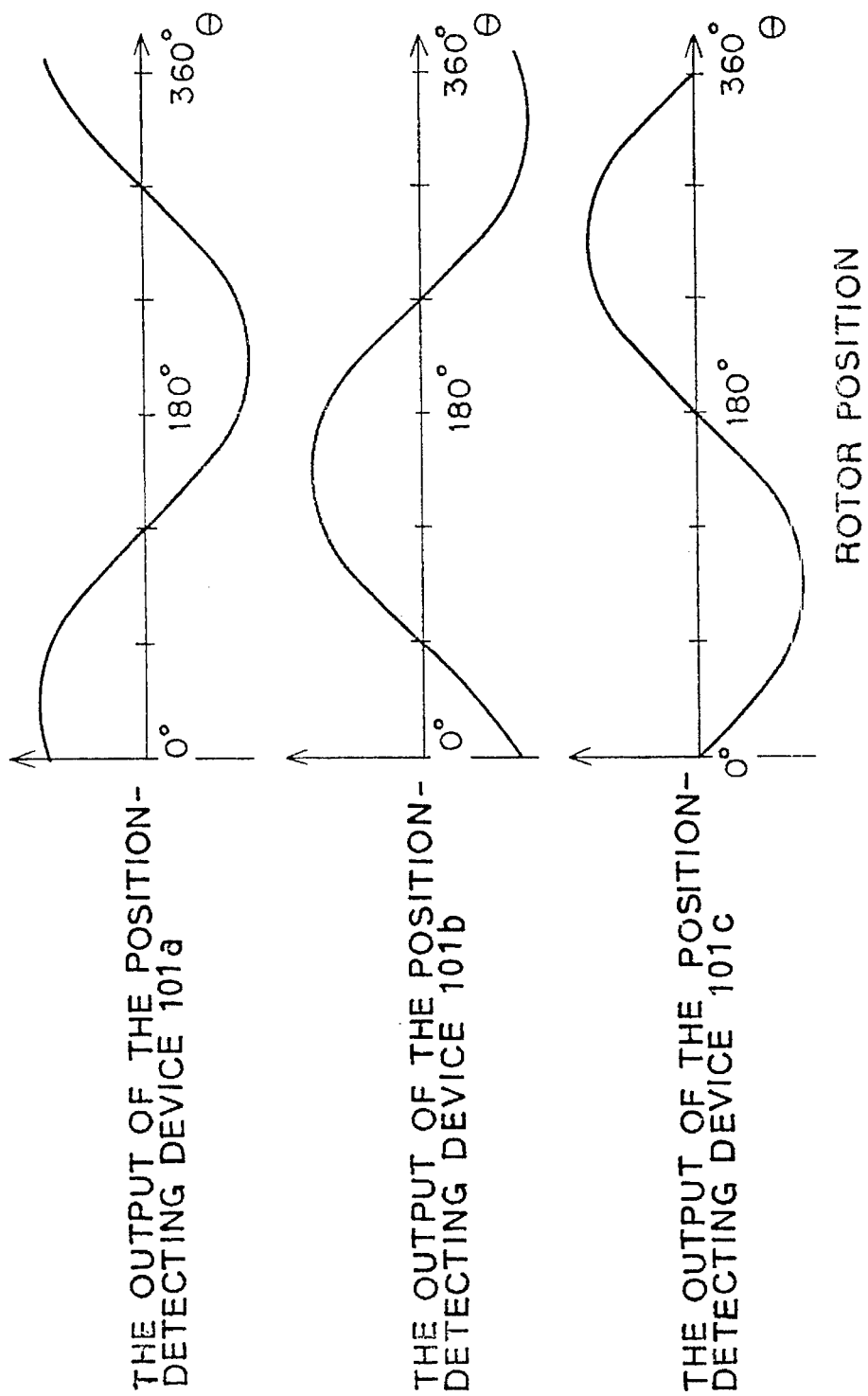
FIG. 46 is a waveform chart showing output signals of an air-gap detector.

In FIG. 46, the axes of abscissas denotes the rotation angles of the rotor 5. The rotation angles are set to be 0° at the state of the rotor 5 positioning at the coil 27a side, as shown in FIG. 45, and the positive direction of the rotation angles taken is counterclockwise. Accordingly, electromagnetic attractive forces worked on the rotor 5 can always be generated near positions advanced by 90° to the rotation direction by inputting the output signals of the air-gap detector 131a to the driving circuit 132b, inputting the output signals of the air-gap detector 131b to the driving circuit 132c, and inputting the output signals of the air-gap detector 131c to the driving circuit 132a, and further by driving each coil 27a–27f on the polarization of the output signals.

Next, the operations of the driving circuits will be explained by taking the driving circuit 732a as an example.

The AC components of the output signals of the air-gap detector 131c are amplified by the amplifying circuit 733. The output signals of the amplifying circuit 133 are shaped to high level and low level rectangular waves according to their polarities. The switching device 135 for driving the coil 27a is turned on when the output signal level of the waveform-shaping circuit 134 is high and turned off when the output signal level of the waveform-shaping circuit 134 is low, and the switching device 137 for driving the coil 27d is turned on when the signal, the inverted output signal of -the waveform-shaping circuit 134 by the NOT circuit, is high level, and the switching device 137 is turned off when the signal is low level. Accordingly, when the starting and stopping switch 143 becomes on state, electric power is supplied to the coils corresponding to the rotor 5 position from the driving power supply 142, then the rotor 5 is revolved to the prescribed direction.

Besides, the refluxing diodes 138 and 139 and zener diodes 140 and 141 respectively process the energy stored in the coils 27a and 27d while the switching devices 135 and 137 are on state in the driving circuit 132a. For example, at the instant when the switching device 135 turns off, the coil current, flowing through the driving power supply 142, the starting and stopping switch 143, the coil 27a and switching device 135 till the time, is refluxed through the coil 27a, refluxing diode 138 and zener diode 140 and the coil current is diminished. The attenuation modulus of the coil current can be adjusted by the zener voltage of the zener diodes 140 in this case.

The air-gap detectors 131a–131c are not restricted to the magnetic sensor system, but they can use such optical sensors, ultrasonic sensors and electrostatic capacity sensors as are able to detect the change of the air-gap lengths produced by the revolution of the rotor 5.

Besides, one switching device is set to be on during 180° term according to the output signals of the air-gap length detector in the embodiment 23 mentioned above, but the on term of the switching device is not restricted to the above stated term. Devices turning on during 120°–180° according to the output signals of the air-gap detector may applicable to the present invention.

EMBODIMENT 24

FIG. 47 is a block diagram showing a drive-controlling circuit of embodiment 24 of the variable air-gap type driving device of the present invention. In FIG. 47, reference numerals 144a–144c denote driving circuits for driving each coil 27a–27f. Numeral 145 denotes a multiplier for multiplying the detection signals of the air-gap detector 131c by current amplitude command values commanding current amplitude values flowing in the pair of coils. Numeral 146 denotes a half-wave rectifying circuit (a command value extracting circuit) for extracting the current command values of the coil 27a from the results of multiplication of the multiplier 145. Numeral 147 denotes a code inverter for inverting the results of the multiplication of the multiplier 145. Numeral 148 denotes a half-wave rectifying circuit for extracting current command values to coil 27d from the output of the code inverter 147. Numerals 149 and 150 denote PWM circuits. And numerals 151 and 152 denote current detectors for detecting currents flowing coils 27a and 27d respectively.

And further, two voltage output circuits are composed of the switching device 137 and the PWM circuit 149, and the switching device 137 and the PWM circuit 150 respectively. These voltage output circuits impose voltages on coils 27a and 27d respectively on the differences between the current values detected by the current detectors 151 and 152 and on the current command values extracted from the half-wave rectifying circuits 146 and 148 in order that the current values coincide with the current command values.

Now, the operation of the embodiment 24 will be described.

As the driving method of the coils 27a–27f on the output signals of the air-gap length detector 131a–131c is identical to that of the embodiment 23, the description of it is omitted. So, the operation of the driving circuits 144a–144c will be explained by taking the driving circuit 144a as an example here.

The AC components of the output signals of the air-gap detector 131c are amplified by the amplifying circuit 133 similarly to those of the embodiment 23. The multiplier 145 multiplies the output signals of the amplifying circuit 133 by the current amplitude command values given from the outside, and the multiplier 145 synthesizes the current command values corresponding to the positions of the rotor 5. The synthesized current command values are separated to the current command values of coil 27a and coil 27d by the half-wave rectifying circuit 146, and the code inverter 147 and the half-wave rectifying circuit 148 respectively. The PWM circuits 149 and 150 compares the current command values separated with real current values in coils 27a and 27d detected by the current detectors 151 and 152, and then the PWM circuits 149 and 150 synthesize PWM signals for driving the switching devices 135 and 137 in order to follow the real current to the command values.

Besides, the refluxing diodes 138 and 139 and the zener diodes 140 and 141 process the energy stored coils 27a and 27d while each switching device 135 and 137 are on in the driving circuit 144a like the embodiment 23 mentioned above.

Now, the driving circuit for proportioning and following the coil current to the output signals of the air-gap length detector 131c is composed of parts such as the multiplier 145, the code inverter 147, the half-wave rectifying circuits 146, 148 and PWM circuits 149, 150 in the embodiment 24, but the composition of the driving circuit is not restricted to above mentioned one. Then, for example, a driving circuit using a microcomputer may be applicable.

EMBODIMENT 25

Figure 48:
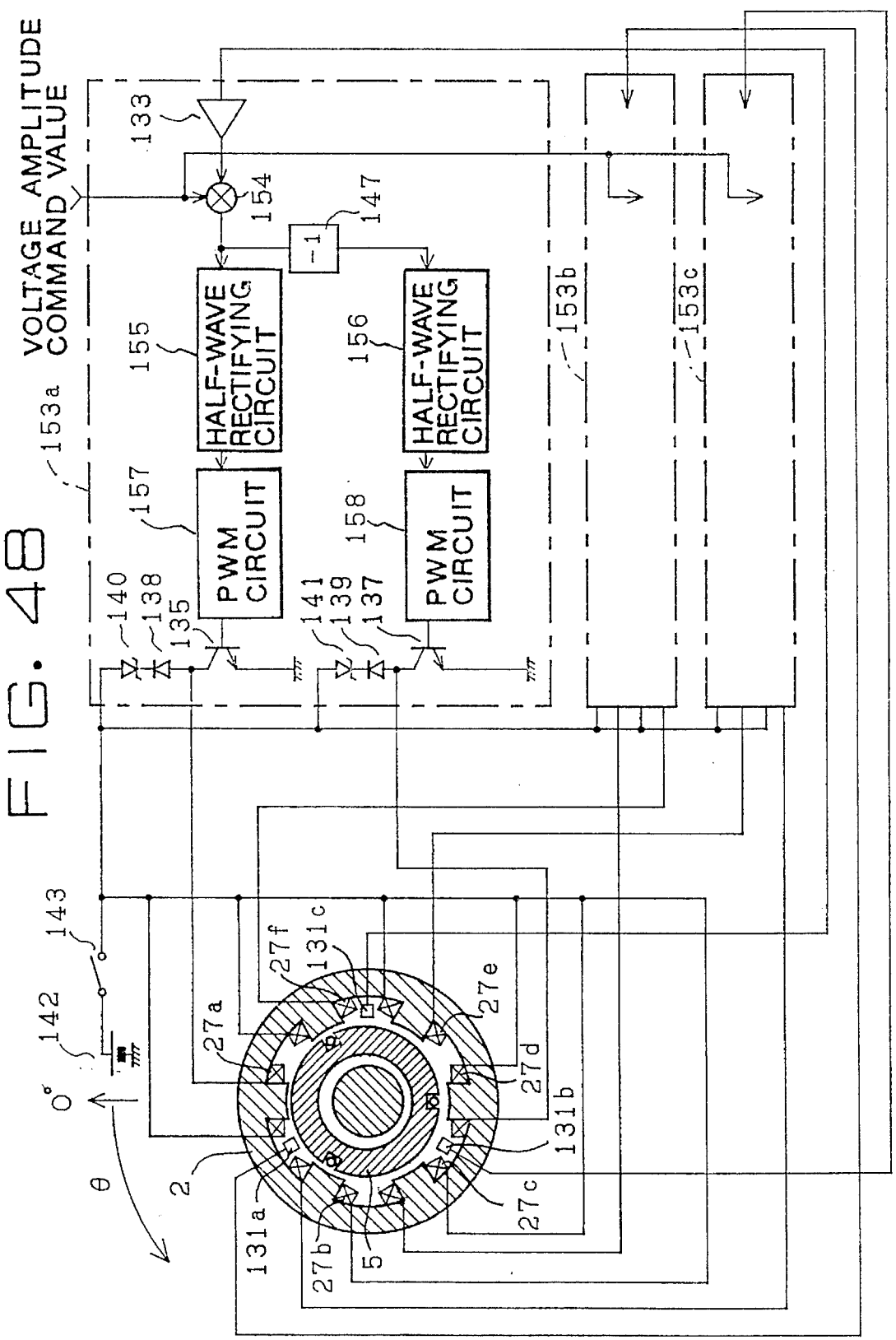
FIG. 48 is a block diagram showing a drive-controlling circuit of embodiment 25 of the variable air-gap type driving device of the present invention.

FIG. 48 is a block diagram showing a drive-controlling circuit of embodiment 25 of the variable air-gap type driving device of the present invention. In FIG. 48, reference numerals 153a–153c denote driving circuits for driving each coil 27a–27f. Numeral 154 denotes a multiplier for multiplying detection signals of the air-gap detector 131c by voltage amplitude command values commanding voltage amplitude values imposed on the pair of coils. Numeral 155 denotes a half-wave rectifying circuit (a command value extracting circuit) for extracting the voltage command values to the coil 27a from the results of multiplication of the multiplier 154. Numeral 156 denotes a half-wave rectifying circuit for extracting voltage command values to the coil 27d from the output of the code inverter 147. Numerals 157 and 158 denote PWM circuits.

And further, two voltage output circuits are composed of the switching device 135 and the PWM circuit 157, and the switching device 137 and the PWM circuit 158 respectively. These voltage output circuits impose voltages on coils 27a and 27d respectively on the voltage command values extracted from the half-wave rectifying circuit 155 and 156.

Now, the operation of the embodiment 24 will be described.

As the driving method of the coils 27a–27f on the output signals of the air-gap length detector 131a–131c is identical to that of the embodiment 23, the description of it is omitted. So, the operation of the driving circuits 153a–153c will be explained by taking the driving circuit 153a as an example.

The AC components of the output signals of the air-gap detector 131c are amplified by the amplifying circuit 133 similarly to those of the embodiment 23. The multiplier 154 multiplies the output signals of the amplifying circuit 133 by the voltage amplitude command values given from the outside, and the multiplier 154 synthesizes the voltage command values corresponding to the positions of the rotor 5. The synthesized voltage command values are separated to the voltage command values of coil 27a and coil 27d by the half-wave rectifying circuit 158, and the code inverter 147 and the half-wave rectifying circuit 156 respectively. The PWM circuits 157 and 158 synthesize PWM signals for driving the switching devices 135 and 137 from time separated voltage command values.

Besides, the refluxing diodes 138 and 139 and the zener diodes 140 and 141 process the energy stored in coils 27a and 27d while each switching device 135 and 137 are on in the driving circuit 153a like the embodiment 23 mentioned above.

Now, the driving circuit for proportioning and following the voltages imposed on coils to the output signals of the air-gap length detector 131c is composed of parts such as the multiplier 154, the code inverter 147, the half-wave rectifying circuits 155, 156 and PWM circuits 157, 158 in the embodiment 25, but the composition of the driving circuit is not restricted to the above mentioned one. Then, for example, a driving circuit using a microcomputer may be applicable.

EMBODIMENT 26

Figure 49:
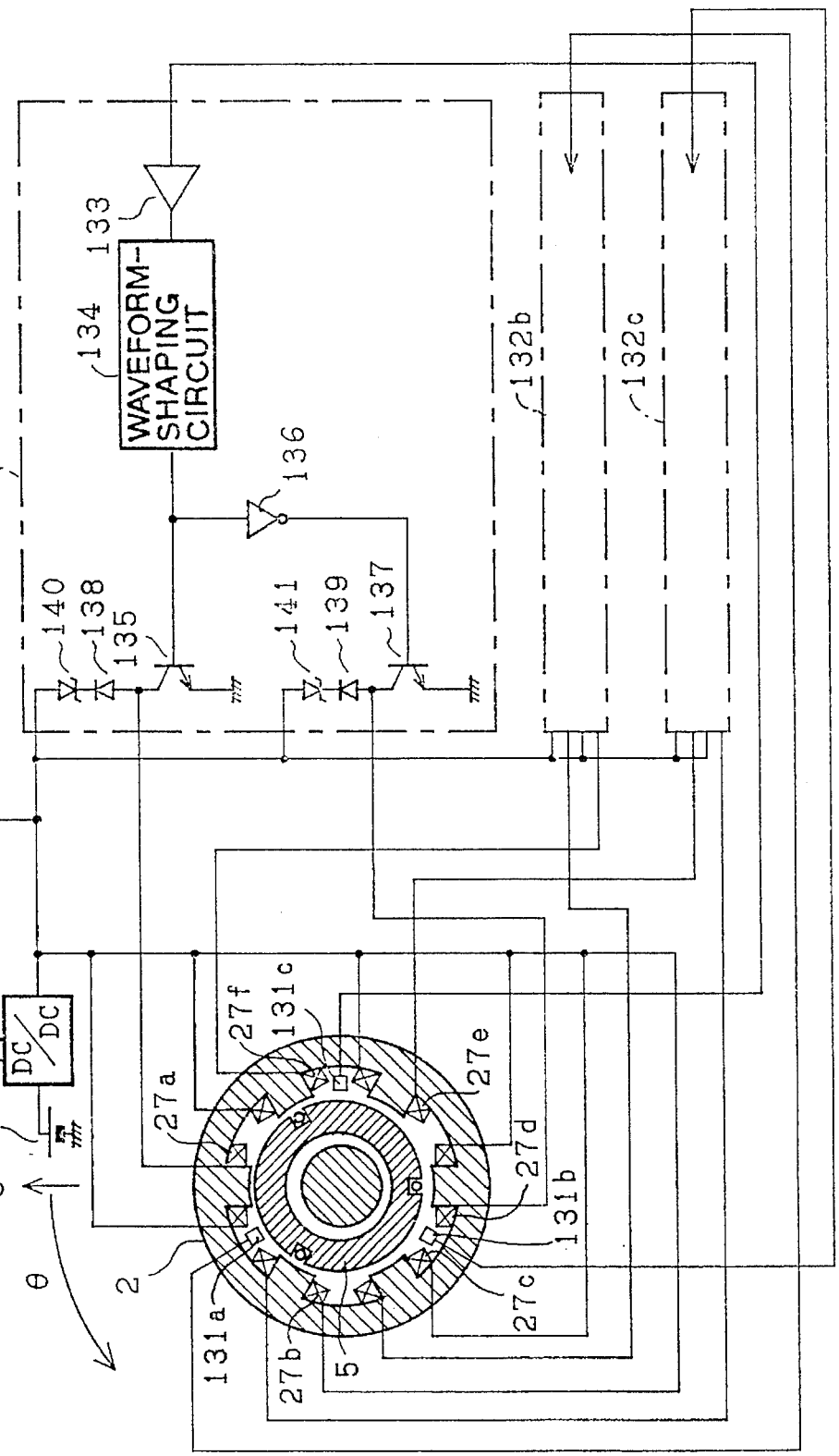
FIG. 49 is a block diagram showing a drive-controlling circuit of embodiment 26 of the variable air-gap type driving device of the present invention.

FIG. 49 is a block diagram showing a drive-controlling circuit of embodiment 26 of the variable air-gap type driving device of the present invention. In FIG. 49, reference numeral 159 denotes an error amplifier for detecting error voltages by comparing voltage amplitude command values and voltages really imposed on the coils 27a–27f. Numerals 160 denotes a DC/DC converter.

Now, the driving power supply 142, the error amplifier 159 and DC/DC converter 760 compose a control power supply for according the voltage values imposed on pairs of coils to the voltage amplitude command values.

Now, the operating of the embodiment 26 will be described.

As the operation of the driving circuit 132a–132c for driving the coils 27a–27f on the output signals of the air-gap length detector 131a–137c is identical to the embodiment 23 mentioned above, so an appropriate coil among the coils 27a–27f corresponding to the rotor 5 positions is driven with the rectangular wave voltage.

This embodiment 26 controls the output of the variable air-gap type driving device by controlling the wave height values of the rectangular voltages with the voltage amplitude command values given from the outside. The error amplifier 159 detects error voltages by comparing the voltage amplitude command values given from the outside with the voltages really imposed on the positive pole sides of the coils 27a–27f, and the error amplifier 159 outputs voltage-controlling signals by giving suitable control gains and compensate gains to the error voltages. The DC/DC converter 160, arranged between the driving power supply 142 and the coils 27a–27f, controls the voltages, imposed on the positive pole sides of the coils 27a–27f, by the voltage control signals so as to follow the voltage amplitude command values given to the error amplifier 159.

EMBODIMENT 27

Figure 50:
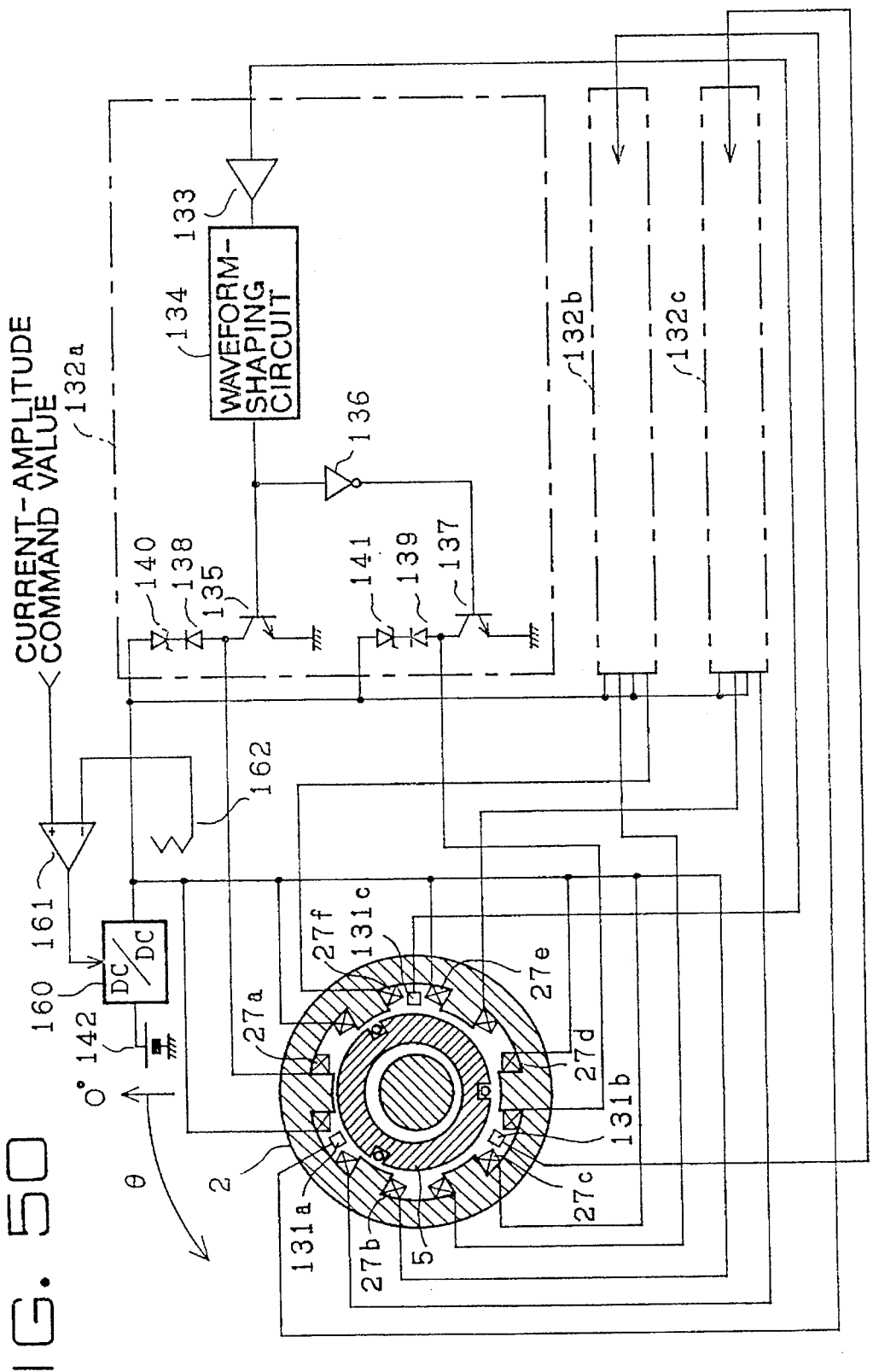
FIG. 50 is a block diagram showing a drive-controlling circuit of embodiment 27 of the variable air-gap type driving device of the present invention.

FIG. 50 is a block diagram showing a drive-controlling circuit of embodiment 27 of the variable air-gap type driving device of the present invention. In FIG. 50, reference numeral 161 denotes an error amplifier for detecting error current by comparing current amplitude command values and total current values really flowing in the coils 27a–27f. Numerals 162 denotes a current detector for detecting the total current values flowing in coils 27a–27f.

Now, the driving power supply 142, the error amplifier 161, the current detector 162 and DC/DC converter 160 compose a control power supply for controlling voltages, imposed on a pair of coils, on the differences between the total current values and the current amplitude command values in order that the total current values accord to the current amplitude command values.

Now, the operating of the embodiment 26 will be described.

As the operation of the driving circuit 132a–132c for driving the coils 27a–27f on the output signals of the air-gap length detector 131a–131c is identical to the embodiment 23 mentioned above, an appropriate coil among the coils 27a–27f corresponding to the rotor 5 positions driven with the rectangular wave voltages.

This embodiment 27 controls the outputs of the variable air-gap type driving device by controlling the wave height values of the rectangular voltages in order that the total current values flowing in coils 27a–27f follow the current amplitude command values given from the outside. The error amplifier 161 detects error current by comparing the current amplitude command values given from the outside with the total current values, detected by the current detector 162, flowing in the coils 27a–27f, and the error amplifier 161 outputs current-controlling signals by giving suitable control gains and compensate gains to the error current. The DC/DC converter 160, arranged between the driving power supply 142 and the coils 27a–27f, controls the voltages, imposed on the positive pole sides of the coils 27a–27f, by the current control signals so as to follow the total current values to the current amplitude command values given to the error amplifier 161.

EMBODIMENT 28

Figure 51:
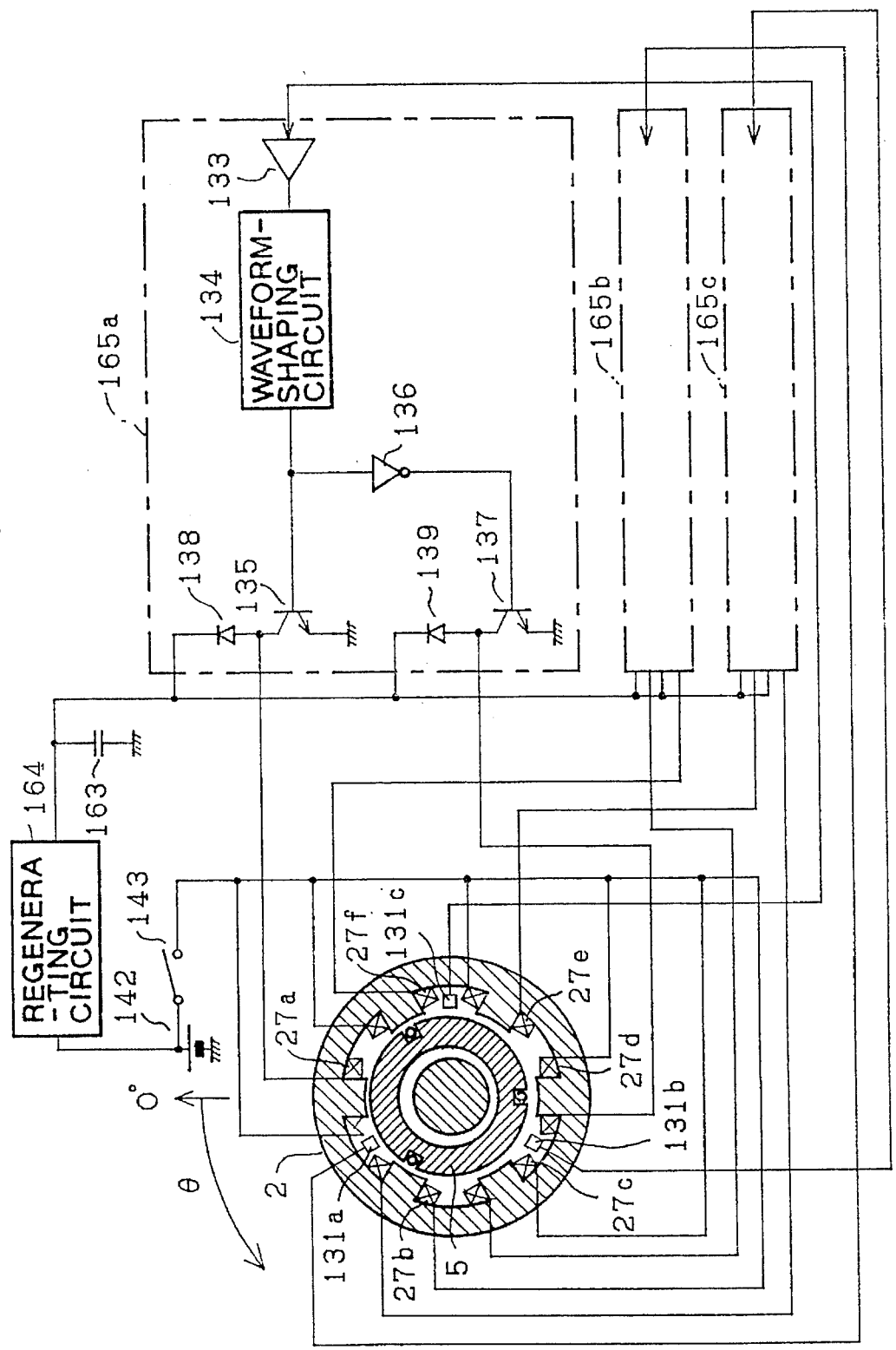
FIG. 51 is a block diagram showing a drive-controlling circuit of embodiment 28 of the variable air-gap type driving device of the present invention.

FIG. 51 is a block diagram showing a drive-controlling circuit of embodiment 28 of the variable air-gap type driving device of the present invention. In FIG. 51, reference numeral 163 denotes a capacitor for storing the energy, stored in the coils 27a–27f of the armature 2 by passing current through these coils, through the refluxing diode 138 while the current are not passed through these coils. Numerals 164 denotes a regenerating circuit for regenerating the energy stored the capacitor 163 to the driving power supply 142 when the voltage across the capacitor 163 exceeds a prescribed voltage value.

Besides, reference numerals 165a–165c denote driving circuits for driving each coil 27a–27f.

Now, the operation of the embodiment 28 will be described.

The operation of the driving circuit 165a–165c for driving the coils 27a–27f on the output signals of the air-gap length detector 131a–131c is identical to the embodiment 23 mentioned above except the off time operation of the switching device for driving the coils 27a–27f and the manipulating method of the energy stored in the coils 27a–27f during driving these coils. Consequently, the operation description of the embodiment 28 will be done about the off time operation of the switching device 135 and 137 and about the operation of manipulating the energy in the coils 27a and 27d by taking the driving circuit 165a as an example.

For example, at an instance when the switching device 135 turns off, the coil current, flowing through the driving power supply 142, the starting and stopping switch 143, the coil 27a and switching device 135 till the time, flows into the capacitor 163 through the refluxing diode 138, and the current diminishes. In the case where the switching device 137 turns off, the coil current of the coil 27d similarly flows into the capacitor 163 through the refluxing diode 139 and diminishes. In these cases, when the voltage across the capacitor 163 exceeds a certain predetermined value, the regenerating circuit 164 begins to operate and regenerates the energy stored in the capacitor 163 to the driving power supply 142. Besides, the attenuation modulus of the coil current can be adjusted by a voltage value set to make the regenerating circuit 164 begin to operate.

EMBODIMENT 29

Figure 52:
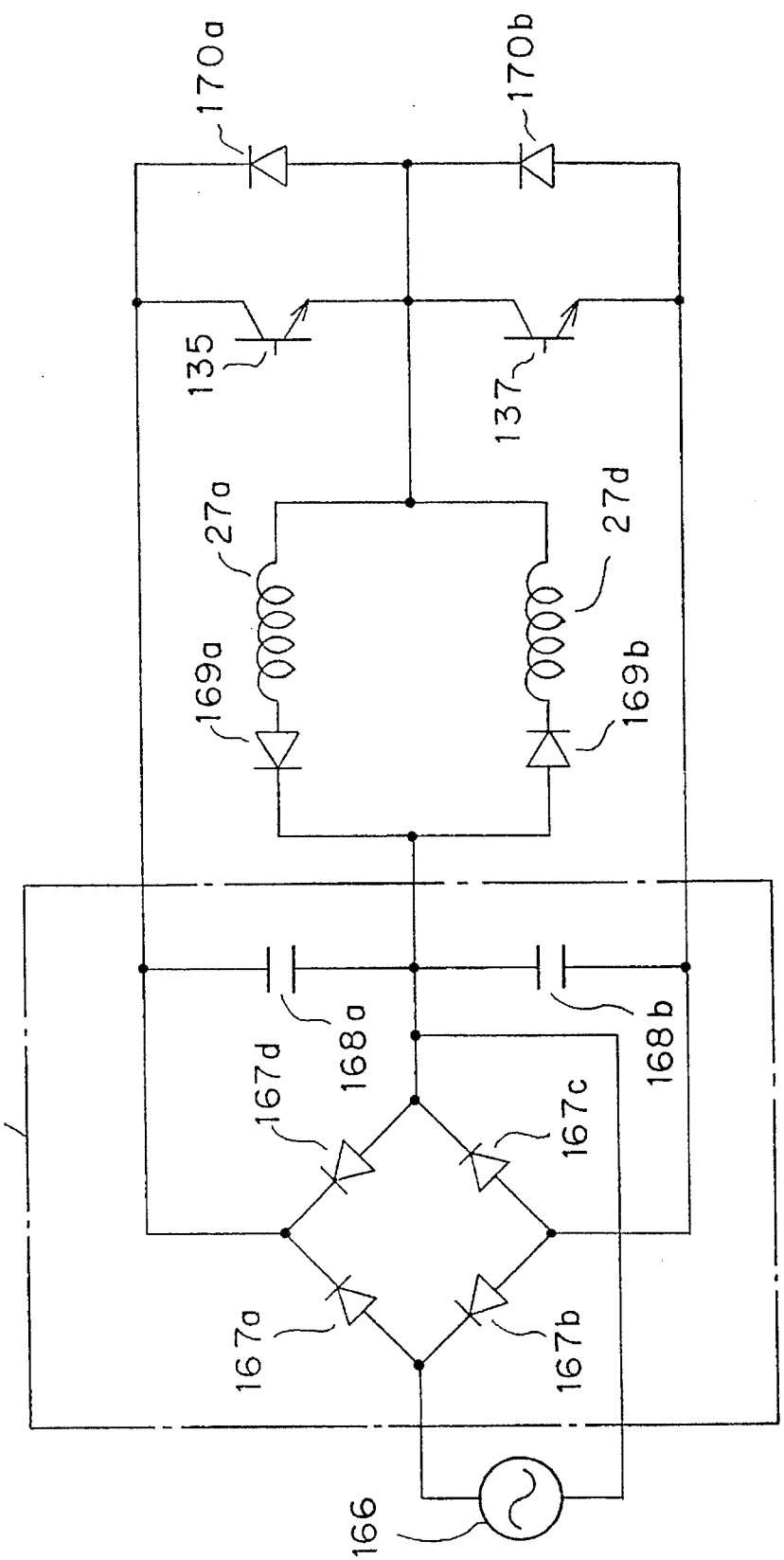
FIG. 52 is a block diagram showing a drive circuit for driving a pair of coils of the variable air-gap type driving device.

FIG. 52 is a block diagram for explaining the embodiment 29 and showing a driving circuit of a pair of coils of the variable air-gap type driving device as described in the embodiment 23. In FIG. 52, reference numeral 166 denotes an AC power supply. Numeral 167 denotes a double voltage rectifying circuit. Numerals 167a –167d denote rectifying diodes. Numerals 168a and 168b denote smoothing capacitors. Numerals 169a and 169b denote reverse-blocking diodes. And numerals 170a and 170b denote refluxing diodes.

The AC power supply 166 is the driving power supply of the variable air-gap type driving circuit. The rectifying diodes 167a–167d, connected to the AC power supply 166, and the smoothing capacitors 168a and 168b compose a well known double voltage rectifying circuit. The pair of coils 27a and 27d respectively compose series circuits with reverse-blocking diodes arranged in reverse direction each other. Each of the series circuits further connected in parallel each ether. Both ends of the parallel circuits are connected a connection point of the smoothing capacitors 168a and 168b and the connection point of the switching devices 135 and 137.

The operation of the embodiment 29 will now be described.

First, the switching device 135 is turned on in the case where the coil 27a is driven. Turning the switching device 135 on passes a driving current of the coil 27a through the smoothing capacitor 168a, the switching device 135, the coil 27a and the reverse-blocking diode 169a. Further, turning the switching device 135 off diminishes the coil current of the coil 27a with refluxing the coil current through the coil 27a, the reverse-blocking diode 169a, the smoothing capacitor 168a and the refluxing diode 170a. Though the coil 27d is similarly driven, the switching device 137 is turned on in this case. Turning the switching device 137 on passes a driving current of the coil 27d through the smoothing capacitor 168b, the reverse-blocking diode 169b, the coil 27d and the switching device 137. Further, turning the switching device 137 off diminishes the coil current of the coil 27d with refluxing the coil current through the coil 27d, the refluxing diode 170b, the smoothing capacitor 168b and the reverse-blocking diode 169b.

EMBODIMENT 30

Figure 53:
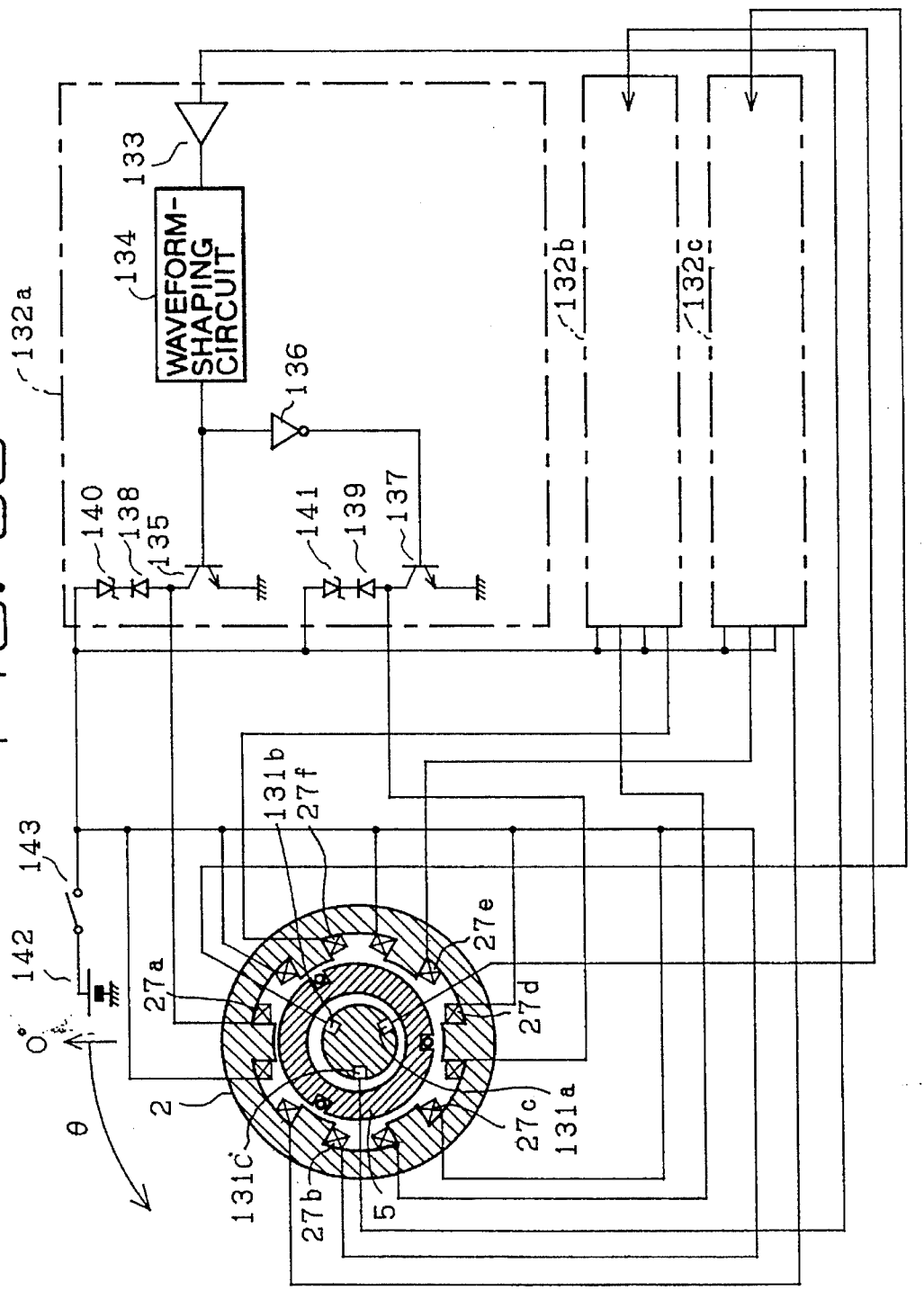
FIG. 53 is a block diagram showing a drive-controlling circuit of embodiment 30 of the variable air-gap type driving device of the present invention.

FIG. 53 is a block diagram showing a drive-controlling circuit of embodiment 30 of the variable air-gap type driving device of the present invention. In FIG. 53, the construction components of the variable air-gap type driving device is identical to those of the embodiment 23 shown in FIG. 43 except that the air-gap detector 131a–131c of the rotor 5 are arranged with opposing the inside of the rotor 5 at prescribed positions on the projection shaft part 21a attached the fixing base stand of the armature 2 in a body.

The operation of the embodiment 30 will be described now.

As described above, the operation of the driving circuits 132a–132c is identical to that of the embodiment 23, so only the operation of the air-gap detector 131a–131c arranged between the inside of the rotor 5 and the projection shaft part 21a will be explained.

The revolution movement of the rotor 5 changes the air-gap length between the projection shaft part 21a and the inside of the rotor 5. The phases of the change of the air-gap length comes to inverted phases of the change of the air-gap length between the outside of the rotor 5 and the armature 2 described about the embodiment 23. Accordingly, the sine Wave state position detection signals as shown in FIG. 46 of the embodiment 23 corresponding to the rotation of the rotor 5 can be obtained by arranging the air-gap length detectors 131a–131c at the 210°, 330° and 90° positions respectively (the angles are the rotation angles of the rotor 5) on the projection shaft part 21a in a state opposing to the inside of the rotor 5.

Besides, the air-gap length detectors 131a–131c are not restricted to the magnetic sensor system, but sensors such as optical sensors, ultrasonic sensors and electrostatic capacity sensors are employable like in the embodiment 23.

EMBODIMENT 31

Figure 54:
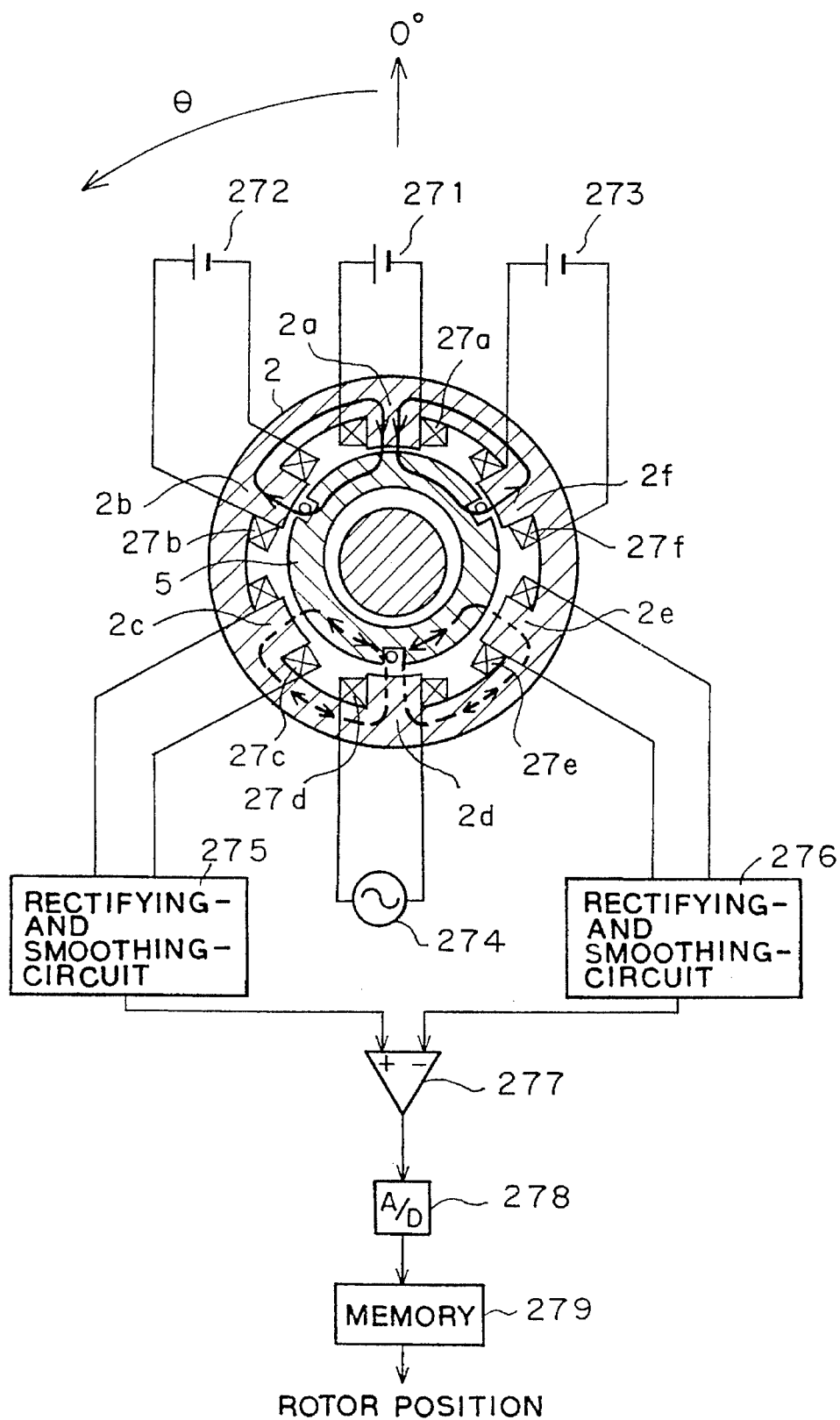
FIG. 54 is a block diagram showing a drive-controlling circuit of embodiment 31 of the variable air-gap type driving device of the present invention.

FIG. 54 is a block diagram showing a drive-controlling circuit of embodiment 31 of the variable air-gap type driving device of the present invention. FIG. 54 shows the state that the coil 27a, the coil 27b and the coil 27f are driven and then the rotor 5 rests near the rotation angle 0° position. Adjusting the driving voltages of the coil 27b and 27f in this state makes it possible to rest the rotor 5 at an arbitrary position rotated into positive or negative positions from the central position, i.e. the rotation angle 0° position. The embodiment 31 concerns the position detection of the rotor 5 on the occasion of the rotor 5's position determination.

In FIG. 54, reference numerals 271, 272 and 273 denote direct current power supplies for imposing voltages on coils 27a, 27b and 27f respectively. Numeral 274 denotes an alternating current power supply for imposing alternating current voltages on the coil 27d. Numerals 275 and 276 denote rectifying- and smoothing-circuits for rectifying and smoothing the terminal voltages of the coils 27c and 27e respectively. Numeral 277 denotes a differential amplifier for amplifying the differences of the outputs of the rectifying- and smoothing-circuits 275 and 276. Numeral 278 denotes an A/D converter circuit. And numeral 279 denotes a memory circuit inputted the outputs of the A/D converter circuit 278 as address inputs.

Now, the operation of the embodiment 31 will be described.

As mentioned above, FIG. 54 shows the state that the coil 27a, the coil 27b and the coil 27f are driven and then the rotor 5 rests near the rotation angle 0° position. At this time, the alternating current power supply 274 imposes alternating current voltages, having amplitudes small enough to effect the driving of the rotor 5, on the coil 27d, whose phase is shifted 180° of the rotation angles of the rotor 5 from that of the coil 27a, among the coils 27c–27e having no relationship with the driving of the rotor 5.

Figure 55:
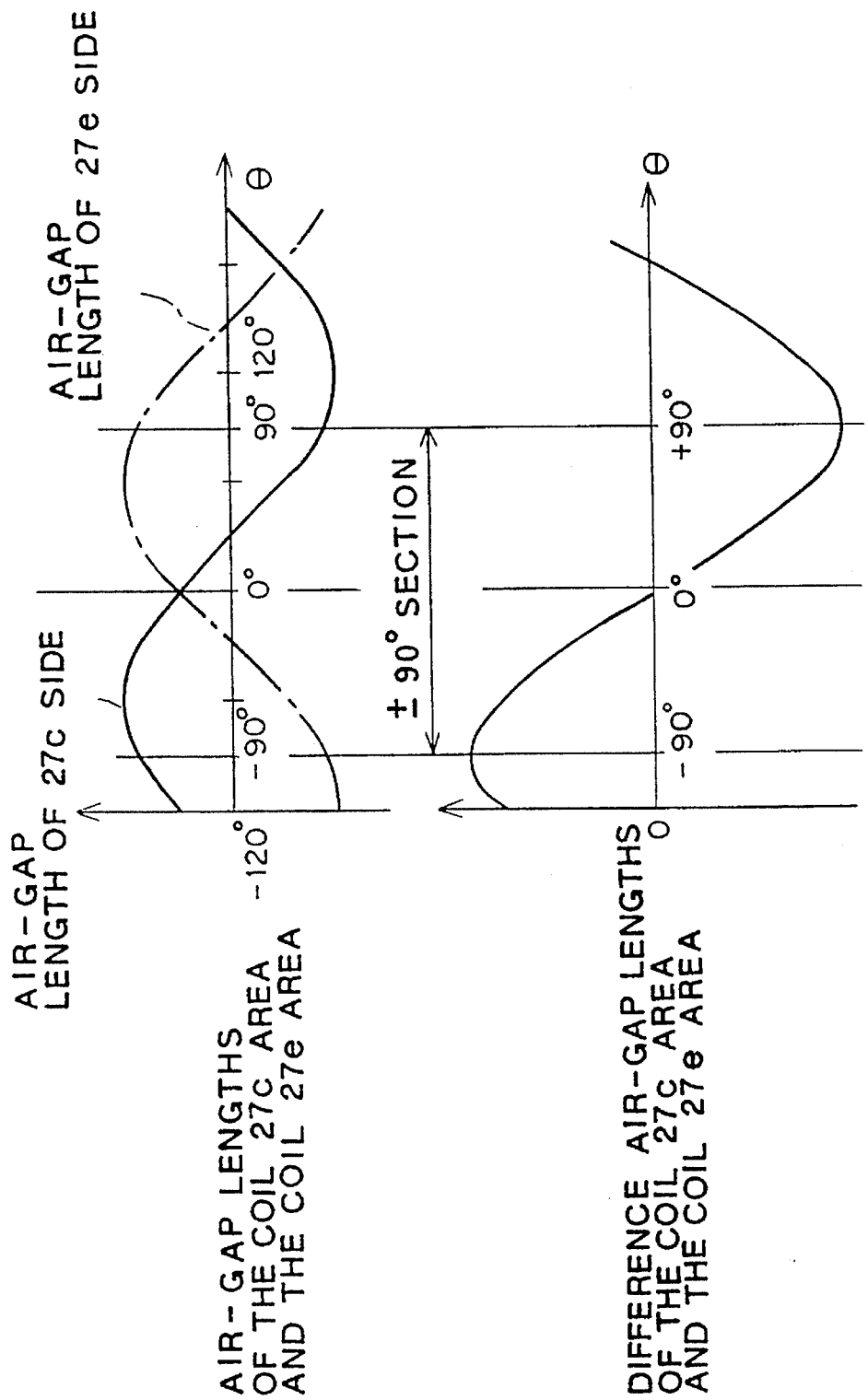
FIG. 55 is a waveform chart showing magnetic flux generated by coils.

As the linked ingredients to adjacent coils 27c and 27e of the total magnetic flux generated by the coil 27d form magnetic circuits as shown by the dotted lines in FIG. 54, voltages are induced in the coils 27c and 27e adjacent to the coil 27d by alternating current magnetic fields generated by the coil 27d. As the air-gap lengths of the coil 27c area and the coil 27e area vary as shown in the upper graph of FIG. 55 according to the positions of the rotor 5, the difference of both air-gap lengths monotonously varies in a rotation angle 0°±90° section as shown in the lower graph of FIG. 55. Accordingly, the magnetic flux ratio linked to the coils 27c and 27e of the total magnetic flux generated by the coil 27d monotonously varies in the rotation angle 0°±90° section, so voltage amplitudes induced in the both coils also monotonously vary.

The rectifying- and smoothing-circuits 275 and 276 detect the induced voltage amplitudes by rectifying and smoothing the voltages induced in coils 27c and 27e respectively. Then, the detected induced voltage amplitudes of the both coils 27c and 27e are inputted into the differential amplifying circuit 277, the differences of which are amplified by the differential amplifying circuit 277. The outputs of the differential amplifying circuit 277 are inputted to the A/D converter 278 and converted into digital amounts from analogue amounts by the A/D converter. The outputs of the A/D converter are inputted into the memory circuit 279 as address data. But, previous memorizing the rotation angle data of the rotor 5 proportionate to the outputs of the differential amplifying circuit 277 utilized as address data makes it possible to detect the rotation angles of the rotor 5 with the rotation of the rotor 5.

Besides, though the rotation data are previously memorized in the memory circuit 279 in consideration of the nonlinearity of the rotation angle 0°±90° section in the embodiment 31 mentioned above, the direct utilizing of the outputs of the differential amplifying circuit 277 to the position detection of the rotor 5 may be possible, since the outputs of the differential amplifying circuit 277 have enough rectilinearity near rotation angle 0° positions.

EMBODIMENT 32

Figure 56:
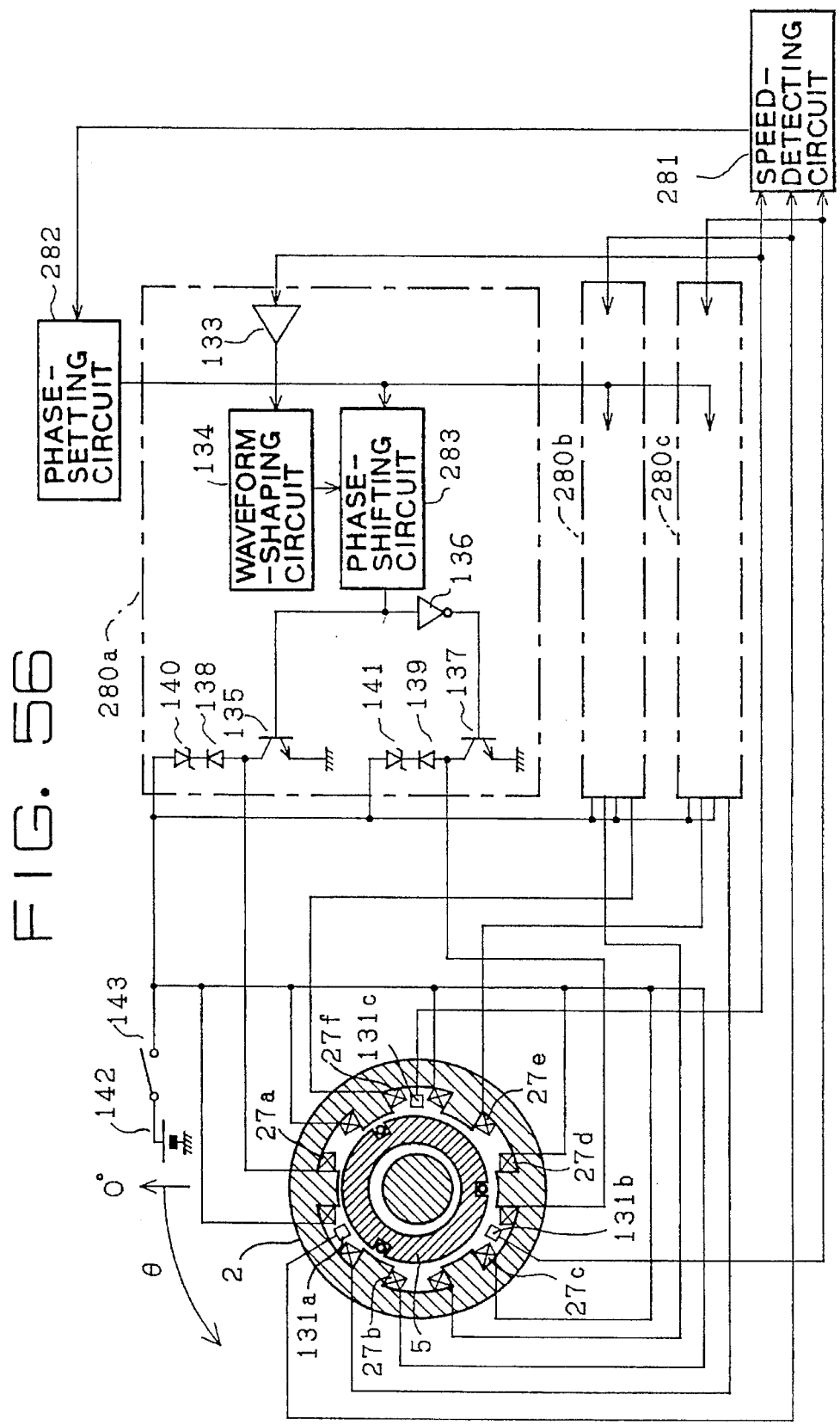
FIG. 56 is a block diagram showing a drive-controlling circuit of embodiment 32 of the variable air-gap type driving device of the present invention.

FIG. 56 is a block diagram showing a drive-controlling circuit of embodiment 32 of the variable air-gap type driving device of the present invention. In FIG. 56, reference numerals 280a–280c denote driving circuits for driving pairs of coils 27a and 27d, 27c and 27f, and 27b and 27e respectively. Numeral 281 denotes a speed-detecting circuit for detecting the revolution speed of the rotor 5. Numeral 282 denotes a phase-setting circuit in which relations between the phase differences of the voltages and currents, respectively imposed on and flowing in the coils 27a–27f, and the revolution speeds of the rotor 5 are previously set. Numeral 283 denotes a phase-shifting circuit for advancing the outputs of the waveform-shaping circuit 134 in accordance with the set values in the phase-setting circuit 282 by phase differences corresponding to the revolution speeds detected by the speed-detecting circuit 281. Besides, a phase-controlling circuit is composed of the phase-setting circuit 282 and the phase-shifting circuit 283.

Now, the operation of the embodiment 32 will be described.

In the variable air-gap type driving device shown in FIG. 56, really flowing coil current phases delays to driving voltage phases imposed on each coil due to the inductance ingredients of coils 27a–27f, and then the driving efficiency of the driving device falls. However, the driving circuit shown in the same Figure prevents the falling of the driving efficiency by advancing the fired phases of the switching devices 135 and 137 by optimum phases previously set in accordance with the revolution speeds of the rotor 5.

The speed-detecting circuit 281 outputs speed signals in proportion to the revolution speeds of the rotor 5 on the output signals of the air-gap length detectors 131a–131c. The phase-setting circuit 282 outputs predetermined phase values, determined in order that the driving efficiency of the variable air-gap type driving device becomes maximum, to the phase-shifting circuit 283 in accordance to the output signals of the speed-detecting circuit 281. As the phase-shifting circuit 283 outputs the signals that the phases of the output signals of the waveform-shaping circuit 134, outputted on the outputs of the air-gap length detector 131c, are advanced by phase values outputted from the phase-setting circuit 282; the switching devices 135 and 137 can drive the coils 27a and 27d in an optimum phase-controlled state.

EMBODIMENT 33

Figure 57:
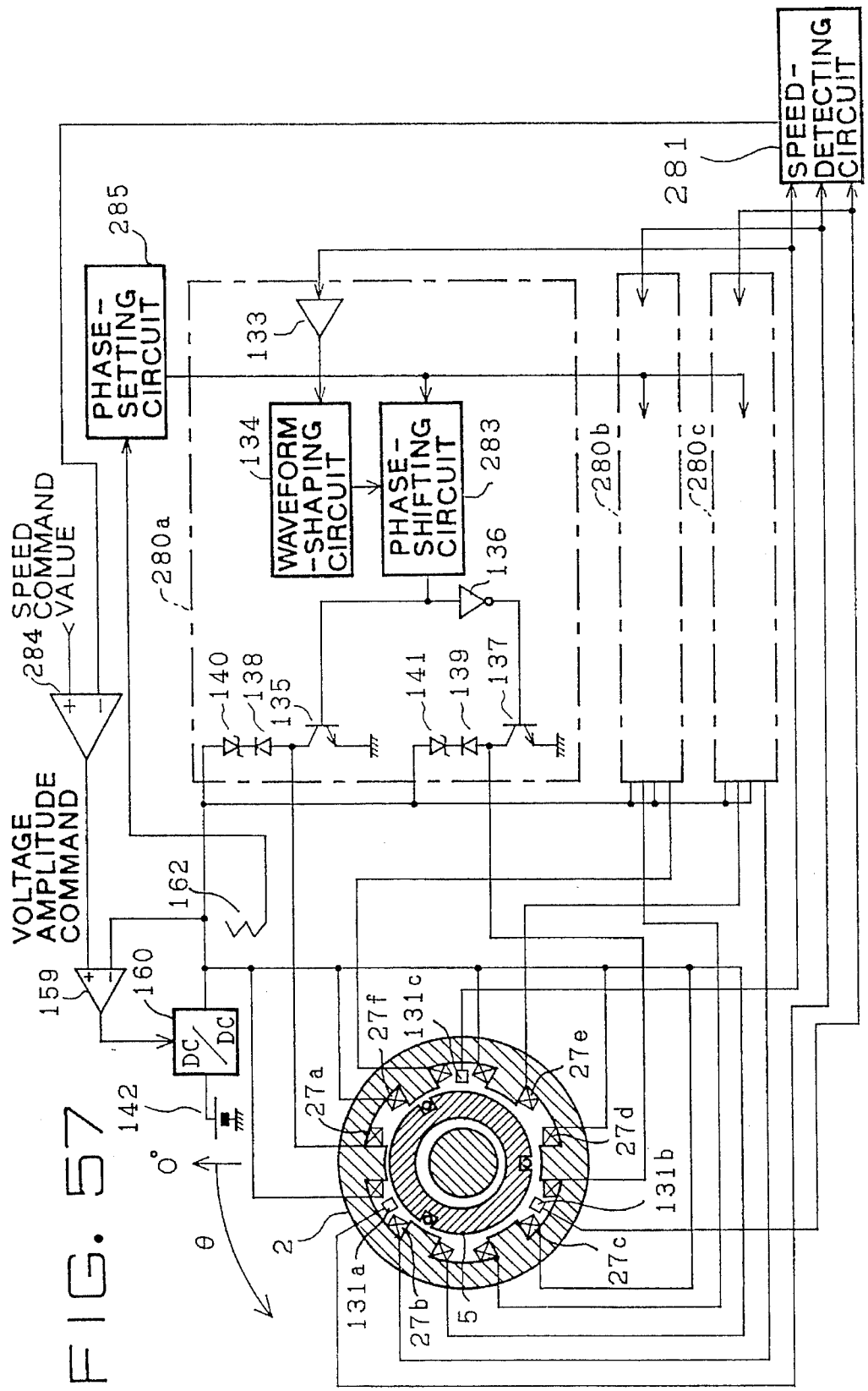
FIG. 57 is a block diagram showing a drive-controlling circuit of embodiment 33 of the variable air-gap type driving device of the present invention.

FIG. 57 is a block diagram showing a drive-controlling circuit of embodiment 33 of the variable air-gap type driving device of the present invention. In FIG. 57, reference numeral 284 denotes an error amplifier for detecting speed errors on the speed command values and detected values by the speed-detecting circuit 281. Numeral 285 denotes a phase-setting circuit in which relations between the phase differences of the voltages and currents, respectively imposed on and flowing in the coils 27a–27f, and total current values are previously set. Besides, a phase-controlling circuit is composed of the phase-setting circuit 285 and the phase-shifting circuit 283; and a controlling power supply is composed of the driving power supply 142, the error amplifiers 159 and 284, and the DC/DC converter 160.

Now, the operation of the embodiment 33 will be described.

In the variable air-gap type driving device shown in FIG. 57, really flowing coil current phases delays to driving voltage phases imposed on each coil due to the inductance ingredients of coils 27a–27f, and then the driving efficiency of the driving device falls, like the embodiment 32 mentioned above. However, the driving circuit shown in the same Figure prevents the falling of the driving efficiency by advancing the fired phases of the switching devices 135 and 137 by phases set in order that the total current flowing in the coils 27a–27f of the driving device becomes minimum.

The speed-detecting circuit 281 outputs speed signals in proportion to the revolution speeds of the rotor 5 on the output signals of the air-gap length detectors 131a–131c. The error amplifier 284 detects error speeds by comparing speed command values given from the outside and real speed values detected by the speed-detecting circuit 281, and the error amplifier 284 outputs voltage-controlling signals by giving appropriate controlling gains and compensating gains to the error speeds. The voltages imposed on the positive pole sides of the coils 27a–27f are controlled by the error amplifier 159 and the DC/DC converter 160 on the voltage-controlling signals like those of the embodiment 26 mentioned above and shown in FIG. 49.

Besides, the phase-setting circuit 285 determines phase values for outputting to the phase-shifting circuit 283 in order that the total current of the coils 27a–27f detected by the current detector 162 becomes minimum. As the phase-shifting circuit 283 outputs the signals that the phases of the output signals of the waveform-shaping circuit 134, outputted on the outputs of the air-gap length detector 131c, are advanced by phase values outputted from the phase-setting circuit 285; the switching devices 135 and 137 can drive the coils 27a and 27d in an optimum phase-controlled state.

As described above, according to the first aspect of the present invention, the variable air-gap type driving device of the invention comprises an elastic supporting means whose one end is supported on a base stand and which supports a rotor so as to restrain the rotor autorotation, and an eccentric supporting means whose rotation shaft is rotatively supported on the base stand and whose eccentric shaft's outside is supported inside the rotor and further whose rotation shaft rotates with the revolution of the rotor, therefore the revolution movement of the rotor becomes capable of being taken out from the rotation shaft of the rotor as a rotation movement, consequently the variable air-gap type driving device attains such effects that the device becomes simple in structure and small in size.

According to the second aspect of the present invention, the variable air-gap type driving device of the invention arranges a rotor inside an armature and arranges coils generating magnetic fields in the inner peripheral surface area of the armature, therefore the driving device attains such effects that the device becomes capable of utilizing the armature as a casing, too.

According to the third aspect of the present invention, the variable air-gap type driving device of the invention arranges a rotor outside an armature and arranges coils generating magnetic field in the inner peripheral surface area of the armature, therefore the driving device attains such effects that the coils becomes capable of being easily installed.

According to the fourth aspect of the present invention, the variable air-gap type driving device of the invention comprises an elastic supporting means for supporting a rotor so as to apply elastic repulsive force into the opposite direction of electromagnetic attractive force generated by an armature, therefore the driving device becomes capable of applying forces to the rotor in the opposite directions of the electromagnetic attractive force, too, consequently the driving device attains such effects that the number of coils can be decreased.

According to the fifth aspect of the present invention, the variable air-gap type driving device of the invention comprises the first and the second rotor revolving in half a cycle phase shifted state each other by electromagnetic attractive forces generated by an armature, and an eccentric supporting means whose first and second eccentric shaft's outside is supported inside the first and the second rotor respectively, the phases of the first and the second eccentric shaft being shifted in a half cycle each other, and whose rotation shaft rotates with the revolution of the first and the second rotor, therefore the driving device attains effects like those of the first aspect of the invention, and further the active area of the electromagnetic attractive force to the rotors becomes large, consequently the driving device attains further such effects that generated torque becomes larger, and vibrations and noises become smaller.

According to the sixth aspect of the present invention, the variable air-gap type driving device of the invention forms magnetic poles divided along the circumference direction of a rotor so as to correspond to each magnetic pole of an armature, and passes current through coils arranged around the armature in order that electromagnetic repulsive force might be induced in a section diagonally resided to the section where the electromagnetic attractive force generated by the armature to the rotor works on, therefore the driving device attains such effects that magnetic force applied to the rotor and induced torque increase.

According to the seventh aspect of the present invention, the variable air-gap type driving device of the invention comprises an armature for generating a magnetic field alternating into plural directions, and a rotor, arranged inside the armature, revolving with electromagnetic attractive force and electromagnetic repulsive force induced by the magnetic field generated by the armature, therefore the driving device becomes capable of revolving the rotor without applying elastic repulsive force by the elastic supporting means as stated in the fourth aspect, consequently the driving device attains such effects that the driving device becomes simple in structure and small in size.

According to the eighth aspect of the present invention, the variable air-gap type driving device of the invention comprises an armature for generating a magnetic field alternating into plural directions, and a rotor, arranged outside the armature, revolving with electromagnetic attractive force and electromagnetic repulsive force induced by the magnetic field generated by the armature, therefore the driving device becomes capable of revolving the rotor without applying elastic repulsive force by the elastic supporting means as stated in the fourth aspect, consequently the driving device attains such effects that the driving device becomes simple in structure and small in size.

According to the ninth aspect of the present invention, the variable air-gap type driving device of the invention arranges coils inside a magnetic circuit constituted by an armature, therefore the armature becomes capable of being manufactured by the press processing of a metal plate and the coils becomes capable of being constituted by two hollow-ring-shaped coils, consequently the driving device attains such effects that the driving device becomes easy to manufacture.

According to the tenth aspect of the present invention, the variable air-gap type driving device of the invention comprises a rotor having different magnetic poles in a shaft direction, and plural armature couples, arranged in an opposite direction each other through the rotor, for generating electromagnetic attractive force by generating opposite direction magnetic fields each other to the rotor, therefore the driving device becomes capable of revolving the rotor without applying elastic repulsive force by the elastic supporting means as stated in the fourth aspect, consequently the driving device attains such effects that the driving device becomes simple in structure and small in size.

According to the eleventh aspect of the present invention, the variable air-gap type driving device of the invention comprises an elastic supporting means made of plural parallel rod springs, therefore such effects are attained that the elastic supporting means becomes simple in structure.

According to the twelfth aspect of the present invention, the variable air-gap type driving device of the invention comprises an elastic supporting means made of a bent leaf spring permitting only the movements in a plane intersecting perpendicularly to a revolution shaft of a rotor, therefore such effects are attained that the elastic supporting means becomes easy to manufacture and cheap in cost.

According to the thirteenth aspect of the present invention, the variable air-gap type driving device of the invention comprises an elastic supporting means made of a diaphragm-shaped leaf spring, therefore such effects are attained that the driving device requires less spring-attaching space than that of the driving device employing an elastic supporting means made of parallel rod springs.

According to the fourteenth aspect of the present invention, the variable air-gap type driving device of the invention comprises an elastic supporting means made of plural cylindrical elastic bodies, therefore such effects are attained that the elastic supporting means becomes easy in manufacturing and constructing and cheap in cost.

According to the fifteenth aspect of the present invention, the variable air-gap type driving device comprising an elastic supporting means made of a hollow-ring-shaped elastic body, therefore such effects are attained that the elastic supporting means becomes easier in manufacturing and constructing and cheaper in cost than that of the fourteenth aspect.

According to the sixteenth aspect of the present invention, the variable air-gap type driving device of the invention comprises the first gear suspended in a freely rotatable state on a base stand, and the second gear, linked with a rotor, rotating the first gear by revolving inside the first gear with the revolution of the rotor, therefore the driving device becomes capable of taking a revolution movement of the rotor out of the first gear as a rotation movement, consequently the driving device attains identical effects to the first aspect of the invention.

According to the seventeenth aspect of the present invention, the variable air-gap type driving device of the invention comprises an eccentric supporting means having plural eccentric shafts having different phases each other, and the second gear independent of each of the plural eccentric shafts, therefore force applied to the first gear becomes capable of being symmetry with respect to the rotating shaft of the gear, consequently such effects are attained that vibrations and noises becomes smaller.

According to the eighteenth aspect of the present invention, the variable air-gap type driving device of the invention comprises an elastic supporting means for restraining the shaft-direction movement of the second gear and permitting the radical-direction movement of it, therefore the second gear becomes revolving without moving to the shaft-direction without being provided with eccentric supporting shaft like the first aspect of the invention, consequently such effects are attained that the driving device becomes simpler and smaller in construction.

According to the nineteenth aspect of the present invention, the variable air-gap type driving device of the invention comprises a screw arranged in the central part of an eccentric supporting means, and a rectilinear motion mechanism, moving rectilinearly with engaging with the screw of the eccentric supporting means, arranged on the common shaft with the eccentric supporting means, therefore such effects are attained that the revolution movement of a rotor becomes capable of being taken out of the rectilinear motion mechanism as a rectilinear motion.

According to the twentieth aspect of the present invention, the variable air-gap type driving device of the invention comprises a screw arranged on the inner peripheral surface of a rotor, and a rectilinear motion mechanism, moving rectilinearly with engaging with the screw of the rotor, arranged on the common shaft with the revolution shaft of the rotor, therefore such effects are attained that the revolution movement of the rotor becomes capable of being taken out of the rectilinear motion mechanism as a rectilinear motion.

According to the twenty-first aspect of the present invention, the variable air-gap type driving device of the invention comprises an eccentric hollow-ring arranged in a central part, and a gear rotating with engaging with internal teeth provided on the inner peripheral surface of a rotor with the rotor revolution, therefore the gear mechanism becomes capable of being arranged inside the rotor, consequently such effects are attained that the driving device becomes simple in construction and small in size.

According to the twenty-second aspect of the present invention, the variable air-gap type driving device of the invention comprises the first gear, supported on a base stand in a freely rotatable state, having external teeth or internal teeth on its outer peripheral surface, and the second gear, linked with a rotor, having internal teeth or external teeth at shifted positions from the center part, whose revolution around the shifted point from the central part with the revolution of the rotor rotates the first gear by engaging the internal teeth or the external teeth with the external teeth or the internal teeth of the first gear, therefore such effects are attained that the driving device becomes capable of arranging the output shaft of the device in a shifted position from the primary body of the device.

According to the twenty-third aspect of the present invention, the variable air-gap type driving device of the invention comprises a waveform generator for generating a waveform signal based on a command signal corresponding to the rotation angle of a rotor and indicating a voltage value or a current value each of which should be imposed on each coil of an armature, and a control power supply for supplying voltage or current corresponding respectively to the waveform signal generated by the waveform generator to each coil, therefore such effects are attained that the driving device becomes capable of obtaining a smooth rotation movement based on the rotation angle of the rotor.

According to the twenty-fourth aspect of the present invention, the variable air-gap type driving device of the invention comprises a waveform generator for generating a waveform signal based on a command signal corresponding to the revolution speed of a rotor and indicating a voltage value or a current value each of which should be imposed on each coil of an armature, and a control power supply for supplying voltage or current corresponding respectively to the waveform signal generated by the waveform generator to each coil, therefore such effects are attained that the driving device becomes capable of obtaining a smooth rotation movement based on the revolution speed of the rotor.

According to the twenty-fifth aspect of the present invention, the variable air-gap type driving device of the invention comprises a waveform generator for shaping a detection signal of an air-gap length detector to a rectangular wave, and a switching device for imposing voltage on one of a pair of coils when the rectangular wave has a higher level than a prescribed value, and imposing the voltage on the other of the pair of coils when the rectangular wave has a lower level than the prescribed value, therefore such effects are attained that the driving device becomes capable of obtaining a smooth rotation movement and preventing from stepping out.

According to the twenty-sixth aspect of the present invention, the variable air-gap type driving device of the invention comprises a command-value-extracting circuit for multiplying a detection signal of an air-gap detector by current amplitude command values commanding current amplitude values flowing in a pair of coils before extracting current command values to each of the pair of coils from the multiplication results, and a voltage output circuit for imposing voltages on the pair of coils respectively based on deviations of each current flowing in each of the pair of coils from the current command values extracted by the command-value-extracting circuit in order that the current values might coincide with the current command values, therefore such effects are attained that the driving device becomes capable of obtaining a smooth rotation movement and preventing from stepping out.

According to the twenty-seventh aspect of the present invention, the variable air-gap type driving device comprising a command-value-extracting circuit for multiplying a detection signal of an air-gap detector by voltage amplitude command values commanding voltage amplitude values imposed on a pair of coils before extracting voltage command values to each of the pair of coils from the multiplication results, and a voltage output circuit for imposing voltages on the pair of coils respectively based on the voltage command values extracted by the command-value-extracting circuit, therefore such effects are attained that the driving device becomes capable of obtaining a smooth rotation movement and preventing from stepping out.

According to the twenty-eighth aspect of the present invention, the variable air-gap type driving device of the invention comprises a control power supply for making voltage values imposed on a pair of coils coincide with voltage amplitude command values, therefore such effects are attained that the driving device becomes capable of obtaining a smooth rotation movement and preventing from stepping out.

According to the twenty-ninth aspect of the present invention, the variable air-gap type driving device of the invention comprises a control power supply for controlling a voltage, imposed on a pair of coils respectively, on a deviation of a total current value flowing in each coil of an armature from a current amplitude command value in order that the total current value might coincide with the current amplitude command value, therefore such effects are attained that the driving device becomes capable of obtaining a smooth rotation movement and preventing from stepping out.

According to the thirtieth aspect of the present invention, the variable air-gap type driving device of the invention comprises a capacitor for storing energy, stored in a coil of an armature by passing a current to the coil, while a current is not passed to the coil through a reflux diode, and a regenerating circuit for regenerating energy stored in the capacitor to the power supply of the coil when the voltage across the capacitor exceeds a prescribed value, therefore such effects are attained that the driving circuit loss of the driving device becomes reduced and the efficiency of it becomes improved.

According to the thirty-first aspect of the present invention, the variable air-gap type driving device of the invention comprises two switching devices connected in series between direct current outputs of a driving power source composed of a double voltage rectifying circuit, reflux diodes connected to each switching device in parallel, and two series circuits, connected in parallel each other, composed 6f a coil and a reverse-blocking diode respectively, the polarities of the diodes of which differ each other, and one end of which is connected to the medium voltage point of the driving power supply and the other end of which is connected to the connection point of the switching devices, therefore such effects are attained that the driving circuit of the driving device can be composed of such circuits as used frequently in driving circuits of small- and medium-capacity electric motors using single-phase AC power supplies as driving power supplies.

According to the thirty-second aspect of the present invention, the variable air-gap type driving device of the invention comprises an air-gap length detector set on a projecting shaft part of a base stand arranged on a common shaft with an armature in order that the air-gap length between the projecting shaft part and a rotor is detected, therefore such effects are attained that the coil space of the armature becomes capable of being utilized efficiently, and the air-gap length detector becomes being uninfluenced by the primary magnetic flux of the coils, consequently the stepping out of the driving device can be prevented.

According to the thirty-third aspect of the present invention, the variable air-gap type driving device of the invention induces voltages in coils located both adjacent positions to a coil located diagonally of an arbitrary rotation angle by imposing weak enough AC voltages to influence the drive of a rotor on the coil, and detects rest positions by differences between the induced voltages in the coils, therefore such effects are attained that the driving device becomes capable of detecting rest positions of the rotor without being equipped with any especial position detector.

According to the thirty-fourth aspect of the present invention, the variable air-gap type driving device of the invention comprises a phase-controlling circuit, in which relation between voltage-current phase differences imposed on coils and revolution speeds of the rotor is previously set, and which advances outputs of a waveform-shaping circuit by phase differences corresponding to revolution speeds of a rotor detected by a speed-detecting circuit, therefore such effects are attained that the efficiency of the driving device is improved.

According to the thirty-fifth aspect of the present invention, the variable air-gap type drivings device of the invention comprises a control power supply for controlling voltage values to be imposed on a pair of coils in order that revolution speeds of a rotor detected by a speed-detecting circuit coincide with speed commands of the rotor, and a phase-controlling circuit, in which relation between voltage-current phase differences imposed on coils and total current values is previously set, and which advances outputs of a waveform-shaping circuit by phase differences corresponding to the total current values, therefore such effects are attached that the efficiency of the driving device is improved.

While preferred embodiments of the invention have been described using specific terms, such description is for illustrative purposes only, and it is to be understood that changes and variations may be made without departing from the spirit or scope of the following claims.

What is claimed is:

1. A variable air-gap type driving device comprising:
   a rotor to be revolved by electromagnetic attractive force generated by an armature, without undergoing autorotation, where autorotation in a motion of the rotor in which the rotor rotates about its own axis, an elastic supporting means whose one end is supported on a base stand and which supports said rotor so as to restrain said rotor from undergoing autorotation, and an eccentric supporting means having a rotation shaft supported on said base stand in a freely rotatable state and having an eccentric shaft rotatably supported inside said rotor and further whose rotation shaft rotates with the revolution of said rotor.

2. A variable air-gap type driving device according to claim 1, wherein
   said rotor is arranged inside said armature, and further comprising:
   coils, generating magnetic fields, being arranged on inner peripheral surface areas of said armature.

3. A variable air-gap type driving device having a connection to a current source, the device according to claim 2, wherein
   the circumference part of said rotor is divided into plural parts having magnetic poles corresponding to each magnetic pole of said armature,
   a current from the current source is passed through said coils arranged in said armature in order that electromagnetic repulsive force might be induced in sections resided diagonally to sections where said electromagnetic attractive force generated from said armature to said rotor is applied.

4. A variable air-gap type driving device according to claim 1, wherein
   said rotor is arranged outside said armature, and further comprising:
   coils, generating magnetic fields, being arranged on outer peripheral surface areas of said armature.

5. A variable air-gap type driving device having a connection to a current source, the device according to claim 4, wherein
   the circumference part of said rotor is divided into plural parts having magnetic poles corresponding to each magnetic pole of said armature,
   a current from the current source is passed through said coils arranged in said armature in order that electromagnetic repulsive force might be induced in sections resided diagonally to sections where said electromagnetic attractive force generated from said armature to said rotor is applied.

6. A variable air-gap type driving device according to claim 1, wherein
   said elastic supporting means supports said rotor so as to apply elastic repulsive force into opposite directions of said electromagnetic attractive force generated by said armature.

7. A variable air-gap type driving device according to claim 1, wherein
   said elastic supporting means is composed of plural parallel rod springs.

8. A variable air-gap type driving device according to claim 1, wherein
   said elastic supporting means is composed of a bent leaf spring permitting only movements in a plane intersecting perpendicularly to the revolution axis of said rotor.

9. A variable air-gap type driving device according to claim 8, further comprising:
   a screw arranged on the inner peripheral surface of said rotor, and a rectilinear motion mechanism, arranged on the same axis as said rotor revolution axis, moving rectilinearly with engaging with said screw of said rotor.

10. A variable air-gap type driving device according to claim 8, further comprising:

a first gear supported on said base stand in a freely rotatable state and having external teeth or internal teeth on its outer peripheral surface, and a second gear linked with said rotor and having internal teeth or external teeth at shifted positions from the central part and further rotating said first gear by engaging said internal teeth or said external teeth of said second gear with said external teeth or said internal teeth of said first gear with revolving around said shifted positions from said central part as a center position with said rotor revolution.

11. A variable air-gap type driving device according to claim 1, wherein said elastic supporting means is composed of a diaphragm-shaped leaf spring, and said rotor is supported by said elastic supporting means so as to oscillate around said diaphragm-shaped leaf spring.

12. A variable air-gap type driving device according to claim 11, further comprising:

a screw arranged on the inner peripheral surface of said rotor, and a rectilinear motion mechanism, arranged on the same axis as said rotor revolution axis, moving rectilinearly with engaging with said screw of said rotor.

13. A variable air-gap type driving device according to claim 11, further comprising:

a first gear supported on said base stand in a freely rotatable state and having external teeth or internal teeth on its outer peripheral surface, and a second gear linked with said rotor and having internal teeth or external teeth at shifted positions from the central part and further rotating said first gear by engaging said internal teeth or said external teeth of said second gear with said external teeth or said internal teeth of said first gear with revolving around said shifted positions from said central part as a center position with said rotor revolution.

14. A variable air-gap type driving device according to claim 1, wherein said elastic supporting means is composed of plural cylindrical elastic bodies.

15. A variable air-gap type driving device according to claim 1, wherein said elastic supporting means is composed of a torus-shaped elastic body.

16. A variable air-gap type driving device according to claim 1, further comprising:

a first gear supported on said base stand in a freely rotatable state, and a second gear linked with said rotor and rotating said first gear by revolving inside said first gear with the revolution of said rotor, wherein said eccentric shaft of said eccentric supporting means is linked with said rotor through said second gear.

17. A variable air-gap type driving device according to claim 16, wherein said eccentric supporting means has plural eccentric shafts having different phases each other, and said second gear is equipped independently of each of said plural eccentric shafts.

18. A variable air-gap type driving device according to claim 16, further comprising:

a screw arranged in the central part of said eccentric supporting means, and a rectilinear motion mechanism, arranged on the same shaft as said eccentric supporting means, moving rectilinearly with engaging with said screw of said eccentric supporting means.

19. A variable air-gap type driving device according to claim 1, further comprising:

a screw arranged on the inner peripheral surface of said rotor, and a rectilinear motion mechanism, arranged on the same axis as said rotor revolution axis, moving rectilinearly with engaging with said screw of said rotor.

20. A variable air-gap type driving device according to claim 1, further comprising:

a first gear supported on said base stand in a freely rotatable state and having external teeth or internal teeth on its outer peripheral surface, and a second gear linked with said rotor and having internal teeth or external teeth at shifted positions from the central part axed further rotating said first gear by engaging said internal teeth or said external teeth of said second gear with said external teeth or said internal teeth of said first gear with revolving around said shifted positions from said central part as a center position with said rotor revolution.

21. A variable air-gap type driving device comprising:

a first rotor arranged inside an armature and to be revolved by electromagnetic attractive force generated by said armature, without undergoing autorotation, where autorotation is a motion of the rotor in which the first rotor rotates about its own axis, a second rotor arranged outside said armature and to be revolved by said electromagnetic attractive force generated by said armature in a phase-shifted state by half a cycle to said first rotor, without undergoing autorotation in which the second rotor rotates about its own axis, an elastic supporting means whose one end is supported on a base stand and which supports said first and second rotor so as to restrain said rotors from undergoing autorotation, and an eccentric supporting means having a rotation shaft is supported on said base stand in a freely rotatable state; and further having first and second eccentric shafts, whose phases are shifted by half a cycle each other, are supported inside said first and second rotors respectively; and whose rotation shaft rotates with the revolution of said first and second rotors.

22. A variable air-gap type driving device according to claim 21, wherein said elastic supporting means is composed of plural parallel rod springs.

23. A variable air-gap type driving device according to claim 21, wherein said elastic supporting means is composed of a bent leaf spring permitting only movements in a plane intersecting perpendicularly to the revolution axis of said rotor.

24. A variable air-gap type driving device according to claim 21, wherein said elastic supporting means is composed of a diaphragm-shaped leaf spring, and said rotor is supported by said elastic supporting means so as to oscillate around said diaphragm-shaped leaf spring.

25. A variable air-gap type driving device according to claim 21, wherein said elastic supporting means is composed of plural cylindrical elastic bodies.

26. A variable air-gap type driving device according to claim 21, wherein said elastic supporting means is composed of a torus-shaped elastic body.

27. A variable air-gap type driving device according to claim 21, further comprising:

a first gear supported on said base stand in a freely rotatable state, and a second gear linked with said rotor and rotating said first gear by revolving inside said first gear with the revolution of said rotor, wherein said eccentric shaft of said eccentric supporting means is linked with said rotor through said second gear.

28. A Variable air-gap type driving device according to claim 21, further comprising:

a screw arranged on the inner peripheral surface of said rotor, and a rectilinear motion mechanism, arranged on the same axis as said rotor revolution axis, moving rectilinearly with engaging with said screw of said rotor.

29. A variable air-gap type driving device according to claim 21, further comprising:

a first gear supported on said base stand in a freely rotatable state and having external teeth or internal teeth on its outer peripheral surface, and a second gear linked with said rotor and having internal teeth or external teeth at shifted positions from the central part and further rotating said first gear by engaging said internal teeth or said external teeth of said second gear with said external teeth or said internal teeth of said first gear with revolving around said shifted positions from said central part as a center position with said rotor revolution.

30. A variable air-gap type driving device comprising:

an armature for generating magnetic fields alternating into plural directions, a rotor arranged inside said armature and to be revolved by electromagnetic attractive force and electromagnetic repulsive force induced by said magnetic fields generated by said armature, without undergoing autorotation, where autorotation is a motion Of the rotor in which the rotor rotates about its own axis, an elastic supporting means whose one end is supported on a base stand and which supports said rotor so as to restrain said rotor from undergoing autorotation, and an eccentric supporting means having a rotation shaft supported on said base stand in a freely rotatable state and having an eccentric shaft rotatably supported inside said rotor and further whose rotation shaft rotates with the revolution of said rotor.

31. A variable air-gap type driving device according to claim 30, further comprising: coils arranged inside magnetic circuits constituted by said armature.

32. A variable air-gap type driving device according to claim 30, wherein said elastic supporting means is composed of plural parallel rod springs.

33. A variable air-gap type driving device according to claim 30, wherein said elastic supporting means is composed of a bent leaf spring permitting only movements in a plane intersecting perpendicularly to the revolution axis of said rotor.

34. A variable air-gap type driving device according to claim 30, wherein said elastic supporting means is composed of a diaphragm-shaped leaf spring, and said rotor is supported by said elastic supporting means so as to oscillate around said diaphragm-shaped leaf spring.

35. A variable air-gap type driving device according to claim 30, wherein said elastic supporting means is composed of the plural cylindrical elastic bodies.

36. A variable air-gap type driving device according to claim 30, wherein said elastic supporting means is composed of a torus-shaped elastic body.

37. A variable air-gap type driving device according to claim 30, further comprising:

a first gear supported on said base stand in a freely rotatable state, and a second gear linked with said rotor and rotating said first gear by revolving inside said first gear with the revolution of said rotor, wherein said eccentric shaft of said eccentric supporting means is linked with said rotor through said second gear.

38. A variable air-gap type driving device according to claim 30, further comprising:

a screw arranged on the inner peripheral surface of said rotor, and a rectilinear motion mechanism, arranged on the same axis as said rotor revolution axis, moving rectilinearly with engaging with said screw of said rotor.

39. A variable air-gap type driving device according to claim 30, further comprising:

a first gear supported on said base stand in a freely rotatable state and having external teeth or internal teeth on its outer peripheral surface, and a second gear linked with said rotor and having internal teeth or external teeth at shifted positions from the central part and further rotating said first gear by engaging said internal teeth or said external teeth of said second gear with said external teeth or said internal teeth of said first gear with revolving around said shifted positions from said central part as a center position with said rotor revolution.

40. A variable air-gap type driving device comprising:

an armature for generating alternating magnetic fields, a rotor arranged outside said armature and to be revolved by electromagnetic attractive force and electromagnetic repulsive force induced by said magnetic fields generated by said armature, without undergoing autorotation in which the rotor rotates about its own axis, an elastic supporting means whose one end is supported on a base stand and which supports said rotor so as to restrain said rotor from undergoing autorotation, and an eccentric supporting means having a rotation shaft supported on said base stand in a freely rotatable state and having an eccentric shaft rotatably supported inside said rotor and further whose rotation shaft rotates with the revolution of said rotor.

41. A variable air-gap type driving device according to claim 40, further comprising:

coils arranged inside magnetic circuits constituted by said armature.

42. A variable air-gap type driving device comprising:

a rotor having different magnetic poles in a shaft direction, which revolves without undergoing autorotation, where autorotation is a motion of the rotor in which the rotor rotates about its own axis, plural armature couples, arranged in an opposite direction each other through said rotor, and generating electromagnetic attractive force by generating opposite direction magnetic fields each other to said rotor, an elastic supporting means whose one end is supported on a base stand and which supports said rotor so as to restrain said rotor from undergoing autorotation, and an eccentric supporting means having a rotation shaft supported on said base stand in a freely rotatable state and having an eccentric shaft rotatably supported inside said rotor and further whose rotation shaft rotates with the revolution of said rotor.

43. A variable air-gap type driving device according to claim 42, wherein said elastic supporting means is composed of plural parallel rod springs.

44. A variable air-gap type driving device according to claim 42, wherein said elastic supporting means is composed of a bent leaf spring permitting only movements in a plane intersecting perpendicularly to the revolution axis of said rotor.

45. A variable air-gap type driving device according to claim 42, wherein said elastic supporting means is composed of a diaphragm-shaped leaf spring, and said rotor is supported by said elastic supporting means so as to oscillate around said diaphragm-shaped leaf spring.

46. A variable air-gap type driving device according to claim 42, wherein said elastic supporting means is composed of the plural cylindrical elastic bodies.

47. A variable air-gap type driving device according to claim 42, wherein said elastic supporting means is composed of a torus-shaped elastic body.

48. A variable air-gap type driving device according to claim 42, further comprising:

a first gear supported on said base stand in a freely rotatable state, and a second gear linked with said rotor and rotating said first gear by revolving inside said first gear with the revolution of said rotor, wherein said eccentric shaft of said eccentric supporting means is linked with said rotor through said second gear.

49. A variable air-gap type driving device according to claim 42, further comprising:

a screw arranged on the inner peripheral surface of said rotor, and a rectilinear motion mechanism, arranged on the same axis as said rotor revolution axis, moving rectilinearly with engaging with said screw of said rotor.

50. A variable air-gap type driving device according to claim 42, further comprising:

a first gear supported on said base stand in a freely rotatable state and having external teeth or internal teeth on its outer peripheral surface, and a second gear linked with said rotor and having internal teeth or external teeth at shifted positions from the central part and further rotating said first gear by engaging said internal teeth or said external teeth of said second gear with said external teeth or said internal teeth of said first gear with revolving around said shifted positions from said central part as a center position with said rotor revolution.

51. A variable air-gap type driving device comprising:

a rotor to be revolved by electromagnetic attractive force generated by an armature, without undergoing autorotation, where autorotation is a motion of the rotor in which the rotor rotates about its own axis, a first elastic supporting means whose one end is supported on a base stand and which supports said rotor so as to restrain said rotor from undergoing autorotation, a first gear supported on said base stand in a freely rotatable state, a second gear linked with said rotor and rotating said first gear by revolving inside said first gear with the revolution of said rotor, and a second elastic supporting means for restraining shaft-direction movements of said second gear and permitting radial-direction movements of said second gear.

52. A variable air-gap type driving device comprising:

a rotor to be revolved by electromagnetic attractive force generated by an armature, without undergoing autorotation, where autorotation is a motion of the rotor in which the rotor rotates about its own axis, an elastic supporting means whose one end is supported on a base stand and which supports said rotor so as to restrain said rotor from undergoing autorotation, an eccentric ring arranged in a central part of said rotor, and a gear to be rotated by being engaged with internal teeth equipped on the inner peripheral surface of said rotor with said rotor revolution.

* * * * *